(12) United States Patent
Symington et al.

(10) Patent No.: US 7,669,657 B2
(45) Date of Patent: Mar. 2, 2010

(54) ENHANCED SHALE OIL PRODUCTION BY IN SITU HEATING USING HYDRAULICALLY FRACTURED PRODUCING WELLS

(75) Inventors: William A. Symington, Houston, TX (US); Robert D. Kaminsky, Houston, TX (US); James M. Hutfilz, Livermore, CO (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 11/973,753

(22) Filed: Oct. 10, 2007

(65) Prior Publication Data

US 2008/0087428 A1    Apr. 17, 2008

Related U.S. Application Data

(60) Provisional application No. 60/851,544, filed on Oct. 13, 2006.

(51) Int. Cl.
*E21B 43/247* (2006.01)
(52) U.S. Cl. .................. 166/272.2; 166/52; 166/302; 166/308.1; 166/313
(58) Field of Classification Search .................. None
See application file for complete search history.

(56) References Cited

U.S. PATENT DOCUMENTS

| | | | |
|---|---|---|---|
| 363,419 A | 5/1887 | Poetsch | |
| 1,342,780 A | 6/1920 | Vedder | |
| 1,422,204 A | 7/1922 | Hoover et al. | |
| 1,666,488 A | 4/1928 | Crawshaw | |
| 1,701,884 A | 2/1929 | Hogle | |
| 1,872,906 A | 8/1932 | Doherty | |
| 2,033,560 A | 3/1936 | Wells | ............................ 166/1 |

(Continued)

FOREIGN PATENT DOCUMENTS

CA          994694          8/1976

(Continued)

OTHER PUBLICATIONS

Tisot, P. R. et al. (1970) "Structural Response of Rich Green River Oil Shales to Heat and Stress and Its Relationship to Induced Permeability," *Journal of Chemical Engineering Data*, v. 15(3), pp. 425-434.

(Continued)

*Primary Examiner*—Zakiya W. Bates

(57) ABSTRACT

A method for enhanced production of hydrocarbon fluids from an organic-rich rock formation such as an oil shale formation is provided. The method generally includes completing at least one heater well in the organic-rich rock formation, and also completing a production well in the organic-rich rock formation. The method also includes the steps of hydraulically fracturing the organic-rich rock formation from the production well such that one or more artificial fractures are formed, and heating the organic-rich rock formation from the at least one heater well, thereby pyrolyzing at least a portion of the organic-rich rock into hydrocarbon fluids Pyrolyzing the organic-rich rock formation creates thermal fractures in the formation due to thermal stresses created by heating. The thermal fractures intersect the artificial fractures. As an additional step, hydrocarbon fluids may be produced from the production well. Preferably, the organic-rich rock formation is an oil shale formation.

32 Claims, 17 Drawing Sheets

U.S. PATENT DOCUMENTS

| | | | |
|---|---|---|---|
| 2,033,561 A | 3/1936 | Wells | 166/21 |
| 2,534,737 A | 12/1950 | Rose | 73/38 |
| 2,634,961 A | 4/1953 | Ljungstrom | 262/3 |
| 2,732,195 A | 1/1956 | Ljungstrom | 262/3 |
| 2,777,679 A | 1/1957 | Ljungstrom | 262/3 |
| 2,780,450 A | 2/1957 | Ljungstrom | 262/3 |
| 2,812,160 A | 11/1957 | West et al. | 255/1.4 |
| 2,847,071 A | 8/1958 | De Priester | 166/39 |
| 2,887,160 A | 5/1959 | De Priester et al. | 166/59 |
| 2,895,555 A | 7/1959 | De Priester | 166/59 |
| 2,923,535 A | 2/1960 | Ljungstrom | 262/3 |
| 2,944,803 A | 7/1960 | Hanson | 262/3 |
| 2,952,450 A | 9/1960 | Purre | 262/3 |
| 3,004,601 A | 10/1961 | Bodine | 166/39 |
| 3,013,609 A | 12/1961 | Brink | 166/39 |
| 3,095,031 A | 6/1963 | Eurenius et al. | 158/99 |
| 3,109,482 A | 11/1963 | O'Brien | 158/115 |
| 3,127,936 A | 4/1964 | Eurenius | 166/39 |
| 3,137,347 A | 6/1964 | Parker | 166/39 |
| 3,149,672 A | 9/1964 | Orkiszewski et al. | 166/39 |
| 3,180,411 A | 4/1965 | Parker | 166/11 |
| 3,183,675 A | 5/1965 | Schroeder | 61/36 |
| 3,194,315 A | 7/1965 | Rogers | 166/57 |
| 3,225,829 A | 12/1965 | Chown et al. | 166/59 |
| 3,241,611 A | 3/1966 | Dougan | 166/7 |
| 3,241,615 A | 3/1966 | Brandt et al. | 166/59 |
| 3,254,721 A | 6/1966 | Smith et al. | 166/59 |
| 3,256,935 A | 6/1966 | Nabor et al. | 166/9 |
| 3,267,680 A | 8/1966 | Schlumberger | 61/36 |
| 3,271,962 A | 9/1966 | Dahms et al. | 61/36 |
| 3,284,281 A | 11/1966 | Thomas | 166/2 |
| 3,294,167 A | 12/1966 | Vogel | 166/11 |
| 3,295,328 A | 1/1967 | Bishop | 61/0.5 |
| 3,372,550 A | 3/1968 | Schroeder | 61/36 |
| 3,376,403 A | 4/1968 | Mircea | 219/10.49 |
| 3,400,762 A | 9/1968 | Peacock et al. | 166/11 |
| 3,436,919 A | 4/1969 | Shock et al. | 61/0.5 |
| 3,468,376 A | 9/1969 | Slusser et al. | 166/272 |
| 3,500,913 A | 3/1970 | Nordgren et al. | 166/259 |
| 3,501,201 A | 3/1970 | Closmann et al. | 299/4 |
| 3,513,914 A | 5/1970 | Vogel | 166/11 |
| 3,528,252 A | 9/1970 | Gail | 61/36 |
| 3,559,737 A | 2/1971 | Ralstin et al. | 166/281 |
| 3,599,714 A | 8/1971 | Messman | 166/258 |
| 3,602,310 A | 8/1971 | Halbert | 166/303 |
| 3,613,785 A | 10/1971 | Closmann et al. | 166/271 |
| 3,620,300 A | 11/1971 | Crowson | 166/248 |
| 3,642,066 A | 2/1972 | Gill | 166/248 |
| 3,692,111 A | 9/1972 | Breithaupt et al. | 166/252 |
| 3,724,225 A | 4/1973 | Mancini et al | 62/12 |
| 3,729,965 A | 5/1973 | Gartner | 70/395 |
| 3,741,306 A | 6/1973 | Papadopoulos | 166/252 |
| 3,759,329 A | 9/1973 | Ross | 166/308.1 |
| 3,882,937 A | 5/1975 | Robinson | 166/267 |
| 3,943,722 A | 3/1976 | Ross | 61/36 |
| 3,950,029 A | 4/1976 | Timmins | 299/2 |
| 3,978,920 A | 9/1976 | Badyopadhyay | 166/258 |
| 4,003,432 A | 1/1977 | Paull et al. | 166/271 |
| 4,005,750 A | 2/1977 | Shuck | 166/308 |
| 4,030,549 A | 6/1977 | Bouck | 166/280 |
| 4,067,390 A | 1/1978 | Camacho et al. | 166/302 |
| 4,071,278 A | 1/1978 | Carpenter et al. | 299/5 |
| 4,096,034 A | 6/1978 | Anthony | 176/87 |
| 4,125,159 A | 11/1978 | Vann | 166/285 |
| 4,140,180 A | 2/1979 | Bridges et al. | 166/248 |
| 4,239,283 A | 12/1980 | Ridley | 299/2 |
| 4,265,310 A | 5/1981 | Britton et al. | 166/259 |
| 4,272,127 A | 6/1981 | Hutchins | 299/2 |
| 4,319,635 A | 3/1982 | Jones | 166/263 |
| 4,320,801 A | 3/1982 | Rowland et al. | 166/248 |
| 4,358,222 A | 11/1982 | Landau | 405/130 |
| 4,368,921 A | 1/1983 | Hutchins | 299/2 |
| 4,372,615 A | 2/1983 | Ricketts | 299/2 |
| 4,397,502 A | 8/1983 | Hines | 299/2 |
| 4,401,162 A | 8/1983 | Osborne | 166/248 |
| 4,412,585 A | 11/1983 | Bouck | 166/248 |
| 4,474,238 A | 10/1984 | Gentry et al. | 166/268 |
| 4,485,869 A | 12/1984 | Sresty et al. | 166/248 |
| 4,487,257 A | 12/1984 | Dauphine | 166/60 |
| 4,487,260 A * | 12/1984 | Pittman et al. | 166/259 |
| 4,511,382 A | 4/1985 | Valencia et al. | 62/20 |
| 4,533,372 A | 8/1985 | Valencia et al. | 62/12 |
| 4,537,067 A | 8/1985 | Sharp et al. | 73/151 |
| 4,545,435 A | 10/1985 | Bridges et al. | 166/248 |
| 4,550,779 A | 11/1985 | Zakiewicz | 166/248 |
| 4,567,945 A | 2/1986 | Segalman | 166/248 |
| 4,589,491 A | 5/1986 | Perkins | 166/302 |
| 4,607,488 A | 8/1986 | Karinthi et al. | 62/45 |
| 4,626,665 A | 12/1986 | Fort | 219/534 |
| 4,634,315 A | 1/1987 | Owen et al. | 405/217 |
| 4,640,352 A | 2/1987 | Vanmeurs et al. | 166/245 |
| 4,694,907 A | 9/1987 | Stahl et al. | 166/303 |
| 4,704,514 A | 11/1987 | Van Egmond et al. | 219/278 |
| 4,705,108 A | 11/1987 | Little et al. | 166/248 |
| 4,747,642 A | 5/1988 | Gash et al. | 299/11 |
| 4,754,808 A | 7/1988 | Harmon et al. | 166/254 |
| 4,860,544 A | 8/1989 | Krieg et al. | 62/45 |
| 4,884,455 A | 12/1989 | Vinegar et al. | 73/798 |
| 4,886,118 A * | 12/1989 | Van Meurs et al. | 166/245 |
| 4,923,493 A | 5/1990 | Valencia et al. | 62/13 |
| 4,926,941 A | 5/1990 | Glandt et al. | 166/248 |
| 4,974,425 A | 12/1990 | Krieg et al. | 62/45.1 |
| 5,016,709 A | 5/1991 | Combe et al. | 166/245 |
| 5,050,386 A | 9/1991 | Krieg et al. | 62/45.1 |
| 5,120,338 A | 6/1992 | Potts, Jr. et al. | 62/12 |
| 5,236,039 A | 8/1993 | Edelstein et al. | 166/248 |
| 5,255,742 A | 10/1993 | Mikus | 166/303 |
| 5,275,063 A | 1/1994 | Steiger et al. | 73/865 |
| 5,297,626 A | 3/1994 | Vinegar et al. | 166/271 |
| 5,305,829 A | 4/1994 | Kumar | 166/245 |
| 5,392,854 A * | 2/1995 | Vinegar et al. | 166/271 |
| 5,411,089 A | 5/1995 | Vinegar et al. | 166/272 |
| 5,416,257 A | 5/1995 | Peters | 588/1 |
| 5,620,049 A | 4/1997 | Gipson et al. | 166/248 |
| 5,730,550 A | 3/1998 | Andersland et al. | 405/128 |
| 5,899,269 A | 5/1999 | Wellington et al. | 166/58 |
| 5,956,971 A | 9/1999 | Cole et al. | 62/623 |
| 6,023,554 A | 2/2000 | Vinegar et al. | 392/301 |
| 6,148,911 A | 11/2000 | Gipson et al. | 166/248 |
| 6,247,358 B1 | 6/2001 | Dos Santos | 73/152.11 |
| 6,581,684 B2 | 6/2003 | Wellington et al. | 166/245 |
| 6,607,036 B2 | 8/2003 | Ranson et al. | 166/302 |
| 6,684,644 B2 | 2/2004 | Mittricker et al. | 60/772 |
| 6,708,758 B2 | 3/2004 | de Rouffignac et al. | 166/245 |
| 6,712,136 B2 | 3/2004 | de Rouffignac et al. | 166/245 |
| 6,715,546 B2 | 4/2004 | Vinegar et al. | 166/245 |
| 6,722,429 B2 | 4/2004 | de Rouffignac et al. | 166/245 |
| 6,742,588 B2 | 6/2004 | Wellington et al. | 166/245 |
| 6,745,832 B2 | 6/2004 | Wellington et al. | 166/245 |
| 6,782,947 B2 | 8/2004 | de Rouffignac et al. | 166/245 |
| 6,796,139 B2 | 9/2004 | Briley et al. | 62/260 |
| 6,854,929 B2 | 2/2005 | Vinegar et al. | 405/129.65 |
| 6,858,049 B2 | 2/2005 | Mittricker | 48/127.7 |
| 6,880,633 B2 | 4/2005 | Wellington et al. | 166/245 |
| 6,887,369 B2 | 5/2005 | Moulton et al. | 208/107 |
| 6,896,053 B2 | 5/2005 | Berchenko et al. | 166/245 |
| 6,913,078 B2 | 7/2005 | Shahin et al. | 166/245 |
| 6,918,444 B2 | 7/2005 | Passey et al. | 166/258 |
| 6,923,258 B2 | 8/2005 | Wellington et al. | 166/245 |
| 6,932,155 B2 | 8/2005 | Vinegar et al. | 166/245 |
| 6,948,562 B2 | 9/2005 | Wellington et al. | 166/272.1 |
| 6,953,087 B2 | 10/2005 | de Rouffignac et al. | 166/245 |
| 6,964,300 B2 | 11/2005 | Vinegar et al. | 166/245 |
| 6,969,123 B2 | 11/2005 | Vinegar et al. | 299/3 |

| | | | | |
|---|---|---|---|---|
| 7,011,154 B2 | 3/2006 | Maher et al. | | 166/245 |
| 7,032,660 B2 | 4/2006 | Vinegar et al. | | 166/245 |
| 7,036,583 B2 | 5/2006 | de Rouffignac et al. | | 166/245 |
| 7,066,254 B2 | 6/2006 | Vinegar et al. | | 166/245 |
| 7,073,578 B2 | 7/2006 | Vinegar et al. | | 166/245 |
| 7,077,198 B2 | 7/2006 | Vinegar et al. | | 166/245 |
| 7,077,199 B2 | 7/2006 | Vinegar et al. | | 166/250.1 |
| 7,093,655 B2 | 8/2006 | Atkinson | | 166/266 |
| 7,096,942 B1 | 8/2006 | de Rouffignac et al. | | 166/245 |
| 7,096,953 B2 | 8/2006 | de Rouffignac et al. | | 166/302 |
| 7,104,319 B2 | 9/2006 | Vinegar et al. | | 166/245 |
| 7,121,342 B2 | 10/2006 | Vinegar et al. | | 166/302 |
| 7,181,380 B2 | 2/2007 | Dusterhoft et al. | | 703/10 |
| 7,225,866 B2 | 6/2007 | Berchenko et al. | | 166/245 |
| 7,331,385 B2 | 2/2008 | Symington et al. | | 166/248 |
| 7,357,180 B2 | 4/2008 | Vinegar et al. | | 166/254.1 |
| 7,441,603 B2 | 10/2008 | Kaminsky et al. | | 166/308.1 |
| 7,516,785 B2 | 4/2009 | Kaminsky | | 166/245 |
| 7,516,787 B2 | 4/2009 | Kaminsky | | 166/250.1 |
| 2002/0013687 A1 | 1/2002 | Ortoleva | | 703/10 |
| 2003/0201098 A1 | 10/2003 | Karanikas et al. | | 166/53 |
| 2005/0269077 A1 | 12/2005 | Sandberg | | 166/249 |
| 2006/0100837 A1 | 5/2006 | Symington et al. | | 703/10 |
| 2006/0129366 A1 | 6/2006 | Shaw | | 703/10 |
| 2007/0045265 A1 | 3/2007 | McKinzie, II | | 219/207 |
| 2007/0144732 A1 | 6/2007 | Kim et al. | | 166/245 |
| 2007/0209799 A1 | 9/2007 | Vinegar et al. | | 166/302 |
| 2007/0246994 A1 | 10/2007 | Symington et al. | | 299/3 |
| 2008/0087420 A1 | 4/2008 | Symington et al. | | 166/245 |
| 2008/0087421 A1 | 4/2008 | Kaminsky | | 166/245 |
| 2008/0087426 A1 | 4/2008 | Kaminsky | | 166/271 |
| 2008/0087427 A1 | 4/2008 | Symington et al. | | 166/272.1 |
| 2008/0087428 A1 | 4/2008 | Symington et al. | | 166/272.2 |
| 2008/0173443 A1 | 7/2008 | Symington et al. | | 166/248 |
| 2008/0207970 A1 | 8/2008 | Meurer et al. | | 484/24 |
| 2008/0230219 A1 | 9/2008 | Kaminsky | | 166/248 |
| 2008/0271885 A1 | 11/2008 | Kaminsky | | 166/245 |
| 2008/0283241 A1 | 11/2008 | Kaminsky et al. | | 166/245 |
| 2008/0289819 A1 | 11/2008 | Kaminsky et al. | | 166/256 |
| 2008/0290719 A1 | 11/2008 | Symington et al. | | 299/3 |
| 2009/0050319 A1 | 2/2009 | Kaminsky et al. | | 166/257 |

FOREIGN PATENT DOCUMENTS

| | | | | |
|---|---|---|---|---|
| CA | 1288043 | 8/1991 | | 166/38 |
| EP | 0387846 | 9/1990 | | |
| FR | 0866212 | 9/1998 | | |
| GB | 855408 | 11/1960 | | |
| GB | 1463444 | 2/1977 | | |
| GB | 1559948 | 1/1980 | | |
| GB | 1595082 | 8/1981 | | |
| WO | WO 82/01408 | 4/1982 | | |
| WO | WO 90/06480 | 6/1990 | | |
| WO | WO 01/81505 | 11/2001 | | |
| WO | WO 2005/010320 | 2/2005 | | |
| WO | WO 2005/045192 | 5/2005 | | |
| WO | WO2008/048448 | 4/2008 | | |
| WO | WO2008/048532 | 4/2008 | | |

OTHER PUBLICATIONS

Tisot, P. R. et al. (1971) "Structural Deformation of Green River Oil Shales as It Relates to In Situ Retorting," *US Bureau of Mines Report of Investigations 7576*, 1971.

Tisot, P. R. (1975) "Structural Response of Propped Fractures in Green River Oil Shale as It Relates to Underground Retorting," *US Bureau of Mines Report of Investigations 8021*.

Tissot, B. P., and Welte, D. H. (1984) *Petroleum Formation and Occurrence*, New York, Springer-Verlag, p. 160-174.

Tissot, B. P., and Welte, D. H. (1984) *Petroleum Formation and Occurrence*, New York, Springer-Verlag, p. 175-198.

Tissot, B. P., and Welte, D. H. (1984) *Petroleum Formation and Occurrence*, New York, Springer-Verlag, p. 254-266.

Tissot, B. P., and Welte, D. H. (1984) *Petroleum Formation and Occurrence*, New York, Springer-Verlag, p. 267-289.

Tissot, B. P., and Welte, D. H. (1984) *Petroleum Formation and Occurrence*, New York, Springer-Verlag, p. 470-492.

Tyner, C. E. et al. (1982) "Sandia/Geokinetics Retort 23: a horizontal in situ retorting experiment", Gary, J. H., ed., *15th Oil Shale Symp.*, CSM, p. 370-384.

Yen, T. F. et al. (1976) *Oil Shale*, Amsterdam, Elsevier, p. 216-238.

Yen, T. F. et al. (1976) *Oil Shale*, Amsterdam, Elsevier, p. 239-267.

Oil & Gas Journal, 1998, "Aussie oil shale project moves to Stage 2", Oct. 26, p. 42.

International Search Report for PCT/US07/21669, Apr. 29, 2008.

EP Search Report dated Feb. 16, 2007 (RS 114807, US 85154406).

Allred, (1964) "Some Characteristic Properties of Colorado Oil Shale Which May Influence In Situ Processing," *Quarterly Colo. School Of Mines, 1st Symposium Oil Shale*, v. 59. No. 3, pp. 47-75.

Baugman, G. L. (1978) *Synthetic Fuels Data Handbook*, Second Edition, Cameron Engineers Inc.

Berry, K. L., et al. (1982) "Modified in situ retorting results of two field retorts", Gary, J. H., ed., 15th Oil Shale Symp., CSM, pp. 385-396.

Boyer, H. E. et al. (1985) "Chapter 16: Heat-Resistant Materials," *Metals Handbook*, American Society for Metals, 16 pages.

Brandt, H. et al. (1965) "Stimulating Heavy Oil Reservoirs With Downhole Air-Gas Burners," *World Oil*, (Sep. 1965), pp. 91-95.

Bridges, J. E., et al. (1983) "The IITRI in situ fuel recovery process", *J. Microwave Power*, v. 18, pp. 3-14.

Burnham, A. K. et al. (1983) "High-Pressure Pyrolysis of Green River Oil Shale" in Geochemistry and Chemistry of Oil Shales: ACS Symposium Series.

Burwell, E. L. et al. (1970) "Shale Oil Recovery by In-Situ Retorting—A Pilot Study" Journal of Petroleum Engr., Dec. 1970, pp. 1520-1524.

Chute, F. S., and Vermeulen, F. E., (1988) "Present and potential applications of electromagnetic heating in the in situ recovery of oil", AOSTRA J. Res., v. 4, pp. 19-33.

Chute, F. S. and Vermeulen, F.E., (1989) "Electrical heating of reservoirs", Hepler, L., and Hsi, C., eds., AOSTRA Technical Handbook on Oil Sands, Bitumens, and Heavy Oils, Chapt. 13, pp. 339-376.

Cook, G. L. et al. (1968) "The Composition of Green River Shale Oils" United Nations Symposium of the Development and Utilization of Oil Shale Resources, 23 pgs.

Covell, J. R., et al. (1984) "Indirect in situ retorting of oil shale using the TREE process", Gary, J. H., ed., 17th Oil Shale Symposium Proceedings, Colorado School of Mines, pp. 46-58. c.

Cummins, J. J. et al. (1972) "Thermal Degradation of Green River Kerogen at 150 to 350C: Rate of Product Formation, Report of Investigation 7620," *US Bureau of Mines*, 1972.

DePriester, C. et al. (1963) "Well Stimulation by Downhole Gas-Air Burner," *Jrnl. Petro. Tech.*, (Dec. 1963), pp. 1297-1302.

Dougan, P. M. et al. (1981) "BX In Situ Oil Shale Project," *Colorado School of Mines; Fourteenth Oil Shale Symposium Proceedings*, 1981, pp. 118-127.

Dougan, P. M. (1979) "The BX In Situ Oil Shale Project," *Chem. Engr. Progress*, pp. 81-84.

Duncan, D. C., (1967) "Geologic Setting of Oil Shale Deposits and World Prospects," in *Proceedings of the Seventh World Petroleum Congress*, v.3, Elsevier Publishing, pp. 659-667.

Fisher, S. T. (1980) "A Comparison of Eleven Processes for Production of Energy from the Solid Fossil Fuels of North America," *SPE 9098*, pp. 1-27.

Hill, G.R. et al. (1967) "The Characteristics of a Low Temperature In Situ Shale Oil," *4th Symposium on Oil Shale, Quarterly of the Colorado School of Mines*, v.62(3), pp. 641-656.

Humphrey, J. P. (1978) "Energy from in situ processing of Antrim oil shale", *DOE Report FE-2346-29*.

Ingram, L. L. et al. (1983) "Comparative Study of Oil Shales and Shale Oils from the Mahogany Zone, Green River Formation (USA) and Kerosene Creek Seam, Rundle Formation (Australia)," *Chemical Geology*, 38, pp. 185-212.

Jacobs, H. R. (1983) "Analysis of the Effectiveness of Steam Retorting of Oil Shale", *AIChE Symposium Series—Heat Transfer*—Seattle 1983 pp. 373-382.

Johnson, D. J. (1966) "Decomposition Studies of Oil Shale," *University of Utah*, May 1966.

Lekas, M. A. et al. (1991) "Initial evaluation of fracturing oil shale with propellants for in situ retorting—Phase 2", *DOE Report DOE/MC/11076-3064*.

Mut, Stephen (2005) "The Potential of Oil Shale," *Shell Oil Presentation at National Academies, Trends in Oil Supply Demand*, in Washington, DC, Oct. 20-21, 2005, 11 pages.

Needham, et al (1976) "Oil Yield and Quality from Simulated In-Situ Retorting of Green River Oil Shale", Society of Petroleum Engineers of American Institute of Mining, Metallurgical and Petroleum Engineers, Inc. SPE 6069.

Prats, M. et al. (1975) "The Thermal Conductivity and Diffusivity of Green River Oil Shales", *Journal of Petroleum Technology*, pp. 97-106, Jan. 1975.

Rajeshwar, K. et al. (1979) "Review: Thermophysical Properties of Oil Shales", *Journal of Materials Science*, v.14, pp. 2025-2052.

Riva, D. et al. (1998) "Suncor down under: the Stuart Oil Shale Project", Annual Meeting of the *Canadian Inst. of Mining, Metallurgy, and Petroleum*, Montreal, May 3-7.

Rupprecht, R. (1979) "Application of the Ground-Freezing Method to Penetrate a Sequence of Water-Bearing and Dry Formations—Three Construction Cases," *Engineering Geology*, 13, pp. 541-546.

Salamonsson, G. (1951) "The Ljungstrom In Situ Method for Shale-Oil Recovery," $2^{nd}$ *Oil Shale and Cannel Coal Conference*, 2, Glasgow, Scotland, Inst. of Petrol., London, pp. 260-280.

Sandberg, C. R. et al. (1962) "In-Situ Recovery of Oil from Oil Shale—A Review and Summary of Field and Laboratory Studies," RR62.039FR, Nov. 1962.

Sierra, R. et al. (2001) "Promising Progress in Field Application of Reservoir Electrical Heating Methods," *SPE 69709*, SPE Int'l Thermal Operations and Heavy Oil Symposium, Venezuela, Mar. 2001, 17 pages.

Siskin, M. et al. (1995) "Detailed Structural Characterization of the Organic Material in Rundel Ramsay Crossing and Green River Oil Shales," *Kluwer Academic Publishers*, pp. 143-158.

Smith, F. M. (1966) "A Down-hole Burner—Versatile Tool for Well Heating," $25^{th}$ *Tech. Conf. on Petroleum Production*, Pennsylvania State Univ., pp. 275-285.

Sresty, G. C.; et al. (1982) "Kinetics of Low-Temperature Pyrolysis of Oil Shale by the IITRI RF Process," *Colorado School of Mines; Fifteenth Oil Shale Symposium Proceedings*, Aug. 1982, pp. 411-423.

Stevens, A. L., and Zahradnik, R. L. (1983) "Results from the simultaneous processing of modified in situ retorts 7& 8", Gary, J. H., ed., *16th Oil Shale Symp.*, CSM, p. 267-280.

Stoss, K. et al. (1979) "Uses and Limitations of Ground Freezing With Liquid Nitrogen," *Engineering Geology*, 13, pp. 485-494.

Thomas, G. W. (1964) "A Simplified Model of Conduction Heating in Systems of Limited Permeability," *Soc.Pet. Engineering Journal*, Dec. 1964, pp. 335-344.

Thomas, G. W. (1966) "Some Effects of Overburden Pressure on Oil Shale During Underground Retorting," *Society of Petroleum Engineers Journal*, pp. 1-8, Mar. 1966.

Tihen, S. S. et al. (1967) "Thermal Conductivity and Thermal Diffusivity of Green River Oil Shale," *Thermal Conductivity: Proceedings of the Seventh Conference* (Nov. 13-16, 1967), *NBS Special Publication* 302, pp. 529-535, 1968.

Katz, D.L. et al. (1978) "*Predicting Phase Behavior of Condensate/Crude-Oil Systems Using Methane Interaction Coefficients, J. Petroleum Technology*", pp. 1649-1655.

Miknis, F.P, et al (1985) "Isothermal Decomposition of Colorado Oil Shale", DOE/FE/60177-2288 (DE87009043) May 1985.

EP Search Report dated Mar. 12, 2009 (EP 08 00 3956,-Corresponding to U.S. Appl. No. 12/271,521).

EP Search Report dated Dec. 29, 2003 (RS 110243, Corresponding to US Pat 7,331,385).

International Search Report for PCT/US08/083815, Mar. 20, 2009.
International Search Report for PCT/US04/11508, Jan. 5, 2005.
International Search Report for PCT/US08/88045, Feb. 12, 2009.
International Search Report for PCT/US07/021968, May 14, 2008.
International Search Report for PCT/US07/021968, May 21, 2008.

\* cited by examiner

ENHANCED SHALE OIL PRODUCTION BY IN SITU HEATING USING HYDRAULICALLY FRACTURED PRODUCING WELLS

STATEMENT OF RELATED APPLICATIONS

This application claims the benefit of U.S. Provisional application 60/851,544 which was filed on Oct. 13, 2006. The provisional application is incorporated herein by reference in its entirety.

BACKGROUND OF THE INVENTION

1. Field of the Invention

The present invention relates to the field of hydrocarbon recovery from subsurface formations. More specifically, the present invention relates to the in situ recovery of hydrocarbon fluids from organic-rich rock formations, including, for example, oil shale formations, coal formations and tar sands formations.

2. Background of the Invention

Certain geological formations are known to contain an organic matter known as "kerogen." Kerogen is a solid, carbonaceous material. When kerogen is imbedded in rock formations, the mixture is referred to as oil shale. This is true whether or not the mineral is, in fact, technically shale, that is, a rock formed from compacted clay.

Kerogen is subject to decomposing upon exposure to heat over a period of time. Upon heating, kerogen molecularly decomposes to produce oil, gas, and carbonaceous coke. Small amounts of water may also be generated. The oil, gas and water fluids become mobile within the rock matrix, while the carbonaceous coke remains essentially immobile.

Oil shale formations are found in various areas worldwide, including the United States. Oil shale formations tend to reside at relatively shallow depths. In the United States, oil shale is most notably found in Wyoming, Colorado, and Utah. These formations are often characterized by limited permeability. Some consider oil shale formations to be hydrocarbon deposits which have not yet experienced the years of heat and pressure thought to be required to create conventional oil and gas reserves.

The decomposition rate of kerogen to produce mobile hydrocarbons is temperature dependent. Temperatures generally in excess of 270° C. (518° F.) over the course of many months may be required for substantial conversion. At higher temperatures substantial conversion may occur within shorter times. When kerogen is heated, chemical reactions break the larger molecules forming the solid kerogen into smaller molecules of oil and gas. The thermal conversion process is referred to as pyrolysis or retorting.

Attempts have been made for many years to extract oil from oil shale formations. Near-surface oil shales have been mined and retorted at the surface for over a century. In 1862, James Young began processing Scottish oil shales. The industry lasted for about 100 years. Commercial oil shale retorting through surface mining has been conducted in other countries as well such as Australia, Brazil, China, Estonia, France, Russia, South Africa, Spain, and Sweden. However, the practice has been mostly discontinued in recent years because it proved to be uneconomical or because of environmental constraints on spent shale disposal. (See T. F. Yen, and G. V. Chilingarian, "Oil Shale," Amsterdam, Elsevier, p. 292, the entire disclosure of which is incorporated herein by reference.) Further, surface retorting requires mining of the oil shale, which limits application to very shallow formations.

In the United States, the existence of oil shale deposits in northwestern Colorado has been known since the early 1900's. While research projects have been conducted in this area from time to time, no serious commercial development has been undertaken. Most research on oil shale production has been carried out in the latter half of the 1900's. The majority of this research was on shale oil geology, geochemistry, and retorting in surface facilities.

In 1947, U.S. Pat. No. 2,732,195 issued to Ljungstrom. That patent, entitled "Method of Treating Oil Shale and Recovery of Oil and Other Mineral Products Therefrom," proposed the application of heat at high temperatures to the oil shale formation in situ to distill and produce hydrocarbons. The '195 Ljungstrom patent is incorporated herein by reference.

Ljungstrom coined the phrase "heat supply channels" to describe bore holes drilled into the formation. The bore holes received an electrical heat conductor which transferred heat to the surrounding oil shale. Thus, the heat supply channels served as heat injection wells. The electrical heating elements in the heat injection wells were placed within sand or cement or other heat-conductive material to permit the heat injection wells to transmit heat into the surrounding oil shale while preventing the inflow of fluid. According to Ljungstrom, the "aggregate" was heated to between 500° and 1,000° C. in some applications.

Along with the heat injection wells, fluid producing wells were also completed in near proximity to the heat injection wells. As kerogen was pyrolyzed upon heat conduction into the rock matrix, the resulting oil and gas would be recovered through the adjacent production wells.

Ljungstrom applied his approach of thermal conduction from heated wellbores through the Swedish Shale Oil Company. A full scale plant was developed that operated from 1944 into the 1950's. (See G. Salamonsson, "*The Ljungstrom In Situ Method for Shale-Oil Recovery,*" $2^{nd}$ Oil Shale and Cannel Coal Conference, v. 2, Glasgow, Scotland, Institute of Petroleum, London, p. 260-280 (1951), the entire disclosure of which is incorporated herein by reference.

Additional in situ methods have been proposed. These methods generally involve the injection of heat and/or solvent into a subsurface oil shale. Heat may be in the form of heated methane (see U.S. Pat. No. 3,241,611 to J. L. Dougan), flue gas, or superheated steam (see U.S. Pat. No. 3,400,762 to D. W. Peacock). Heat may also be in the form of electric resistive heating, dielectric heating, radio frequency (RF) heating (U.S. Pat. No. 4,140,180, assigned to the ITT Research Institute in Chicago, Ill.) or oxidant injection to support in situ combustion. In some instances, artificial permeability has been created in the matrix to aid the movement of pyrolyzed fluids. Permeability generation methods include mining, rubblization, hydraulic fracturing (see U.S. Pat. No. 3,468,376 to M. L. Slusser and U.S. Pat. No. 3,513,914 to J. V. Vogel), explosive fracturing (see U.S. Pat. No. 1,422,204 to W. W. Hoover, et al.), heat fracturing (see U.S. Pat. No. 3,284,281 to R. W. Thomas), and steam fracturing (see U.S. Pat. No. 2,952,450 to H. Purre)

In 1989, U.S. Pat. No. 4,886,118 issued to Shell Oil Company, the entire disclosure of which is incorporated herein by reference. That patent, entitled "Conductively Heating a Subterranean Oil Shale to Create Permeability and Subsequently Produce Oil," declared that "[c]ontrary to the implications of . . . prior teachings and beliefs . . . the presently described conductive heating process is economically feasible for use even in a substantially impermeable subterranean oil shale." (col. 6, ln. 50-54). Despite this declaration, it is noted that few, if any, commercial in situ shale oil operations have occurred other than Ljungstrom's application. The '118 patent proposed controlling the rate of heat conduction within the rock surrounding each heat injection well to provide a uniform heat front.

Additional history behind oil shale retorting and shale oil recovery can be found in co-owned patent U.S. Pat. No. 7,331,385 entitled "Methods of Treating a Subterranean Formation to Convert Organic Matter into Producible Hydrocarbons," and in U.S. Pat. No. 7,441,603 entitled "Hydrocarbon Recovery from Impermeable Oil Shales." The Background and technical disclosures of these two patent publications are incorporated herein by reference.

A need exists for improved processes for the production of shale oil. In addition, a need exists for an improved method of increasing shale oil recovery. A need further exists for a method of heating an oil shale formation using heater wells that induce thermal fractures within a selected subsurface formation.

SUMMARY OF THE INVENTION

In one embodiment, the invention provides a method for producing hydrocarbon fluids from an organic-rich rock formation. Preferably, the organic rich rock formation comprises solid hydrocarbons. More preferably, the organic rich rock formation is an oil shale formation.

In one aspect, the method includes completing at least one heater well in the organic-rich rock formation, and also completing a production well in the organic-rich rock formation. The method also includes the step of hydraulically fracturing the organic-rich rock formation from the production well such that one or more artificial fractures are formed. In addition, the method includes heating the organic-rich rock formation from the at least one heater well, thereby pyrolyzing at least a portion of the organic-rich rock into hydrocarbon fluids, and thereby also creating thermal fractures in the formation due to thermal stresses from the heating. The result is that thermal fractures intersect the artificial fractures, thereby providing increased flowpaths for hydrocarbon fluids en route to a production well.

As an additional step, a proppant material may be introduced into one or more of the artificial fractures. As yet an additional step, hydrocarbons fluids may be produced from the production well.

In another embodiment of the invention, a method for enhanced production of hydrocarbons from an oil shale formation is provided. The method includes the steps of completing a production well substantially vertically, and hydraulically fracturing the oil shale formation from the production well in a vertical orientation such that artificial fractures in the formation are formed. The method also includes the steps of completing at least two substantially horizontal heater wells within the oil shale formation, and then heating the oil shale formation in situ from the at least two heater wells, thereby creating horizontal fractures due to thermal stresses within the oil shale formation. The horizontal thermal fractures intersect the artificial fractures. Optionally, the method may further include producing hydrocarbon fluids from the production well.

Various other aspects may be provided to the above methods. In one aspect, the one or more artificial fractures are formed primarily along the direction of least principal stress in the oil shale formation. In one embodiment, the vertical fractures are propped to have a permeability of at least 200 Darcy.

A method of designing a well pattern for a hydrocarbon fluids production program is also provided. In one aspect, the method includes the steps of estimating the extent of hydraulic fracturing from a production well completed through a subsurface formation, and also estimating the extent of thermal fractures as a result of heating the subsurface formation from one or more heater wells. The method also includes forming the production well through the subsurface formation, and hydraulically fracturing the subsurface formation from the production wellbore. Finally, the method includes heating the subsurface formation to form thermal fractures that intersect one or more of the hydraulic fractures. In one aspect, the thermal fractures intersect fractures formed from hydraulically fracturing within one year of initiating heating. The step of hydraulically fracturing the subsurface formation may further comprise injecting a proppant into the subsurface formation.

In another aspect, the step of hydraulically fracturing the subsurface formation is performed within 1 to 24 months of beginning the heating of the subsurface formation. The step of estimating the extent of thermal fractures may comprise estimating the extent of thermal fractures during the 1 to 24 month period.

In one aspect, a zone of overlap is determined between the thermal fractures and the hydraulic fractures. With this in mind, the developer of an oil shale field may choose to space the heater wells and production wells such that there is at least some overlap between the predicted hydraulic and thermal fractures.

BRIEF DESCRIPTION OF THE DRAWINGS

So that the manner in which the features of the present invention can be better understood, certain drawings, graphs and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
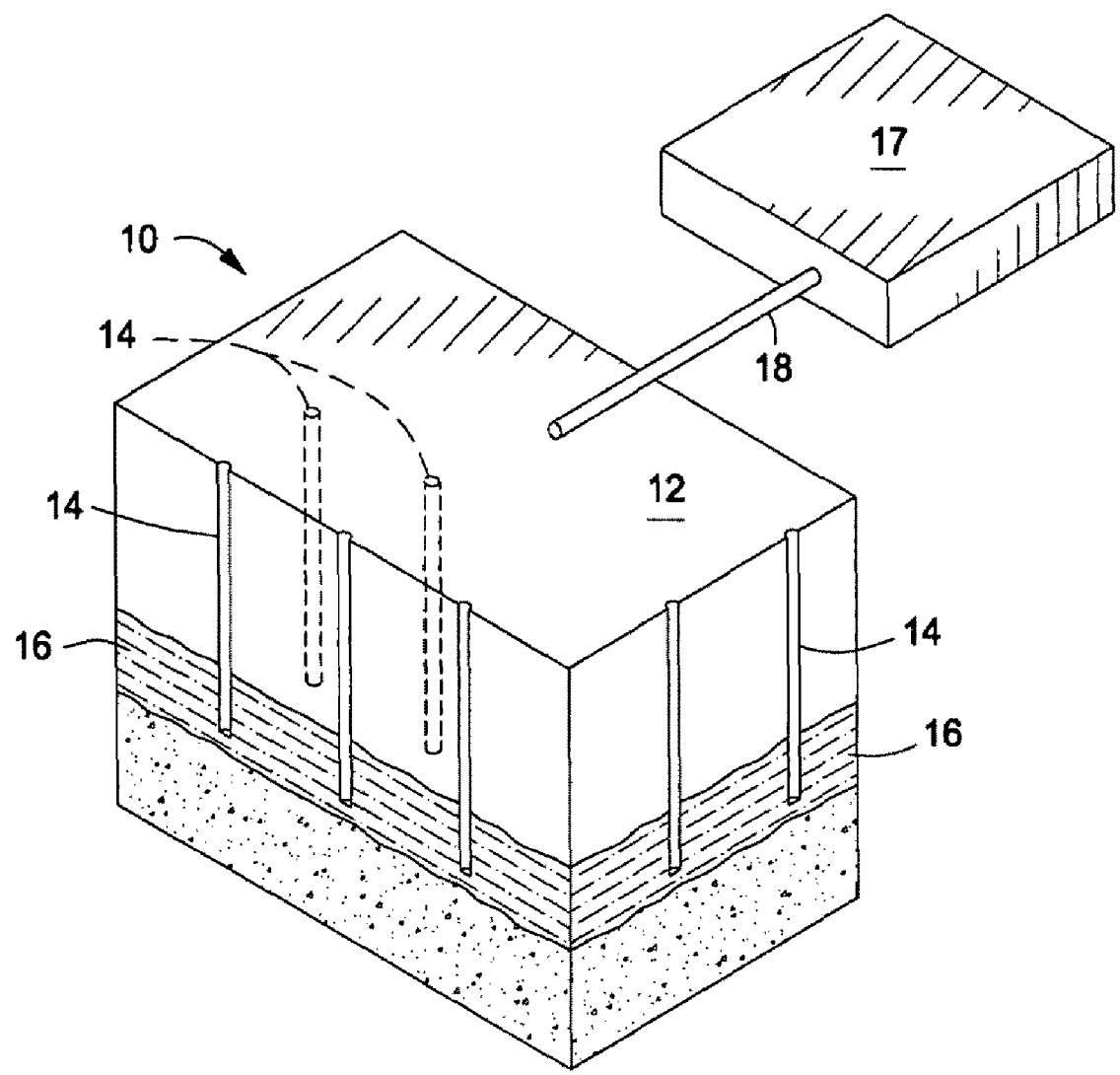
FIG. 1 is a cross-sectional view of an illustrative subsurface area. The subsurface area includes an organic-rich rock matrix that defines a subsurface formation.

As used herein, the term "hydrocarbon(s)" refers to organic material with molecular structures containing carbon bonded to hydrogen. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, pyrolyzed shale oil, synthesis gas, a pyrolysis product of coal, carbon dioxide, hydrogen sulfide and water (including steam). Produced fluids may include both hydrocarbon fluids and non-hydrocarbon fluids.

As used herein, the term "condensable hydrocarbons" means those hydrocarbons that condense at 25° C. and one atmosphere absolute pressure. Condensable hydrocarbons may include a mixture of hydrocarbons having carbon numbers greater than 4.

As used herein, the term "non-condensable hydrocarbons" means those hydrocarbons that do not condense at 25° C. and one atmosphere absolute pressure. Non-condensable hydrocarbons may include hydrocarbons having carbon numbers less than 5.

As used herein, the term "heavy hydrocarbons" refers to hydrocarbon fluids that are highly viscous at ambient conditions (15° C. and 1 atm pressure). Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20 degrees. Heavy oil, for example, generally has an API gravity of about 10-20 degrees, whereas tar generally has an API gravity below about 10 degrees. The viscosity of heavy hydrocarbons is generally greater than about 100 centipoise at 15° C.

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein, the term "formation hydrocarbons" refers to both heavy hydrocarbons and solid hydrocarbons that are contained in an organic-rich rock formation. Formation hydrocarbons may be, but are not limited to, kerogen, oil shale, coal, bitumen, tar, natural mineral waxes, and asphaltites.

As used herein, the term "tar" refers to a viscous hydrocarbon that generally has a viscosity greater than about 10,000 centipoise at 15° C. The specific gravity of tar generally is greater than 1.000. Tar may have an API gravity less than 10 degrees. "Tar sands" refers to a formation that has tar in it.

As used herein, the term "kerogen" refers to a solid, insoluble hydrocarbon that principally contains carbon, hydrogen, nitrogen, oxygen, and sulfur. Oil shale contains kerogen.

As used herein, the term "bitumen" refers to a non-crystalline solid or viscous hydrocarbon material that is substantially soluble in carbon disulfide.

As used herein, the term "oil" refers to a hydrocarbon fluid containing a mixture of condensable hydrocarbons.

As used herein, the term "subsurface" refers to geologic strata occurring below the earth's surface.

As used herein, the term "hydrocarbon-rich formation" refers to any formation that contains more than trace amounts of hydrocarbons. For example, a hydrocarbon-rich formation may include portions that contain hydrocarbons at a level of greater than 5 volume percent. The hydrocarbons located in a hydrocarbon-rich formation may include, for example, oil, natural gas, heavy hydrocarbons, and solid hydrocarbons.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites.

As used herein, the term "formation" refers to any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest. An overburden or underburden may include one or more different types of substantially impermeable materials. For example, overburden and/or underburden may include rock, shale, mudstone, or wet/tight carbonate (i.e., an impermeable carbonate without hydrocarbons). An overburden and/or an underburden may include a hydrocarbon-containing layer that is relatively impermeable. In some cases, the overburden and/or underburden may be permeable.

As used herein, the term "organic-rich rock formation" refers to any formation containing organic-rich rock. Organic-rich rock formations include, for example, oil shale formations, coal formations, and tar sands formations.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, the term "water-soluble minerals" refers to minerals that are soluble in water. Water-soluble minerals include, for example, nahcolite (sodium bicarbonate), soda ash (sodium carbonate), dawsonite ($NaAl(CO_3)(OH)_2$), or combinations thereof. Substantial solubility may require heated water and/or a non-neutral pH solution.

As used herein, the term "formation water-soluble minerals" refers to water-soluble minerals that are found naturally in a formation.

As used herein, the term "migratory contaminant species" refers to species that are both soluble and moveable in water or an aqueous fluid, and are considered to be potentially harmful or of concern to human health or the environment. Migratory contaminant species may include inorganic and organic contaminants. Organic contaminants may include saturated hydrocarbons, aromatic hydrocarbons, and oxygenated hydrocarbons. Inorganic contaminants may include metal contaminants, and ionic contaminants of various types that may significantly alter pH or the formation fluid chemistry. Aromatic hydrocarbons may include, for example, benzene, toluene, xylene, ethylbenzene, and tri-methylbenzene, and various types of polyaromatic hydrocarbons such as anthracenes, naphthalenes, chrysenes and pyrenes. Oxygenated hydrocarbons may include, for example, alcohols, ketones, phenols, and organic acids such as carboxylic acid. Metal contaminants may include, for example, arsenic, boron, chromium, cobalt, molybdenum, mercury, selenium, lead, vanadium, nickel or zinc. Ionic contaminants include, for example, sulfides, sulfates, chlorides, fluorides, ammonia, nitrates, calcium, iron, magnesium, potassium, lithium, boron, and strontium.

As used herein, the term "cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$ among other molecules.

As used herein, the term "sequestration" refers to the storing of a fluid that is a by-product of a process rather than discharging the fluid to the atmosphere or open environment.

As used herein, the term "subsidence" refers to a downward movement of a surface relative to an initial elevation of the surface.

As used herein, the term "thickness" of a layer refers to the distance between the upper and lower boundaries of a cross section of a layer, wherein the distance is measured normal to the average tilt of the cross section.

As used herein, the term "thermal fracture" refers to fractures created in a formation caused directly or indirectly by expansion or contraction of a portion of the formation and/or fluids within the formation, which in turn is caused by increasing/decreasing the temperature of the formation and/or fluids within the formation, and/or by increasing/decreasing a pressure of fluids within the formation due to heating. Thermal fractures may propagate into or form in neighboring regions significantly cooler than the heated zone.

As used herein, the term "hydraulic fracture" refers to a fracture at least partially propagated into a formation, wherein the fracture is created through injection of pressurized fluids into the formation. The fracture may be artificially held open by injection of a proppant material. Hydraulic fractures may be substantially horizontal in orientation, substantially vertical in orientation, or oriented along any other plane.

As used herein, the term "wellbore" refers to a hole in the subsurface made by drilling or insertion of a conduit into the subsurface. A wellbore may have a substantially circular cross section, or other cross-sectional shapes (e.g., circles, ovals, squares, rectangles, triangles, slits, or other regular or irregular shapes). As used herein, the term "well," when referring to an opening in the formation, may be used interchangeably with the term "wellbore."

DESCRIPTION OF SPECIFIC EMBODIMENTS

The inventions are described herein in connection with certain specific embodiments. However, to the extent that the following detailed description is specific to a particular embodiment or a particular use, such is intended to be illustrative only and is not to be construed as limiting the scope of the invention.

As discussed herein, some embodiments of the invention include or have application related to an in situ method of recovering natural resources. The natural resources may be recovered from an organic-rich rock formation, including, for example, an oil shale formation. The organic-rich rock formation may include formation hydrocarbons, including, for example, kerogen, coal, and heavy hydrocarbons. In some embodiments of the invention the natural resources may include hydrocarbon fluids, including, for example, products of the pyrolysis of formation hydrocarbons such as oil shale. In some embodiments of the invention the natural resources may also include water-soluble minerals, including, for example, nahcolite (sodium bicarbonate, or $2NaHCO_3$), soda ash (sodium carbonate, or $Na_2CO_3$) and dawsonite ($NaAl(CO_3)(OH)_2$).

FIG. 1 presents a perspective view of an illustrative oil shale development area 10. A surface 12 of the development area 10 is indicated. Below the surface is an organic-rich rock formation 16. The illustrative subsurface formation 16 contains formation hydrocarbons (such as, for example, kerogen)

and possibly valuable water-soluble minerals (such as, for example, nahcolite). It is understood that the representative formation 16 may be any organic-rich rock formation, including a rock matrix containing coal or tar sands, for example. In addition, the rock matrix making up the formation 16 may be permeable, semi-permeable or non-permeable. The present inventions are particularly advantageous in oil shale development areas initially having very limited or effectively no fluid permeability.

In order to access formation 16 and recover natural resources therefrom, a plurality of wellbores is formed. Wellbores are shown at 14 in FIG. 1. The representative wellbores 14 are essentially vertical in orientation relative to the surface 12. However, it is understood that some or all of the wellbores 14 could deviate into an obtuse or even horizontal orientation. In the arrangement of FIG. 1, each of the wellbores 14 is completed in the oil shale formation 16. The completions may be either open or cased hole. The well completions may also include propped or unpropped hydraulic fractures emanating therefrom.

In the view of FIG. 1, only seven wellbores 14 are shown. However, it is understood that in an oil shale development project, numerous additional wellbores 14 will most likely be drilled. The wellbores 14 may be located in relatively close proximity, being from 10 feet to up to 300 feet in separation. In some embodiments, a well spacing of 15 to 25 feet is provided. Typically, the wellbores 14 are also completed at shallow depths, being from 200 to 5,000 feet at total depth. In some embodiments the oil shale formation targeted for in situ retorting is at a depth greater than 200 feet below the surface or alternatively 400 feet below the surface. Alternatively, conversion and production of an oil shale formation may occur at depths between 500 and 2,500 feet.

The wellbores 14 will be selected for certain functions and may be designated as heat injection wells, water injection wells, oil production wells and/or water-soluble mineral solution production wells. In one aspect, the wellbores 14 are dimensioned to serve two, three, or all four of these purposes. Suitable tools and equipment may be sequentially run into and removed from the wellbores 14 to serve the various purposes.

A fluid processing facility 17 is also shown schematically. The fluid processing facility 17 is equipped to receive fluids produced from the organic-rich rock formation 16 through one or more pipelines or flow lines 18. The fluid processing facility 17 may include equipment suitable for receiving and separating oil, gas, and water produced from the heated formation. The fluid processing facility 17 may further include equipment for separating out dissolved water-soluble minerals and/or migratory contaminant species, including, for example, dissolved organic contaminants, metal contaminants, or ionic contaminants in the produced water recovered from the organic-rich rock formation 16. The contaminants may include, for example, aromatic hydrocarbons such as benzene, toluene, xylene, and tri-methylbenzene. The contaminants may also include polyaromatic hydrocarbons such as anthracene, naphthalene, chrysene and pyrene. Metal contaminants may include species containing arsenic, boron, chromium, mercury, selenium, lead, vanadium, nickel, cobalt, molybdenum, or zinc. Ionic contaminant species may include, for example, sulfates, chlorides, fluorides, lithium, potassium, aluminum, ammonia, and nitrates.

Figure 2:
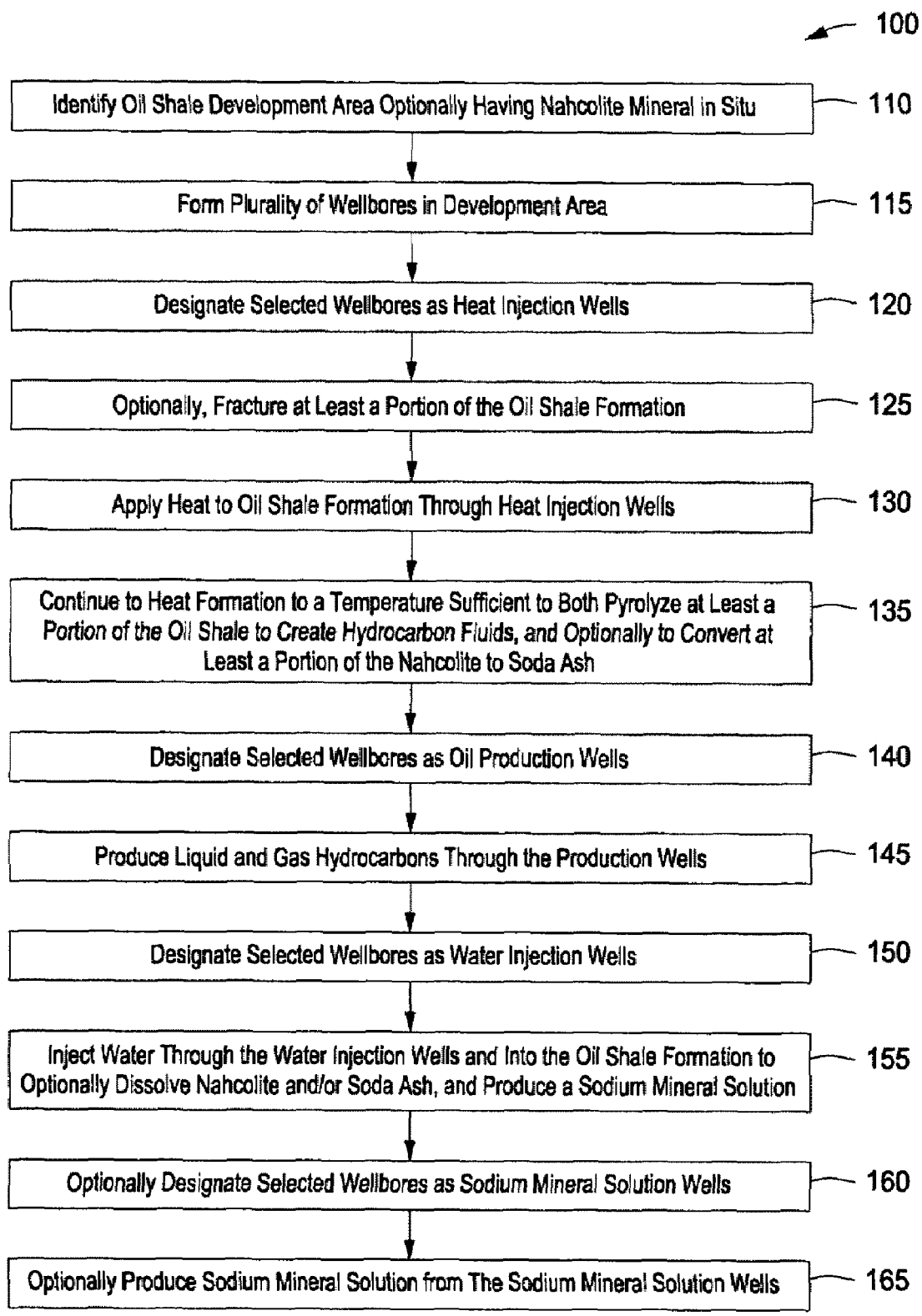
FIG. 2 is a flow chart demonstrating a general method of in situ thermal recovery of oil and gas from an organic-rich rock formation, in one embodiment.

In order to recover oil, gas, and sodium (or other) water-soluble minerals, a series of steps may be undertaken. FIG. 2 presents a flow chart demonstrating a method of in situ thermal recovery of oil and gas from an organic-rich rock formation 100, in one embodiment. It is understood that the order of some of the steps from FIG. 2 may be changed, and that the sequence of steps is merely for illustration.

First, the oil shale (or other organic-rich rock) formation 16 is identified within the development area 10. This step is shown in box 110. Optionally, the oil shale formation may contain nahcolite or other sodium minerals. The targeted development area within the oil shale formation may be identified by measuring or modeling the depth, thickness and organic richness of the oil shale as well as evaluating the position of the organic-rich rock formation relative to other rock types, structural features (e.g. faults, anticlines or synclines), or hydrogeological units (i.e. aquifers). This is accomplished by creating and interpreting maps and/or models of depth, thickness, organic richness and other data from available tests and sources. This may involve performing geological surface surveys, studying outcrops, performing seismic surveys, and/or drilling boreholes to obtain core samples from subsurface rock. Rock samples may be analyzed to assess kerogen content and fluid hydrocarbon-generating capability.

The kerogen content of the organic-rich rock formation may be ascertained from outcrop or core samples using a variety of data. Such data may include organic carbon content, hydrogen index, and modified Fischer assay analyses. Subsurface permeability may also be assessed via rock samples, outcrops, or studies of ground water flow. Furthermore, the connectivity of the development area to ground water sources may be assessed.

Next, a plurality of wellbores 14 is formed across the targeted development area 10. This step is shown schematically in box 115. The purposes of the wellbores 14 are set forth above and need not be repeated. However, it is noted that for purposes of the wellbore formation step of box 115, only a portion of the wells need be completed initially. For instance, at the beginning of the project heat injection wells are needed, while a majority of the hydrocarbon production wells are not yet needed. Production wells may be brought in once conversion begins, such as after 4 to 12 months of heating.

It is understood that petroleum engineers will develop a strategy for the best depth and arrangement for the wellbores 14, depending upon anticipated reservoir characteristics, economic constraints, and work scheduling constraints. In addition, engineering staff will determine what wellbores 14 shall be used for initial formation 16 heating. This selection step is represented by box 120.

Concerning heat injection wells, there are various methods for applying heat to the organic-rich rock formation 16. The present methods are not limited to the heating technique employed unless specifically so stated in the claims. The heating step is represented generally by box 130. Preferably, for in situ processes the heating of a production zone takes place over a period of months, or even four or more years.

The formation 16 is heated to a temperature sufficient to pyrolyze at least a portion of the oil shale in order to convert the kerogen to hydrocarbon fluids. The bulk of the target zone of the formation may be heated to between 270° C. to 800° C. Alternatively, the targeted volume of the organic-rich formation is heated to at least 350° C. to create production fluids. The conversion step is represented in FIG. 2 by box 135. The resulting liquids and hydrocarbon gases may be refined into products which resemble common commercial petroleum products. Such liquid products include transportation fuels such as diesel, jet fuel and naptha. Generated gases include light alkanes, light alkenes, $H_2$, $CO_2$, CO, and $NH_3$.

Conversion of the oil shale will create permeability in the oil shale section in rocks that were originally impermeable.

Preferably, the heating and conversion processes of boxes 130 and 135, occur over a lengthy period of time. In one aspect, the heating period is from three months to four or more years. Also, as an optional part of box 135 the formation 16 may be heated to a temperature sufficient to convert at least a portion of nahcolite, if present, to soda ash. Heat applied to mature the oil shale and recover oil and gas will also convert nahcolite to sodium carbonate (soda ash), a related sodium mineral. The process of converting nahcolite (sodium bicarbonate) to soda ash (sodium carbonate) is described herein.

In connection with the heating step 130, the rock formation 16 may optionally be fractured to aid heat transfer or later hydrocarbon fluid production. The optional fracturing step is shown in box 125. Fracturing may be accomplished by creating thermal fractures within the formation through application of heat. By heating the organic-rich rock and transforming the kerogen to oil and gas, the permeability is increased via thermal fracture formation and subsequent production of a portion of the hydrocarbon fluids generated from the kerogen. Alternatively, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability and/or be used to provide a heater well.

As part of the hydrocarbon fluid production process 100, certain wells 14 may be designated as oil and gas production wells. This step is depicted by box 140. Oil and gas production might not be initiated until it is determined that the kerogen has been sufficiently retorted to allow maximum recovery of oil and gas from the formation 16. In some instances, dedicated production wells are not drilled until after heat injection wells (box 130) have been in operation for a period of several weeks or months. Thus, box 140 may include the formation of additional wellbores 14. In other instances, selected heater wells are converted to production wells.

After certain wellbores 14 have been designated as oil and gas production wells, oil and/or gas is produced from the wellbores 14. The oil and/or gas production process is shown at box 145. At this stage (box 145), any water-soluble minerals, such as nahcolite and converted soda ash may remain substantially trapped in the rock formation 16 as finely disseminated crystals or nodules within the oil shale beds, and are not produced. However, some nahcolite and/or soda ash may be dissolved in the water created during heat conversion (box 135) within the formation.

Box 150 presents an optional next step in the oil and gas recovery method 100. Here, certain wellbores 14 are designated as water or aqueous fluid injection wells. Aqueous fluids are solutions of water with other species. The water may constitute "brine," and may include dissolved inorganic salts of chloride, sulfates and carbonates of Group I and II elements of The Periodic Table of Elements. Organic salts can also be present in the aqueous fluid. The water may alternatively be fresh water containing other species. The other species may be present to alter the pH. Alternatively, the other species may reflect the availability of brackish water not saturated in the species wished to be leached from the subsurface. Preferably, the water injection wells are selected from some or all of the wellbores used for heat injection or for oil and/or gas production. However, the scope of the step of box 150 may include the drilling of yet additional wellbores 14 for use as dedicated water injection wells. In this respect, it may be desirable to complete water injection wells along a periphery of the development area 10 in order to create a boundary of high pressure.

Next, optionally water or an aqueous fluid is injected through the water injection wells and into the oil shale formation 16. This step is shown at box 155. The water may be in the form of steam or pressurized hot water. Alternatively the injected water may be cool and becomes heated as it contacts the previously heated formation. The injection process may further induce fracturing. This process may create fingered caverns and brecciated zones in the nahcolite-bearing intervals some distance, for example up to 200 feet out, from the water injection wellbores. In one aspect, a gas cap, such as nitrogen, may be maintained at the top of each "cavern" to prevent vertical growth.

Along with the designation of certain wellbores 14 as water injection wells, the design engineers may also designate certain wellbores 14 as water or water-soluble mineral solution production wells. This step is shown in box 160. These wells may be the same as wells used to previously produce hydrocarbons or inject heat. These recovery wells may be used to produce an aqueous solution of dissolved water-soluble minerals and other species, including, for example, migratory contaminant species. For example, the solution may be one primarily of dissolved soda ash. This step is shown in box 165. Alternatively, single wellbores may be used to both inject water and then to recover a sodium mineral solution. Thus, box 165 includes the option of using the same wellbores 14 for both water injection and solution production (box 165).

Temporary control of the migration of the migratory contaminant species, especially during the pyrolysis process, can be obtained via placement of the injection and production wells 14 such that fluid flow out of the heated zone is minimized. Typically, this involves placing injection wells at the periphery of the heated zone so as to cause pressure gradients which prevent flow inside the heated zone from leaving the zone.

Figure 3:
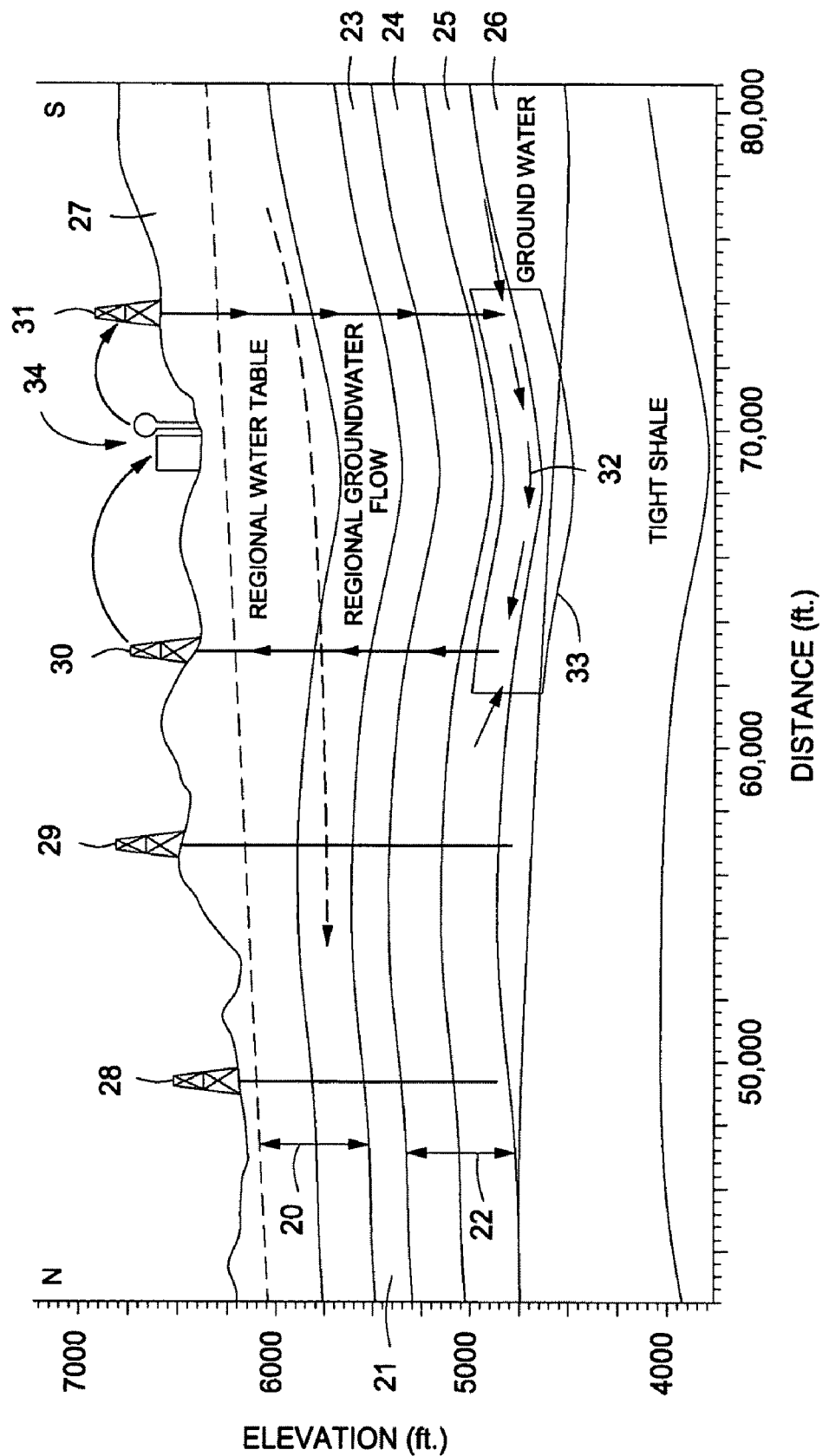
FIG. 3 is a process flow diagram of exemplary surface processing facilities for a subsurface formation development.

FIG. 3 is a cross-sectional view of an illustrative oil shale formation that is within or connected to ground water aquifers and a formation leaching operation. Four separate oil shale formation zones are depicted (23, 24, 25 & 26) within the oil shale formation. The water aquifers are below the ground surface 27, and are categorized as an upper aquifer 20 and a lower aquifer 22. Intermediate between the upper and lower aquifers is an aquitard 21. It can be seen that certain zones of the formation comprise both aquifers or aquitards and oil shale zones. A plurality of wells (28, 29, 30, & 31) is shown traversing vertically downward through the aquifers. One of the wells is serving as a water injection well 31, while another is serving as a water production well 30. In this way, water 32 is circulated through at least the lower aquifer 22.

FIG. 3 shows diagrammatically the water circulation 32 through an oil shale zone 33 that was heated, that resides within or is connected to an aquifer 22, and from which hydrocarbon fluids were previously recovered. Introduction of water via the water injection well 31 forces water into the previously heated oil shale zone 33 and water-soluble minerals and migratory contaminants species are swept to the water production well 30. The water may then be processed in a facility 34 wherein so that water-soluble minerals (e.g. nahcolite or soda ash) and the migratory contaminants may be substantially removed from the water stream. Water is then reinjected into the oil shale zone 33 and the formation leaching is repeated. This leaching with water is intended to continue until levels of migratory contaminant species are at environmentally acceptable levels within the previously heated oil shale zone 33. This may require 1 cycle, 2 cycles, 5 cycles 10 cycles or more cycles of formation leaching, where a single cycle indicates injection and production of approximately one pore volume of water.

It is understood that there may be numerous water injection and water production wells in an actual oil shale development. Moreover, the system may include monitoring wells (28 & 29) which can be utilized during the oil shale heating phase, the shale oil production phase, the leaching phase, or during any combination of these phases to monitor for migratory contaminant species and/or water-soluble minerals.

In some fields, formation hydrocarbons, such as oil shale, may exist in more than one subsurface formation. In some instances, the organic-rich rock formations may be separated by rock layers that are hydrocarbon-free or that otherwise have little or no commercial value. Therefore, it may be desirable for the operator of a field under hydrocarbon development to undertake an analysis as to which of the subsurface, organic-rich rock formations to target or in which order they should be developed.

The organic-rich rock formation may be selected for development based on various factors. One such factor is the thickness of the hydrocarbon containing layer within the formation. Greater pay zone thickness may indicate a greater potential volumetric production of hydrocarbon fluids. Each of the hydrocarbon containing layers may have a thickness that varies depending on, for example, conditions under which the formation hydrocarbon containing layer was formed. Therefore, an organic-rich rock formation will typically be selected for treatment if that formation includes at least one formation hydrocarbon-containing layer having a thickness sufficient for economical production of produced fluids.

An organic-rich rock formation may also be chosen if the thickness of several layers that are closely spaced together is sufficient for economical production of produced fluids. For example, an in situ conversion process for formation hydrocarbons may include selecting and treating a layer within an organic-rich rock formation having a thickness of greater than about 5 meters, 10 meters, 50 meters, or even 100 meters. In this manner, heat losses (as a fraction of total injected heat) to layers formed above and below an organic-rich rock formation may be less than such heat losses from a thin layer of formation hydrocarbons. A process as described herein, however, may also include selecting and treating layers that may include layers substantially free of formation hydrocarbons or thin layers of formation hydrocarbons.

The richness of one or more organic-rich rock formations may also be considered. Richness may depend on many factors including the conditions under which the formation hydrocarbon containing layer was formed, an amount of formation hydrocarbons in the layer, and/or a composition of formation hydrocarbons in the layer. A thin and rich formation hydrocarbon layer may be able to produce significantly more valuable hydrocarbons than a much thicker, less rich hydrocarbon layer. Of course, producing formation hydrocarbons from a formation that is both thick and rich is desirable.

The kerogen content of an organic-rich rock formation may be ascertained from outcrop or core samples using a variety of data. Such data may include organic carbon content, hydrogen index, and modified Fischer assay analyses. The Fischer Assay is a standard method which involves heating a sample of a formation hydrocarbon containing layer to approximately 500° C. in one hour, collecting fluids produced from the heated sample, and quantifying the amount of fluids produced.

Subsurface formation permeability may also be assessed via rock samples, outcrops, or studies of ground water flow. Furthermore the connectivity of the development area to ground water sources may be assessed. Thus, an organic-rich rock formation may be chosen for development based on the permeability or porosity of the formation matrix even if the thickness of the formation is relatively thin.

Other factors known to petroleum engineers may be taken into consideration when selecting a formation for development. Such factors include depth of the perceived pay zone, stratigraphic proximity of fresh ground water to kerogen-containing zones, continuity of thickness, and other factors. For instance, the assessed fluid production content within a formation will also effect eventual volumetric production.

In producing hydrocarbon fluids from an oil shale field, it may be desirable to control the migration of pyrolyzed fluids. In some instances, this includes the use of injection wells, particularly around the periphery of the field. Such wells may inject water, steam, $CO_2$, heated methane, or other fluids to drive cracked kerogen fluids inwardly towards production wells. In some embodiments, physical barriers may be placed around the area of the organic-rich rock formation under development. One example of a physical barrier involves the creation of freeze walls. Freeze walls are formed by circulating refrigerant through peripheral wells to substantially reduce the temperature of the rock formation. This, in turn, prevents the pyrolyzation of kerogen present at the periphery of the field and the outward migration of oil and gas. Freeze walls will also cause native water in the formation along the periphery to freeze.

The use of subsurface freezing to stabilize poorly consolidated soils or to provide a barrier to fluid flow is known in the art. Shell Exploration and Production Company has discussed the use of freeze walls for oil shale production in several patents, including U.S. Pat. No. 6,880,633 and U.S. Pat. No. 7,032,660. Shell's '660 patent uses subsurface freezing to protect against groundwater flow and groundwater contamination during in situ shale oil production. Additional patents that disclose the use of so-called freeze walls are U.S. Pat. No. 3,528,252, U.S. Pat. No. 3,943,722, U.S. Pat. No. 3,729,965, U.S. Pat. No. 4,358,222, and U.S. Pat. No. 4,607,488.

Another example of a physical barrier that may be used to limit fluid flow into or out of an oil shale field is the creation of grout walls. Grout walls are formed by injecting cement into the formation to fill permeable pathways. In the context of an oil shale field, cement would be injected along the periphery of the field. This prevents the movement of pyrolyzed fluids out of the field under development, and the movement of water from adjacent aquifers into the field.

As noted above, several different types of wells may be used in the development of an organic-rich rock formation, including, for example, an oil shale field. For example, the heating of the organic-rich rock formation may be accomplished through the use of heater wells. The heater wells may include, for example, electrical resistance heating elements. The production of hydrocarbon fluids from the formation may be accomplished through the use of wells completed for the production of fluids. The injection of an aqueous fluid may be accomplished through the use of injection wells. Finally, the production of an aqueous solution may be accomplished through use of solution production wells.

The different wells listed above may be used for more than one purpose. Stated another way, wells initially completed for one purpose may later be used for another purpose, thereby lowering project costs and/or decreasing the time required to perform certain tasks. For example, one or more of the production wells may also be used as injection wells for later injecting water into the organic-rich rock formation. Alternatively, one or more of the production wells may also be used as solution production wells for later producing an aqueous solution from the organic-rich rock formation.

In other aspects, production wells (and in some circumstances heater wells) may initially be used as dewatering wells (e.g., before heating is begun and/or when heating is initially started). In addition, in some circumstances dewatering wells can later be used as production wells (and in some circumstances heater wells). As such, the dewatering wells may be placed and/or designed so that such wells can be later used as production wells and/or heater wells. The heater wells may be placed and/or designed so that such wells can be later used as production wells and/or dewatering wells. The production wells may be placed and/or designed so that such wells can be later used as dewatering wells and/or heater wells. Similarly, injection wells may be wells that initially were used for other purposes (e.g., heating, production, dewatering, monitoring, etc.), and injection wells may later be used for other purposes. Similarly, monitoring wells may be wells that initially were used for other purposes (e.g., heating, production, dewatering, injection, etc.). Finally, monitoring wells may later be used for other purposes such as water production.

The wellbores for the various wells may be located in relatively close proximity, being from 10 feet to up to 300 feet in separation. Alternatively, the wellbores may be spaced from 30 to 200 feet or 50 to 100 feet. Typically, the wellbores are also completed at shallow depths, being from 200 to 5,000 feet at total depth. Alternatively, the wellbores may be completed at depths from 1,000 to 4,000 feet, or 1,500 to 3,500 feet. In some embodiments, the oil shale formation targeted for in situ retorting is at a depth greater than 200 feet below the surface. In alternative embodiments, the oil shale formation targeted for in situ retorting is at a depth greater than 500, 1,000, or 1,500 feet below the surface. In alternative embodiments, the oil shale formation targeted for in situ retorting is at a depth between 200 and 5,000 feet, alternatively between 1,000 and 4,000 feet, 1,200 and 3,700 feet, or 1,500 and 3,500 feet below the surface.

It is desirable to arrange the various wells for an oil shale field in a pre-planned pattern. For instance, heater wells may be arranged in a variety of patterns including, but not limited to triangles, squares, hexagons, and other polygons. The pattern may include a regular polygon to promote uniform heating through at least the portion of the formation in which the heater wells are placed. The pattern may also be a line drive pattern. A line drive pattern generally includes a first linear array of heater wells, a second linear array of heater wells, and a production well or a linear array of production wells between the first and second linear array of heater wells. Interspersed among the heater wells are typically one or more production wells. The injection wells may likewise be disposed within a repetitive pattern of units, which may be similar to or different from that used for the heater wells.

One method to reduce the number of wells is to use a single well as both a heater well and a production well. Reduction of the number of wells by using single wells for sequential purposes can reduce project costs. One or more monitoring wells may be disposed at selected points in the field. The monitoring wells may be configured with one or more devices that measure a temperature, a pressure, and/or a property of a fluid in the wellbore. In some instances, a heater well may also serve as a monitoring well, or otherwise be instrumented.

One method to reduce the number of heater wells is to use well patterns. Regular patterns of heater wells equidistantly spaced from a production well may be used. The patterns may form equilateral triangular arrays, hexagonal arrays, or other array patterns. The arrays of heater wells may be disposed such that a distance between each heater well is less than about 70 feet (21 m). A portion of the formation may be heated with heater wells disposed substantially parallel to a boundary of the hydrocarbon formation.

In alternative embodiments, the array of heater wells may be disposed such that a distance between each heater well may be less than about 100 feet, or 50 feet, or feet. Regardless of the arrangement of or distance between the heater wells, in certain embodiments, a ratio of heater wells to production wells disposed within an organic-rich rock formation may be greater than about 5, 8, 10, 20, or more.

One method to reduce the number of heater wells is to use well patterns that are elongated in a particular direction, particularly in the direction of most efficient thermal conductivity. Heat convection may be affected by various factors such as bedding planes and stresses within the formation. For instance, heat convection may be more efficient in the direction perpendicular to the least horizontal principal stress on the formation. In some instanced, heat convection may be more efficient in the direction parallel to the least horizontal principal stress.

It is also noted that the process of heating an oil shale formation also changes the permeability of the formation. By heating the organic-rich rock and transforming the kerogen to oil and gas, the permeability is increased via both the conversion of kerogen to fluids and thermal fracture formation. Thermal fractures increase permeability and aid fluid flow within the formation. The increased flow along the fractures will lead to increased heat convection. Moreover, heater well spacing may be elongated by a factor of 1.2, 1.5, 2.0, 2.5 or greater in the fracture direction. Such elongations may be applied to a number of well patterns including triangular, a 5-spot, or hexagonal pattern.

The arrangement of the heater wells and production wells may also be considered in determining the ratio of gas-to-liquids production (at surface conditions). As hydrocarbons are generated from the immobile kerogen and begin to flow, the produced hydrocarbons may undergo secondary cracking if they remain for sufficient time in sufficiently hot rock. Generally this is not desirable since a portion of the oil-like liquids will convert to gas (e.g., $C_1$-$C_3$ components) and immobile coke. Gas is typically less valuable than oil and formation of coke indicates loss of hydrocarbons. Secondary cracking is enhanced if a flow pathway of generated hydrocarbons takes it closer to a heater well than its point of origin. Thus to maximize hydrocarbon liquids production, heater wells and production wells are preferably arranged such that the majority of generated hydrocarbons can migrate to a production well by passing only through monotonically decreasing temperatures.

In one embodiment, individual production wells are surrounded by at most one layer of heater wells. This may include arrangements such as 5-spot, 7-spot, or 9-spot arrays, with alternating rows of production and heater wells. In another embodiment, two layers of heater wells may surround a production well, but with the heater wells staggered so that a clear pathway exists for the majority of flow away from the further heater wells. Flow and reservoir simulations may be employed to assess the pathways and temperature history of hydrocarbon fluids generated in situ as they migrate from their points of origin to production wells.

Figure 4:
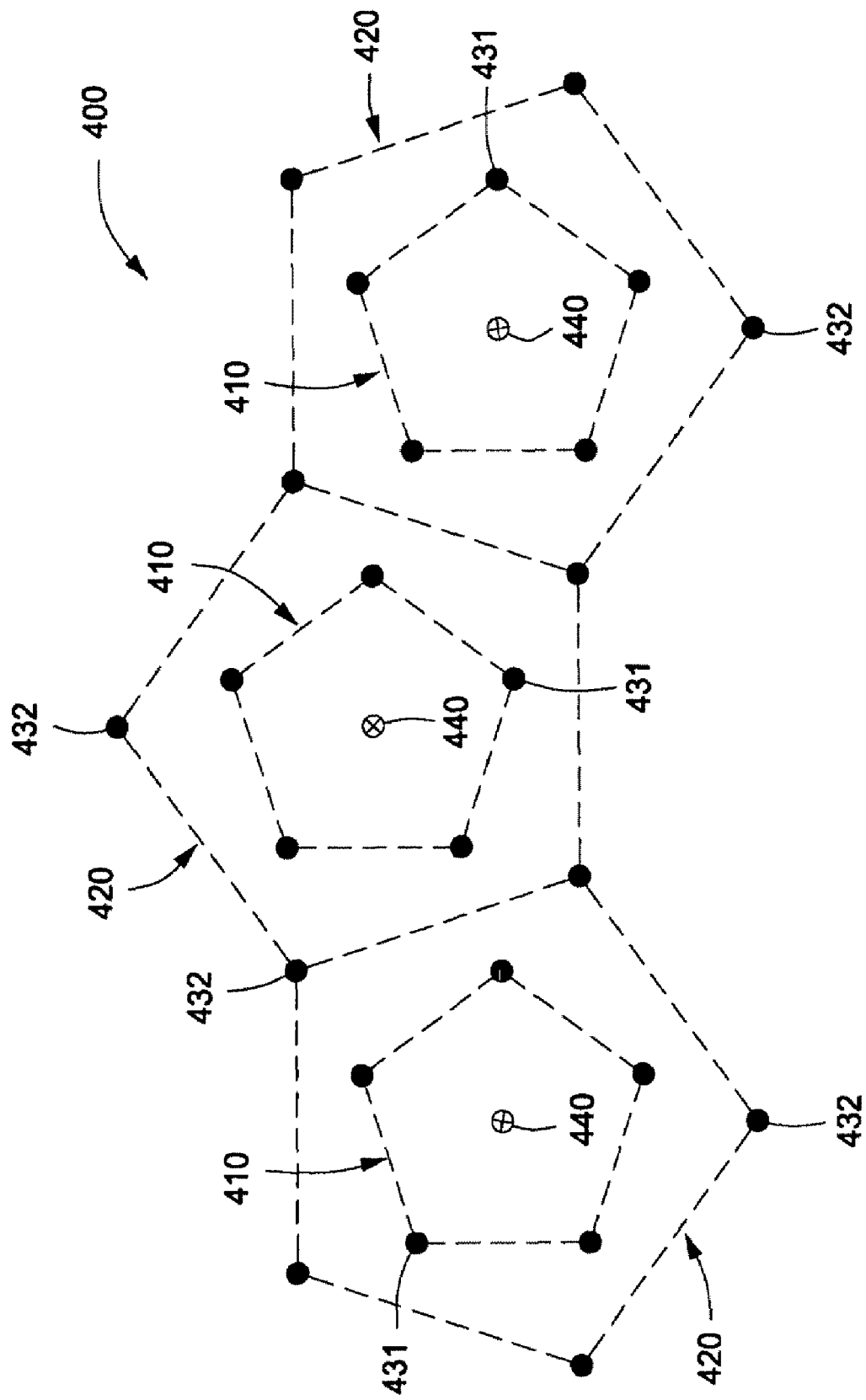
FIG. 4 is a plan view of an illustrative heater well pattern around a production well. Two layers of heater wells are shown.

FIG. 4 provides a plan view of an illustrative heater well arrangement using more than one layer of heater wells. The heater well arrangement is used in connection with the production of hydrocarbons from a shale oil development area

400. In FIG. 4, the heater well arrangement employs a first layer of heater wells 410, surrounded by a second layer of heater wells 420. The heater wells in the first layer 410 are referenced at 431, while the heater wells in the second layer 420 are referenced at 432.

In the illustrative arrangement 400, a production well 440 is shown. In addition, a first layer 410 of heater wells is disposed circumferentially around the production well 440. Further still, a second layer 420 of heater wells is disposed circumferentially around the first layer 410 of heater wells. It is noted from the arrangement 400 of FIG. 4 that the heater wells 432 in the second layer 420 of wells are offset from the heater wells 431 in the first layer 410 of wells, relative to the production well 440. The purpose is to provide a flowpath for converted hydrocarbons that minimizes travel near a heater well in the first layer 410 of heater wells. This, in turn, minimizes secondary cracking of hydrocarbons converted from kerogen as hydrocarbons flow from the second layer of wells 420 to the production wells 440.

In the illustrative arrangement of FIG. 4, the first layer 410 and the second layer 420 each defines a 5-spot pattern. However, it is understood that other patterns may be employed, such as 3-spot or 6-spot patterns. Further, it is understood that the pattern 400 could be repeated linearly, such as in the direction of most efficient thermal conductivity. In any instance, a plurality of heater wells 431 comprising a first layer of heater wells 410 is placed around a production well 440, with a second plurality of heater wells 432 comprising a second layer of heater wells 420 placed around the first layer 410.

The heater wells in the two layers also may be arranged such that the majority of hydrocarbons generated by heat from each heater well 432 in the second layer 420 are able to migrate to a production well 440 without passing substantially near a heater well 431 in the first layer 410. The heater wells 431, 432 in the two layers 410, 420 further may be arranged such that the majority of hydrocarbons generated by heat from each heater well 432 in the second layer 420 are able to migrate to the production well 440 without passing through a zone of substantially increasing formation temperature.

Well pattern plans may be combined with simulation specifically to assess flow paths and the impact of secondary cracking. Arranging production and heater wells such to minimize secondary thermal cracking may require lower ratios of heater-to-production wells. For example, the ratio of heater wells to production wells may include ratios less than about 5:1. In some embodiments, the ratio of heater wells to production wells may be about 4:1, 3:1, 1:1, or less.

In connection with the development of an oil shale field, it may be desirable that the progression of heat through the subsurface in accordance with steps 130 and 135 be uniform. However, for various reasons the heating and maturation of formation hydrocarbons in a subsurface formation may not proceed uniformly despite a regular arrangement of heater and production wells. Heterogeneities in the oil shale properties and formation structure may cause certain local areas to be more or less productive. Moreover, formation fracturing which occurs due to the heating and maturation of the oil shale can lead to an uneven distribution of preferred pathways and, thus, increase flow to certain production wells and reduce flow to others. Uneven fluid maturation may be an undesirable condition since certain subsurface regions may receive more heat energy than necessary where other regions receive less than desired. This, in turn, leads to the uneven flow and recovery of production fluids. Produced oil quality, overall production rate, and/or ultimate recoveries may be reduced.

To detect uneven flow conditions, production and heater wells may be instrumented with sensors. Sensors may include equipment to measure temperature, pressure, flow rates, and/or compositional information. Data from these sensors can be processed via simple rules or input to detailed simulations to reach decisions on how to adjust heater and production wells to improve subsurface performance. Production well performance may be adjusted by controlling backpressure or throttling on the well. Heater well performance may also be adjusted by controlling energy input. Sensor readings may also sometimes imply mechanical problems with a well or downhole equipment which requires repair, replacement, or abandonment.

In one embodiment, flow rate, compositional, temperature and/or pressure data are utilized from two or more wells as inputs to a computer algorithm to control heating rate and/or production rates. Unmeasured conditions at or in the neighborhood of the well are then estimated and used to control the well. For example, in situ fracturing behavior and kerogen maturation are estimated based on thermal, flow, and compositional data from a set of wells. In another example, well integrity is evaluated based on pressure data, well temperature data, and estimated in situ stresses. In a related embodiment the number of sensors is reduced by equipping only a subset of the wells with instruments, and using the results to interpolate, calculate, or estimate conditions at uninstrumented wells. Certain wells may have only a limited set of sensors (e.g., wellhead temperature and pressure only) where others have a much larger set of sensors (e.g., wellhead temperature and pressure, bottomhole temperature and pressure, production composition, flow rate, electrical signature, casing strain, etc.).

As noted above, there are various methods for applying heat to an organic-rich rock formation. For example, one method may include electrical resistance heaters disposed in a wellbore or outside of a wellbore. One such method involves the use of electrical resistive heating elements in a cased or uncased wellbore. Electrical resistance heating involves directly passing electricity through a conductive material such that resistive losses cause it to heat the conductive material. Other heating methods include the use of downhole combustors, in situ combustion, radio-frequency (RF) electrical energy, or microwave energy. Still others include injecting a hot fluid into the oil shale formation to directly heat it. The hot fluid may or may not be circulated. One method may include generating heat by burning a fuel external to or within a subsurface formation. For example, heat may be supplied by surface burners or downhole burners or by circulating hot fluids (such as methane gas or naphtha) into the formation through, for example, wellbores via, for example, natural or artificial fractures. Some burners may be configured to perform flameless combustion. Alternatively, some methods may include combusting fuel within the formation such as via a natural distributed combustor, which generally refers to a heater that uses an oxidant to oxidize at least a portion of the carbon in the formation to generate heat, and wherein the oxidation takes place in a vicinity proximate to a wellbore. The present methods are not limited to the heating technique employed unless so stated in the claims.

One method for formation heating involves the use of electrical resistors in which an electrical current is passed through a resistive material which dissipates the electrical energy as heat. This method is distinguished from dielectric heating in which a high-frequency oscillating electric current induces electrical currents in nearby materials and causes them to heat. The electric heater may include an insulated conductor, an elongated member disposed in the opening, and/or a conductor disposed in a conduit. An early patent disclosing the use of electrical resistance heaters to produce oil shale in situ is U.S. Pat. No. 1,666,488. The '488 patent issued to Crawshaw in 1928. Since 1928, various designs for downhole electrical heaters have been proposed. Illustrative designs are presented in U.S. Pat. No. 1,701,884, U.S. Pat. No. 3,376,403, U.S. Pat. No. 4,626,665, U.S. Pat. No. 4,704,514, and U.S. Pat. No. 6,023,554).

A review of application of electrical heating methods for heavy oil reservoirs is given by R. Sierra and S. M. Farouq Ali, *"Promising Progress in Field Application of Reservoir Electrical Heating Methods"*, Society of Petroleum Engineers Paper 69709, 2001. The entire disclosure of this reference is hereby incorporated by reference.

Certain previous designs for in situ electrical resistance heaters utilized solid, continuous heating elements (e.g., metal wires or strips). However, such elements may lack the necessary robustness for long-term, high temperature applications such as oil shale maturation. As the formation heats and the oil shale matures, significant expansion of the rock occurs. This leads to high stresses on wells intersecting the formation. These stresses can lead to bending and stretching of the wellbore pipe and internal components. Cementing (e.g., U.S. Pat. No. 4,886,118) or packing (e.g., U.S. Pat. No. 2,732,195) a heating element in place may provide some protection against stresses, but some stresses may still be transmitted to the heating element.

As an alternative, international patent publication WO 2005/010320 teaches the use of electrically conductive fractures to heat the oil shale. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation along longitudinal, horizontal planes formed by horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity.

The WO 2005/010320 process creates an "in situ toaster" that artificially matures oil shale through the application of electric heat. Thermal conduction heats the oil shale to conversion temperatures in excess of 300° C. causing artificial maturation. The oil and gas generated by maturing the oil shale are then produced by conventional methods.

International patent publication WO 2005/045192 teaches an alternative heating means that employs the circulation of a heated fluid within an oil shale formation. In the process of WO 2005/045192 supercritical heated naphtha may be circulated through fractures in the formation. This means that the oil shale is heated by circulating a dense, hot hydrocarbon vapor through sets of closely-spaced hydraulic fractures. In one aspect, the fractures are horizontally formed and conventionally propped. Fracture temperatures of 320°-400° C. are maintained for up to five to ten years. Vaporized naptha may be the preferred heating medium due to its high volumetric heat capacity, ready availability and relatively low degradation rate at the heating temperature. In the WO 2005/045192 process, as the kerogen matures, fluid pressure will drive the generated oil to the heated fractures, where it will be produced with the cycling hydrocarbon vapor.

The purpose for heating the organic-rich rock formation is to pyrolyze at least a portion of the solid formation hydrocarbons to create hydrocarbon fluids. The solid formation hydrocarbons may be pyrolyzed in situ by raising the organic-rich rock formation, (or zones within the formation), to a pyrolyzation temperature. In certain embodiments, the temperature of the formation may be slowly raised through the pyrolysis temperature range. For example, an in situ conversion process may include heating at least a portion of the organic-rich rock formation to raise the average temperature of the zone above about 270° C. at a rate less than a selected amount (e.g., about 10° C., 5° C.; 3° C., 1° C., 0.5° C., or 0.1° C.) per day. In a further embodiment, the portion may be heated such that an average temperature of the selected zone may be less than about 375° C. or, in some embodiments, less than about 400° C. The formation may be heated such that a temperature within the formation reaches (at least) an initial pyrolyzation temperature (e.g., a temperature at the lower end of the temperature range where pyrolyzation begins to occur).

The pyrolysis temperature range may vary depending on the types of formation hydrocarbons within the formation, the heating methodology, and the distribution of heating sources. For example, a pyrolysis temperature range may include temperatures between about 270° C. and about 800° C. Alternatively, the bulk of the target zone of the formation may be heated to between 300° to 600° C. In an alternative embodiment, a pyrolysis temperature range may include temperatures between about 270° C. to about 500° C.

Preferably, for in situ processes the heating of a production zone takes place over a period of months, or even four or more years. Alternatively, the formation may be heated for one to fifteen years, alternatively, 3 to 10 years, 1.5 to 7 years, or 2 to 5 years. Preferably, the bulk of the target zone is ultimately heated to a temperature below 400° C. (752° F.).

In certain embodiments of the methods of the present invention, downhole burners may be used to the heat a targeted oil shale zone. Downhole burners of various design have been discussed in the patent literature for use in oil shale and other largely solid hydrocarbon deposits. Examples include U.S. Pat. No. 2,887,160; U.S. Pat. No. 2,847,071; U.S. Pat. No. 2,895,555; U.S. Pat. No. 3,109,482; U.S. Pat. No. 3,225,829; U.S. Pat. No. 3,241,615; U.S. Pat. No. 3,254,721; U.S. Pat. No. 3,127,936; U.S. Pat. No. 3,095,031; U.S. Pat. No. 5,255,742; and U.S. Pat. No. 5,899,269. Downhole burners operate through the transport of a combustible fuel (typically natural gas) and an oxidizer (typically air) to a subsurface position in a wellbore. The fuel and oxidizer react downhole to generate heat. The combustion gases are removed (typically by transport to the surface, but possibly via injection into the formation). Oftentimes, downhole burners utilize pipe-in-pipe arrangements to transport fuel and oxidizer downhole, and then to remove the flue gas back up to the surface. Some downhole burners generate a flame, while others may not.

The use of downhole burners is an alternative to another form of downhole heat generation called steam generation. In downhole steam generation, a combustor in the well is used to boil water placed in the wellbore for injection into the formation. Applications of the downhole heat technology have been described in F. M. Smith, *"A Down-hole Burner—Versatile Tool for Well Heating,"* 25th Technical Conference on Petroleum Production, Pennsylvania State University, pp 275-285 (Oct. 19-21, 1966); H. Brandt, W. G. Poynter, and J. D. Hummell, "Stimulating Heavy Oil Reservoirs with Downhole Air-Gas Burners," World Oil, pp. 91-95 (September 1965); and C. I. DePriester and A. J. Pantaleo, "Well Stimulation by Downhole Gas-Air Burner," Journal of Petroleum Technology, pp. 1297-1302 (December 1963).

Downhole burners have advantages over electrical heating methods due to the reduced infrastructure cost. In this respect, there is no need for an expensive electrical power plant and distribution system. Moreover, there is increased thermal efficiency because the energy losses inherently experienced during electrical power generation are avoided.

Few applications of downhole burners exist due to various design issues. Downhole burner design issues include temperature control and metallurgy limitations. In this respect, the flame temperature can overheat the tubular and burner hardware and cause them to fail via melting, thermal stresses, severe loss of tensile strength, or creep. Certain stainless steels, typically with high chromium content, can tolerate temperatures up to ~700° C. for extended periods. (See for example H. E. Boyer and T. L. Gall (eds.), *Metals Handbook*, "Chapter 16: Heat-Resistant Materials", American Society for Metals, (1985.) The existence of flames can cause hot spots within the burner and in the formation surrounding the burner. This is due to radiant heat transfer from the luminous portion of the flame. However, a typical gas flame can produce temperatures up to about 1,650° C. Materials of construction for the burners must be sufficient to withstand the temperatures of these hot spots. The heaters are therefore more expensive than a comparable heater without flames.

For downhole burner applications, heat transfer can occur in one of several ways. These include conduction, convection, and radiative methods. Radiative heat transfer can be particularly strong for an open flame. Additionally, the flue gases can be corrosive due to the $CO_2$ and water content. Use of refractory metals or ceramics can help solve these problems, but typically at a higher cost. Ceramic materials with acceptable strength at temperatures in excess of 900° C. are generally high alumina content ceramics. Other ceramics that may be useful include chrome oxide, zirconia oxide, and magnesium oxide based ceramics. Additionally, depending on the nature of the downhole combustion $NO_x$ generation may be significant.

Heat transfer in a pipe-in-pipe arrangement for a downhole burner can also lead to difficulties. The down going fuel and air will heat exchange with the up going hot flue gases. In a well there is minimal room for a high degree of insulation and hence significant heat transfer is typically expected. This cross heat exchange can lead to higher flame temperatures as the fuel and air become preheated. Additionally, the cross heat exchange can limit the transport of heat downstream of the burner since the hot flue gases may rapidly lose heat energy to the rising cooler flue gases.

In the production of oil and gas resources, it may be desirable to use the produced hydrocarbons as a source of power for ongoing operations. This may be applied to the development of oil and gas resources from oil shale. In this respect, when electrically resistive heaters are used in connection with in situ shale oil recovery, large amounts of power are required.

Electrical power may be obtained from turbines that turn generators. It may be economically advantageous to power the gas turbines by utilizing produced gas from the field. However, such produced gas must be carefully controlled so not to damage the turbine, cause the turbine to misfire, or generate excessive pollutants (e.g., $NO_x$).

One source of problems for gas turbines is the presence of contaminants within the fuel. Contaminants include solids, water, heavy components present as liquids, and hydrogen sulfide. Additionally, the combustion behavior of the fuel is important. Combustion parameters to consider include heating value, specific gravity, adiabatic flame temperature, flammability limits, autoignition temperature, autoignition delay time, and flame velocity. Wobbe Index (WI) is often used as a key measure of fuel quality. WI is equal to the ratio of the lower heating value to the square root of the gas specific gravity. Control of the fuel's Wobbe Index to a target value and range of, for example, ±10% or ±20% can allow simplified turbine design and increased optimization of performance.

Fuel quality control may be useful for shale oil developments where the produced gas composition may change over the life of the field and where the gas typically has significant amounts of $CO_2$, CO, and $H_2$ in addition to light hydrocarbons. Commercial scale oil shale retorting is expected to produce a gas composition that changes with time.

Inert gases in the turbine fuel can increase power generation by increasing mass flow while maintaining a flame temperature in a desirable range. Moreover inert gases can lower flame temperature and thus reduce $NO_x$ pollutant generation. Gas generated from oil shale maturation may have significant $CO_2$ content. Therefore, in certain embodiments of the production processes, the $CO_2$ content of the fuel gas is adjusted via separation or addition in the surface facilities to optimize turbine performance.

Achieving a certain hydrogen content for low-BTU fuels may also be desirable to achieve appropriate burn properties. In certain embodiments of the processes herein, the $H_2$ content of the fuel gas is adjusted via separation or addition in the surface facilities to optimize turbine performance. Adjustment of $H_2$ content in non-shale oil surface facilities utilizing low BTU fuels has been discussed in the patent literature (e.g., U.S. Pat. No. 6,684,644 and U.S. Pat. No. 6,858,049, the entire disclosures of which are hereby incorporated by reference).

The process of heating formation hydrocarbons within an organic-rich rock formation, for example, by pyrolysis, may generate fluids. The heat-generated fluids may include water which is vaporized within the formation. In addition, the action of heating kerogen produces pyrolysis fluids which tend to expand upon heating. The produced pyrolysis fluids may include not only water, but also, for example, hydrocarbons, oxides of carbon, ammonia, molecular nitrogen, and molecular hydrogen. Therefore, as temperatures within a heated portion of the formation increase, a pressure within the heated portion may also increase as a result of increased fluid generation, molecular expansion, and vaporization of water. Thus, some corollary exists between subsurface pressure in an oil shale formation and the fluid pressure generated during pyrolysis. This, in turn, indicates that formation pressure may be monitored to detect the progress of a kerogen conversion process.

The pressure within a heated portion of an organic-rich rock formation depends on other reservoir characteristics. These may include, for example, formation depth, distance from a heater well, a richness of the formation hydrocarbons within the organic-rich rock formation, the degree of heating, and/or a distance from a producer well.

It may be desirable for the developer of an oil shale field to monitor formation pressure during development. Pressure within a formation may be determined at a number of different locations. Such locations may include, but may not be limited to, at a wellhead and at varying depths within a wellbore. In some embodiments, pressure may be measured at a producer well. In an alternate embodiment, pressure may be measured at a heater well. In still another embodiment, pressure may be measured downhole of a dedicated monitoring well.

The process of heating an organic-rich rock formation to a pyrolysis temperature range not only will increase formation pressure, but will also increase formation permeability. The pyrolysis temperature range should be reached before substantial permeability has been generated within the organic-rich rock formation. An initial lack of permeability may prevent the transport of generated fluids from a pyrolysis zone within the formation. In this manner, as heat is initially transferred from a heater well to an organic-rich rock formation, a fluid pressure within the organic-rich rock formation may increase proximate to that heater well. Such an increase in fluid pressure may be caused by, for example, the generation of fluids during pyrolysis of at least some formation hydrocarbons in the formation.

Alternatively, pressure generated by expansion of pyrolysis fluids or other fluids generated in the formation may be allowed to increase. This assumes that an open path to a production well or other pressure sink does not yet exist in the formation. In one aspect, a fluid pressure may be allowed to increase to or above a lithostatic stress. In this instance, fractures in the hydrocarbon containing formation may form when the fluid pressure equals or exceeds the lithostatic stress. For example, fractures may form from a heater well to a production well. The generation of fractures within the heated portion may reduce pressure within the portion due to the production of produced fluids through a production well.

Once pyrolysis has begun within an organic-rich rock formation, fluid pressure may vary depending upon various factors. These include, for example, thermal expansion of hydrocarbons, generation of pyrolysis fluids, rate of conversion, and withdrawal of generated fluids from the formation. For example, as fluids are generated within the formation, fluid pressure within the pores may increase. Removal of generated fluids from the formation may then decrease the fluid pressure within the near wellbore region of the formation.

In certain embodiments, a mass of at least a portion of an organic-rich rock formation may be reduced due, for example, to pyrolysis of formation hydrocarbons and the production of hydrocarbon fluids from the formation. As such, the permeability and porosity of at least a portion of the formation may increase. Any in situ method that effectively produces oil and gas from oil shale will create permeability in what was originally a very low permeability rock. The extent to which this will occur is illustrated by the large amount of expansion that must be accommodated if fluids generated from kerogen are unable to flow. The concept is illustrated in FIG. 5.

Figure 5:
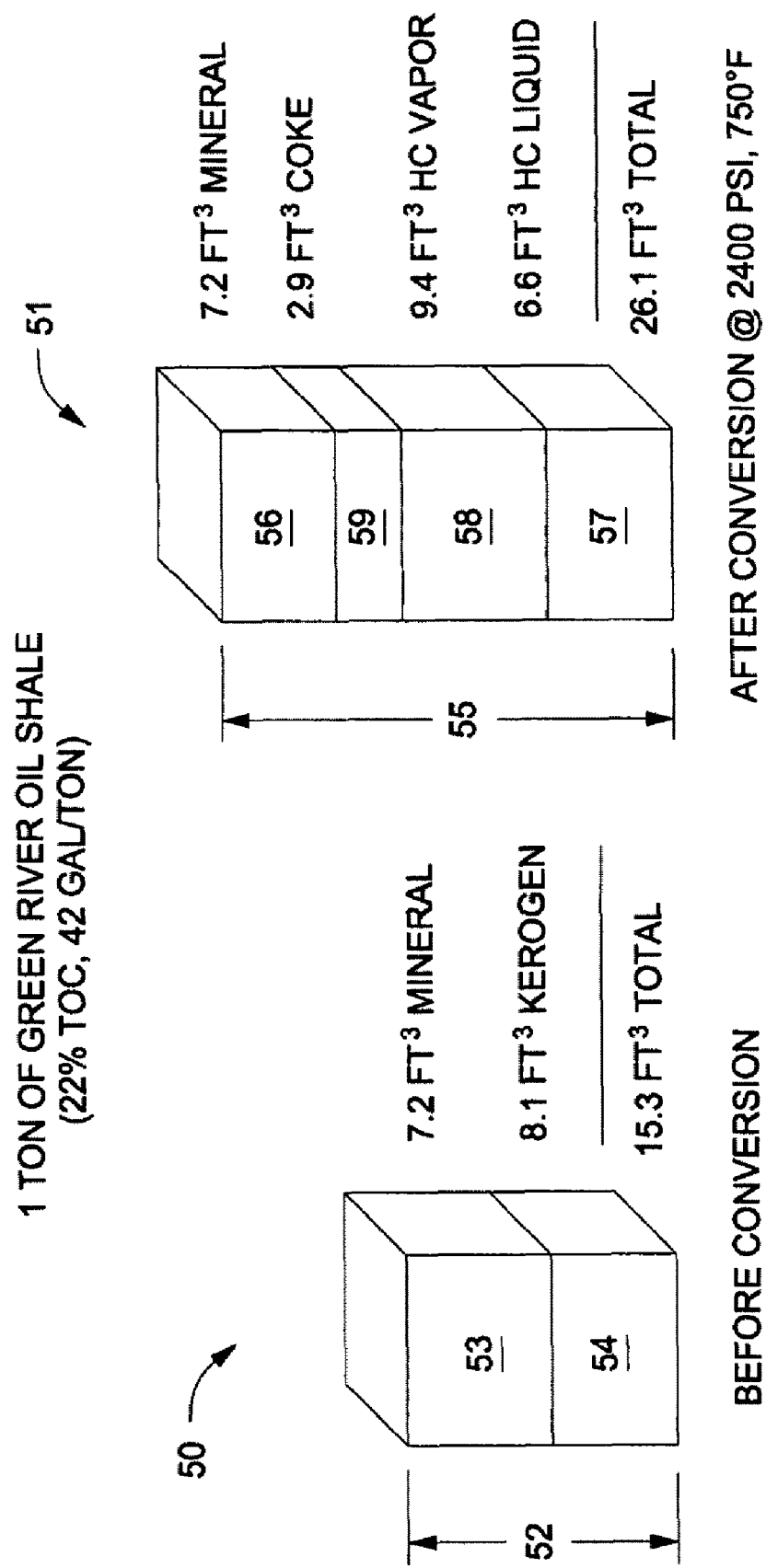
FIG. 5 is a bar chart comparing one ton of Green River oil shale before and after a simulated in situ, pyrolysis process.

FIG. 5 provides a bar chart comparing one ton of Green River oil shale before 50 and after 51 a simulated in situ, retorting process. The simulated process was carried out at 2,400 psi and 750° F. on oil shale having a total organic carbon content of 22 wt. % and a Fisher assay of 42 gallons/ton. Before the conversion, a total of 15.3 ft$^3$ of rock matrix 52 existed. This matrix comprised 7.2 ft$^3$ of mineral 53, i.e., dolomite, limestone, etc., and 8.1 ft$^3$ of kerogen 54 imbedded within the shale. As a result of the conversion the material expanded to 26.1 ft$^3$ 55. This represented 7.2 ft$^3$ of mineral 56 (the same number as before the conversion), 6.6 ft$^3$ of hydrocarbon liquid 57, 9.4 ft$^3$ of hydrocarbon vapor 58, and 2.9 ft$^3$ of coke 59. It can be seen that substantial volume expansion occurred during the conversion process. This, in turn, increases permeability of the rock structure.

In an embodiment, heating a portion of an organic-rich rock formation in situ to a pyrolysis temperature may increase permeability of the heated portion. For example, permeability may increase due to formation of thermal fractures within the heated portion caused by application of heat. As the temperature of the heated portion increases, water may be removed due to vaporization. The vaporized water may escape and/or be removed from the formation. In addition, permeability of the heated portion may also increase as a result of production of hydrocarbon fluids from pyrolysis of at least some of the formation hydrocarbons within the heated portion on a macroscopic scale.

Certain embodiments may include increasing a permeability of at least a portion of an organic-rich rock formation to greater than about 0.01, 0.1, 1, 10, 20 and/or 50 Darcy. In addition, certain embodiments may include substantially uniformly increasing the permeability of at least a portion of a organic-rich rock formation. Some embodiments may include increasing the porosity of at least a portion of a organic-rich rock formation substantially uniformly.

Certain systems and methods described herein may be used to treat formation hydrocarbons in at least a portion of a relatively low permeability formation (e.g., in "tight" formations that contain formation hydrocarbons). Such formation hydrocarbons may be heated to pyrolyze at least some of the formation hydrocarbons in a selected zone of the formation. Heating may also increase the permeability of at least a portion of the selected zone. Hydrocarbon fluids generated from pyrolysis may be produced from the formation, thereby further increasing the formation permeability.

Permeability of a selected zone within the heated portion of the organic-rich rock formation may also rapidly increase while the selected zone is heated by conduction. For example, permeability of an impermeable organic-rich rock formation may be less than about 0.1 millidarcy before heating. In some embodiments, pyrolyzing at least a portion of organic-rich rock formation may increase a permeability within a selected zone of the portion to greater than about 10 millidarcies, 100 millidarcies, 1 Darcy, 10 Darcies, 20 Darcies, or 50 Darcies. Therefore, a permeability of a selected zone of the portion may increase by a factor of more than about 10, 100, 1,000, 10,000, or 100,000. In one embodiment, the organic-rich rock formation has an initial total permeability less than 1 millidarcy, alternatively less than 0.1 or 0.01 millidarcies, before heating the organic-rich rock formation. In one embodiment, the organic-rich rock formation has a post heating total permeability of greater than 1 millidarcy, alternatively, greater than 10, 50 or 100 millidarcies, after heating the organic-rich rock formation.

In connection with heating the organic-rich rock formation, the organic-rich rock formation may optionally be fractured to aid heat transfer or hydrocarbon fluid production. In one instance, fracturing may be accomplished naturally by creating thermal fractures within the formation through application of heat. Thermal fracture formation is caused by thermal expansion of the rock and fluids and by chemical expansion of kerogen transforming into oil and gas. Thermal fracturing can occur both in the immediate region undergoing heating, and in cooler neighboring regions. The thermal fracturing in the neighboring regions is due to propagation of fractures and tension stresses developed due to the expansion in the hotter zones. Thus, by both heating the organic-rich rock and transforming the kerogen to oil and gas, the permeability is increased not only from fluid formation and vaporization, but also via thermal fracture formation. The increased permeability aids fluid flow within the formation and production of the hydrocarbon fluids generated from the kerogen.

In addition, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability and/or be used to provide an extended geometry for a heater well. The U.S. Pat. No. 7,331,385 patent incorporated above describes such a method.

It is believed that once oil and gas are generated during the pyrolysis process, the hydrocarbon fluids will be able to migrate to a production well. This is true even though the oil shale (or other organic-rich rock) formation is initially virtually impermeable. The expectation is that permeability will be created during the heating process. This occurs through two phenomena: (1) the conversion of solid kerogen to a fluid hydrocarbon state, and (2) differential thermal expansion within the rock matrices.

First, the conversion of solid kerogen to a fluid hydrocarbon means that the solid rock matrix is softened. This, in turn, creates permeability in the rock that did not previously exist. The fracture formation process is enhanced by pressure buildup in the oil shale formation occurring as part of the kerogen conversion process. As kerogen is converted to fluid form, a pore pressure is created which further acts against the rock and which can exceed the fracture pressure. This pressure buildup further adds to the presence of beneficial fractures in situ.

Second, thermal expansion in the heated portions of the rock will cause stresses in unheated (or less heated) portions of the subsurface formation that will create fractures. This, in turn, forms pathways for hydrocarbon fluids to flow to production wells.

To confirm the likelihood of thermally-induced stresses within a subsurface formation and to examine the magnitudes of such stresses, a thermal-mechanical finite element model was built using ABAQUS™ software. The ABAQUS™ software was used to develop the concept of in situ stresses and resulting fractures. To run the model, a formation had to be selected and then initialized with certain mechanical properties.

Figure 6:
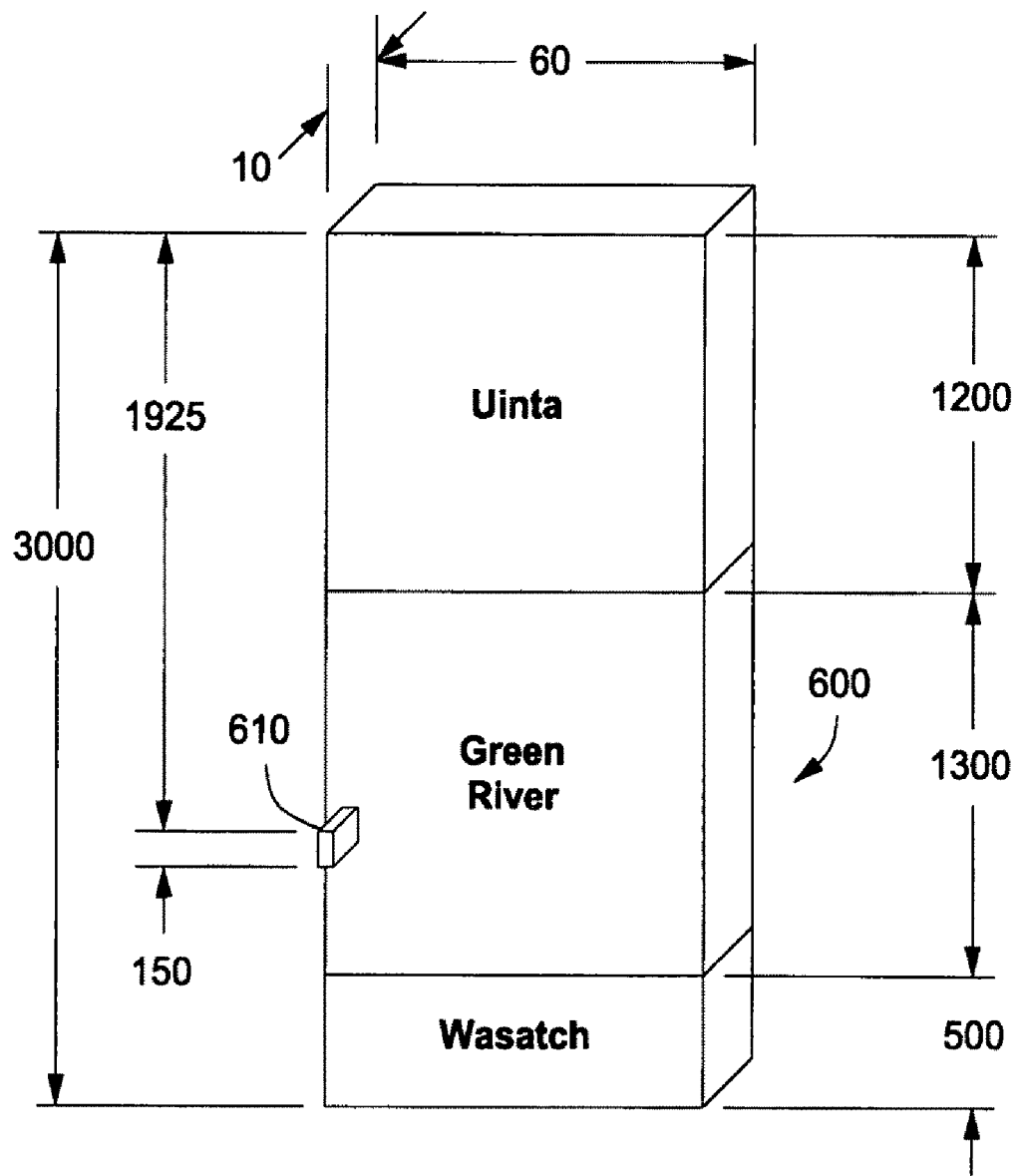
FIG. 6 is a diagram showing a selected portion of a formation to be analyzed in a finite element geomechanical model. The selected portion is in the Green River Formation of the Piceance Basin.

FIG. 6 shows a schematic of a formation 600 that was selected for testing with the finite element model. For this model, the Green River Formation of the Piceance Basin was analyzed. As shown in FIG. 6, the Green River Formation 600 is bounded by the Uinta Formation above, and the Wasatch Formation below. The Uinta Formation represents an overburden of approximately 1,200 feet, while the Wasatch Formation represents an underburden of about 500 feet. Within the Green River Formation 600, a 150 foot section 610 was modeled at a selected depth of 1,925 feet. The selected section 610 is considered to be a heated, or "treated," section, and was 10 feet in width.

Rocks above and below the treated interval 610 are included in the model, from surface to a depth of 3,000 feet. The model is a 10-foot slice along a 1,200-foot long heating fracture, and is effectively two-dimensional. The 1,200 foot dimension is perpendicular to the model images. Because the 1,200 foot dimension is long, a 2-D model can be used. It is sized such that the right hand side of the model is the likely position of a production well.

Table 1, below, shows various mechanical properties assumed for the formations of FIG. 6. Nominal physical properties were assigned to the rocks in the model based on their stratigraphic interval. Elastic moduli and Poisson ratios were taken from the mechanical stratigraphy developed for predicting fracture orientation. Elastic moduli and Poisson ratios were estimated based on interpreted lithologies for the rocks included in the model. In addition, the thermal expansion coefficient for each formation is shown. It is noted, however, that the thermal expansion coefficient is only of significance for the treated section 610 in the Green River Formation 600 since this is the only heated interval. The value for the thermal expansion coefficient was chosen to conservatively represent the rock expansion of this dominantly carbonate system. A much higher value could be justified based on the expected kerogen conversion.

TABLE 1

| | Formation | | |
|---|---|---|---|
| | Uinta | Green River | Wasatch |
| Modulus of Elasticity | 1.77e6 psi | 2.3e6 psi | 2.24e6 psi |
| Poisson Ration | 0.254 | 0.2 | 0.264 |
| Expansion Coefficient | $1e-5°\,F.^{-1}$ | $1e-5°\,F.^{-1}$ | $1e-5°\,F.^{-1}$ |

Figure 7B:
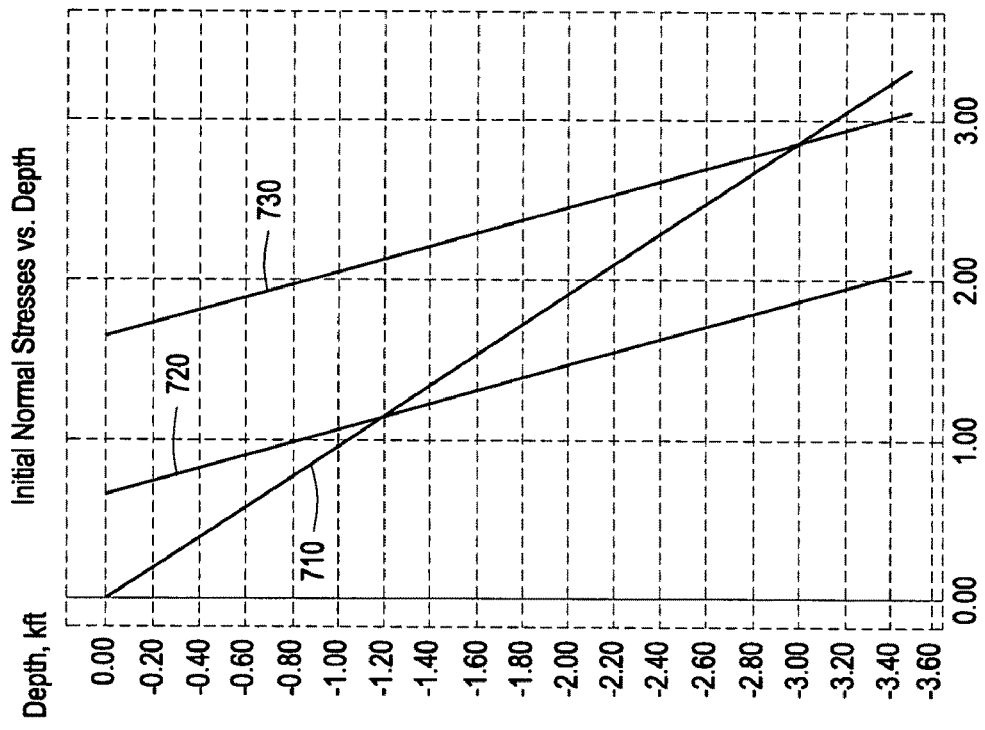
FIG. 7B is a graph charting depth versus stresses acting on the Formation from FIG. 6. This graph demonstrates the initialization of stresses in a model of the Formation.
Figure 7A:
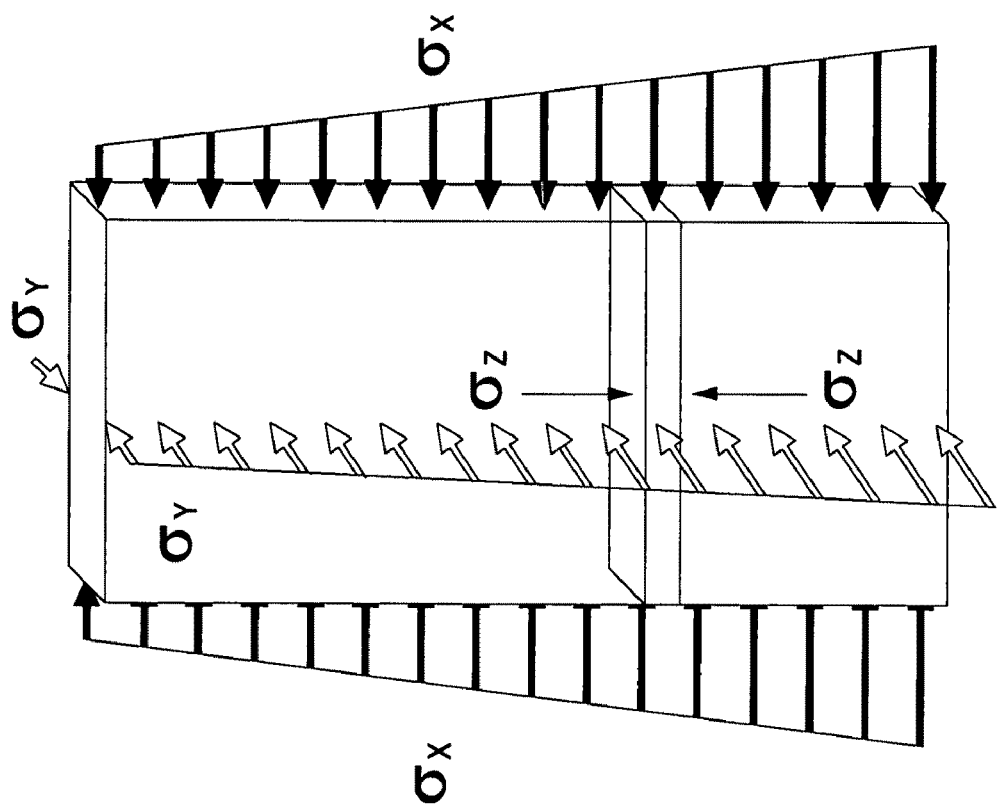
FIG. 7A is a cross-sectional diagram of the Green River Formation from FIG. 6. Stresses acting on the Formation are indicated.

Initialization of the finite element model is further illustrated in FIGS. 7A and 7B. FIG. 7A provides a schematic of the Formation 600 from FIG. 6. Stresses in the "x", "y" and "z" directions are indicated. Using the model, the stresses were initialized to be representative of the stresses in the Piceance Basin.

FIG. 7B compares initial normal stresses in the Green River Formation 600 versus depth. The stresses are shown in three lines: the z-stress line (shown at 710), the x-stress line (shown at 720), and the y-stress line (shown at 730). At the surface, stresses in the z-direction 710 are at 0 psi. These stresses 710 increase linearly down to 3,000 feet. On the way down, the z-stresses 710 intersect the stress lines for the x-direction 720 and the y-direction 730. The z-stress line 710 intersects the x-stress line 720 at about 1,100 feet, while the z-stress line 710 intersects the y-stress line 730 at about 2,800 feet.

It is noted that the x-stress line 720 and the y-stress line 730 have about the same slope. However, the y-stress line 730 is offset from the x-stress line 720, indicating greater stresses. In the case of the Green River Formation, this is due to the tectonic forces of the Rocky Mountain range to the east.

The intersection of the z-stress line 710 with the x-stress line 730 has a mechanical effect on thermal stresses. It is believed that artificially induced fractures, such as hydraulic fractures, above 1,100 feet will form substantially horizontally. However, hydraulic fractures below about 1,100 feet will occur substantially vertically. Thus, the least principle stress at the formation fracture depth is believed to be in the x-direction, perpendicular to a hydraulically induced fracture.

After initializing the model, a heat conduction simulation was used to assign a temperature history to each calculation node in the model. A five year heating period was applied, with sufficient heat input to convert 162.5 feet of oil shale. In this respect, a heating rate of 162.5 feet/5 years was applied. Within this five year period, thermal stresses were simulated at three months (FIG. 8), one year (FIG. 9), 2.5 years (FIG. 10) and five years (FIG. 11). The model uses these calculation nodes to track the development of thermal stresses over time.

Figure 8:
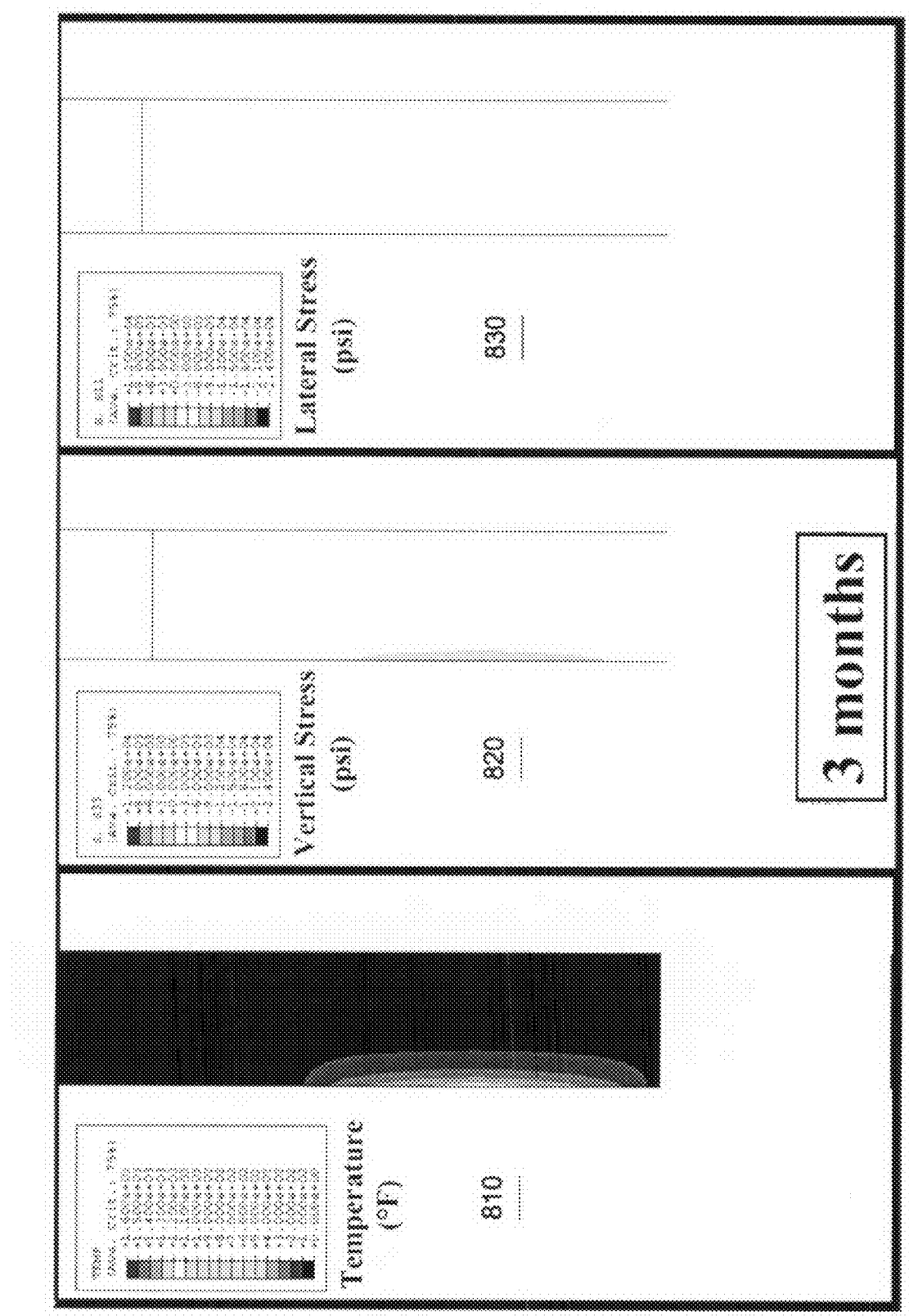
FIG. 8 is a thermal stress calculation from the finite element model on the selected portion of the formation from FIG. 6. The calculation shows the stress state of the formation after heating or "treating" the selected portion of the formation for three months.

In FIG. 8, thermally-induced stresses are depicted after three months of heating. FIG. 8 includes a left panel (seen at 810), a center panel (shown at 820), and a right panel (presented at 830). In FIG. 8, the left panel 810 represents a temperature distribution within the treated area 610; the center panel 820 is the vertical normal stress in the treated area 610; and the right panel 830 is the lateral normal stress, which is the x-direction 720. For the left panel 810, temperatures are measured in ° F.; for the center 820 and right 830 panels, stresses are given in psi.

As seen in the left panel 810, the treated area 610 has not been heated all the way to the right side of the model (representing a production well). This indicates a very partial heating of the treated area 610. Vertical stresses 820 and lateral stresses 830 do not appear to be affected by the early heating process 810. This would indicate that three months of heating will not induce thermal fractures. The heaters have a specified heat input rather than a specified temperature. The heat input is enough to convert 162.5 feet over 5 years.

Figure 9:
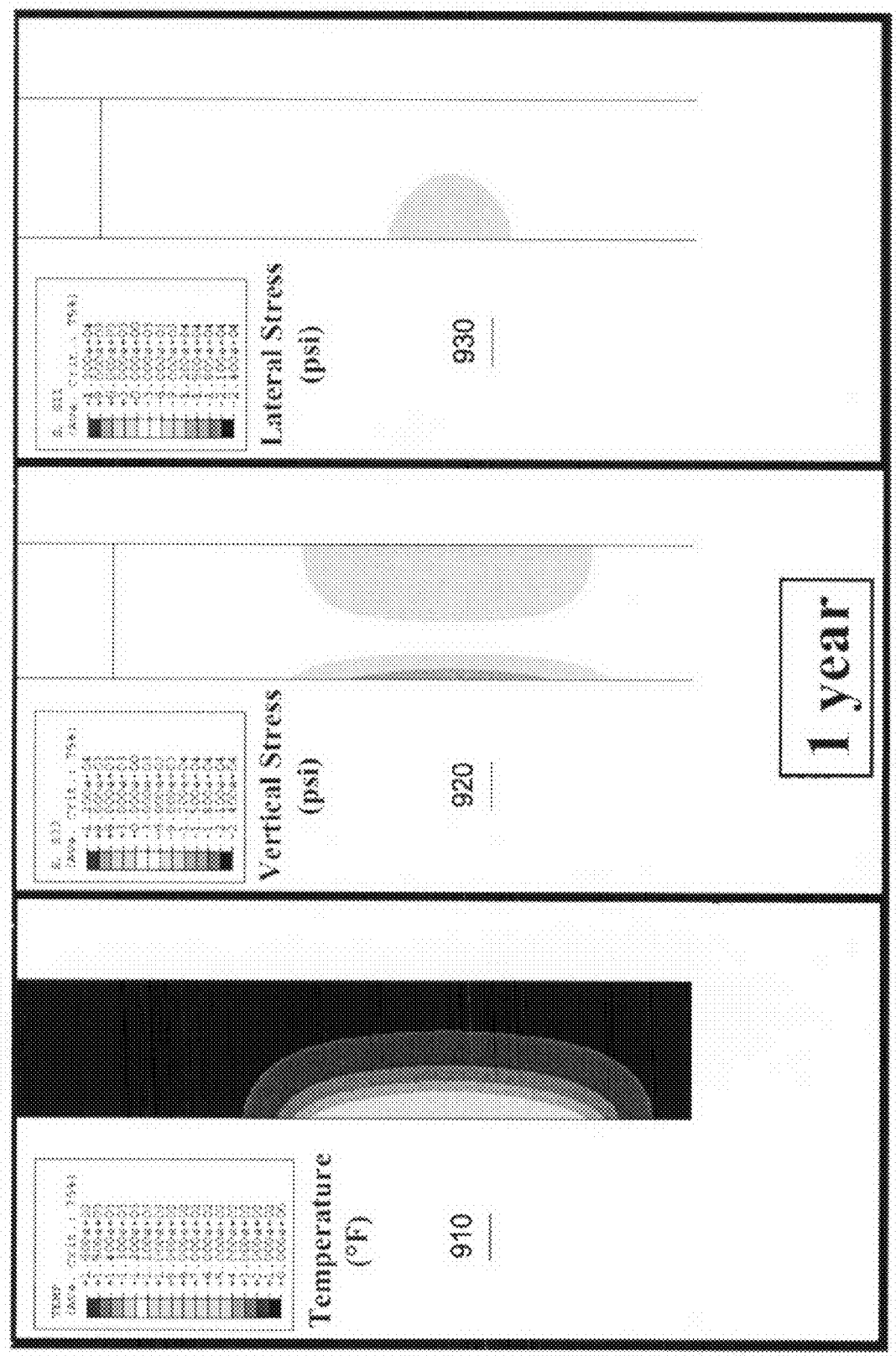
FIG. 9 is a thermal stress calculation from the finite element model on the selected portion of the formation from FIG. 6. The calculation shows the stress state of the formation after heating or "treating" the selected portion of the formation for one year.

Moving now to FIG. 9, this Figure depicts thermally-induced stresses after one year of heating. As with FIG. 8, FIG. 9 includes a left panel (seen at 910), a center panel (shown at 920), and a right panel (presented at 930). The left panel 910 again represents a temperature distribution within the treated area 610, while the center 920 and right 930 panels depict stresses in the treated area 610. As seen in the left panel 910, the treated area 610 still has not been heated all the way through to the right side of the model, although a heat front has emanated about halfway. However, vertical stress 920 strongly indicates that the rock is in tension. Most rock does not withstand tension well. Therefore, it is likely that thermal fracture formation is taking place.

Figure 10:
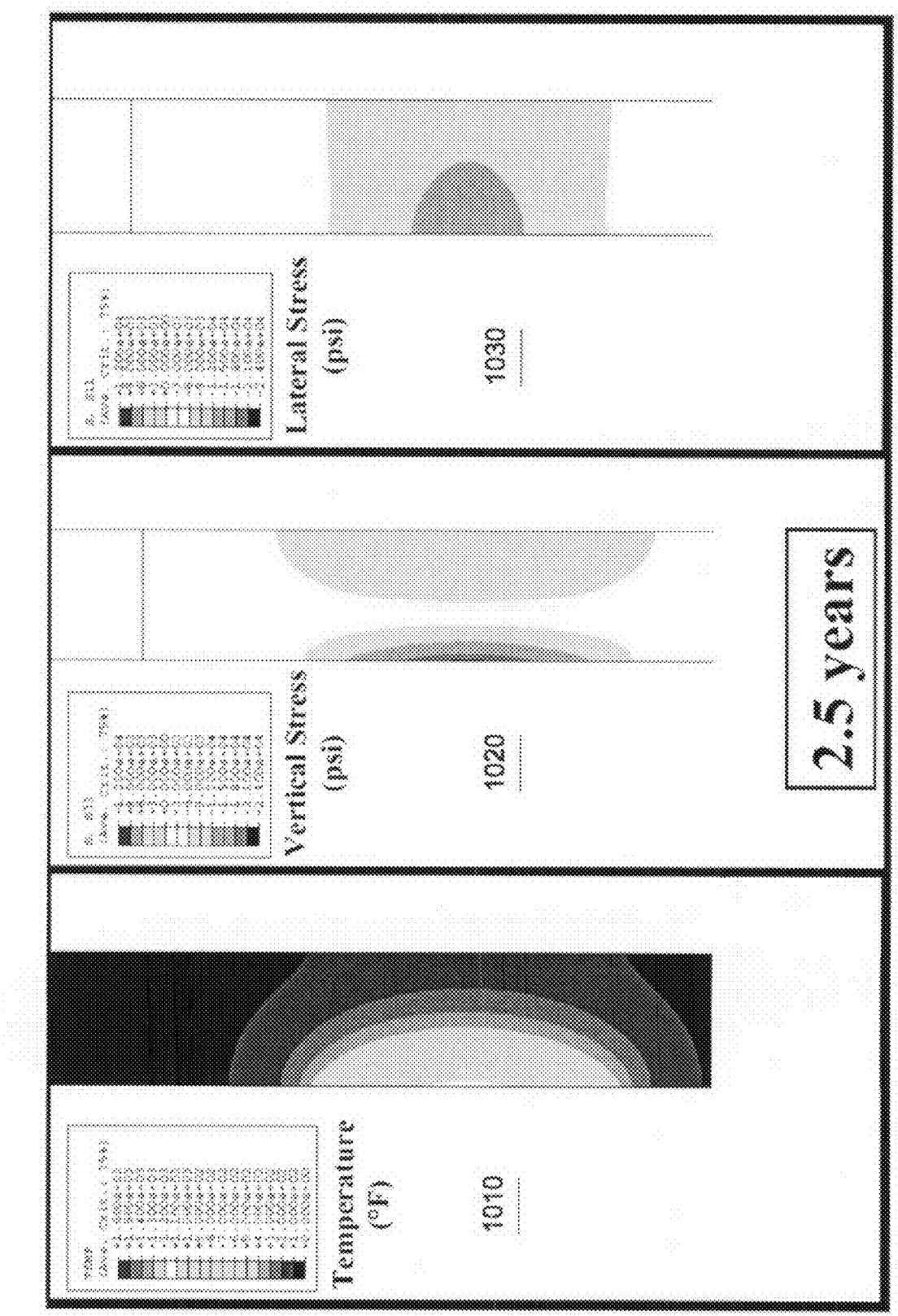
FIG. 10 is a thermal stress calculation for the finite element model on the selected portion of the formation from FIG. 6. The calculation shows the stress state of the formation after heating or "treating" the selected portion of the formation for two and one-half years.
Figure 11:
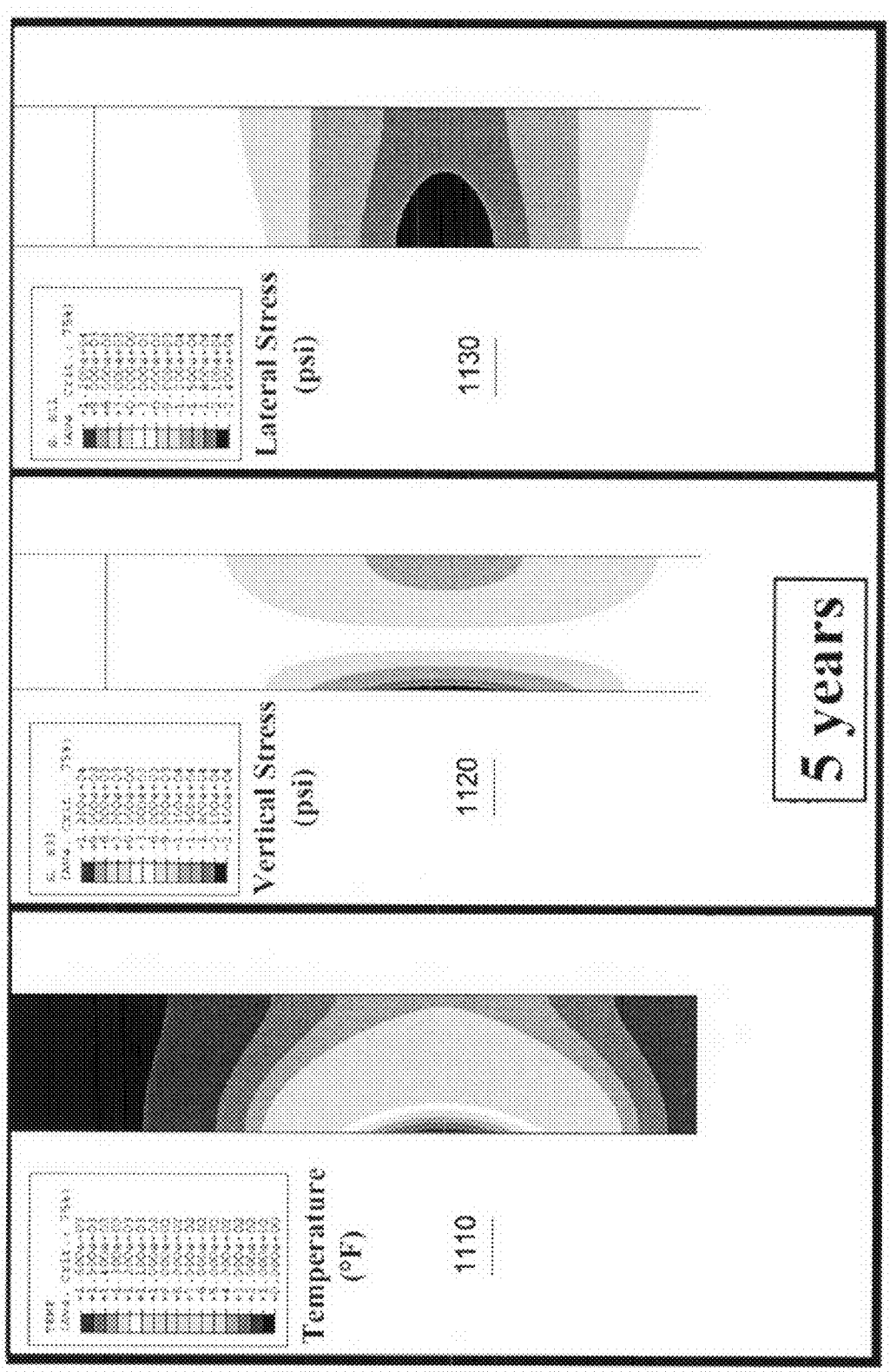
FIG. 11 is a thermal stress calculation for the finite element model on the selected portion of the formation from FIG. 6. The calculation shows the stress state of the formation after heating or "treating" the selected portion of the formation for five years.

Moving now to FIG. 10, this Figure shows thermally-induced stresses after two and one-half years of heating. As with FIG. 9, FIG. 10 includes a left panel (seen at 1010), a center panel (shown at 1020), and a right panel (presented at 1030). The left panel 1010 again represents a temperature distribution within the treated area 610, while the center 1020 and right 1030 panels depict thermally-induced stresses in the treated area 610.

It can be seen in the left panel 1010 that the heat front has extended all the way through the treated area 610, to the production well. The temperature continues to increase through the formation. Vertical stresses 1020 remain significant. More significantly, lateral stresses 1030 have substantially increased.

Finally, FIG. 11 shows thermally-induced stresses in the treated area 610 after five years of heating. As with FIG. 9, FIG. 11 includes a left panel (seen at 1110), a center panel (shown at 1120), and a right panel (presented at 1130). The left panel 1110 again represents a temperature distribution within the treated area 610, while the center 1120 and right 1130 panels depict stresses in the treated area 610.

It can be seen in the left panel 1110 that the temperature gradient in the treated area 610 continues to increase. Vertical stresses 1120 and lateral stresses 1130 continue to increase. This demonstrates a considerable likelihood of thermally induced fracturing, in situ.

Several observations are made from the results of FIGS. 8-11. First, a significant portion of the oil shale formation experiences vertical tensile stresses. The calculated stresses exceed several thousand psi. These will almost certainly cause horizontal fractures as a result of heating. These fractures will provide a pathway for oil and gas into production wells. It is also observed that these large stresses exist even with a conservative assumption about the oil shale coefficient of expansion. If a more realistic estimate is made which takes into account the effects of kerogen conversion, the calculated tensile stresses would reach even higher levels earlier in the process.

Figure 12:
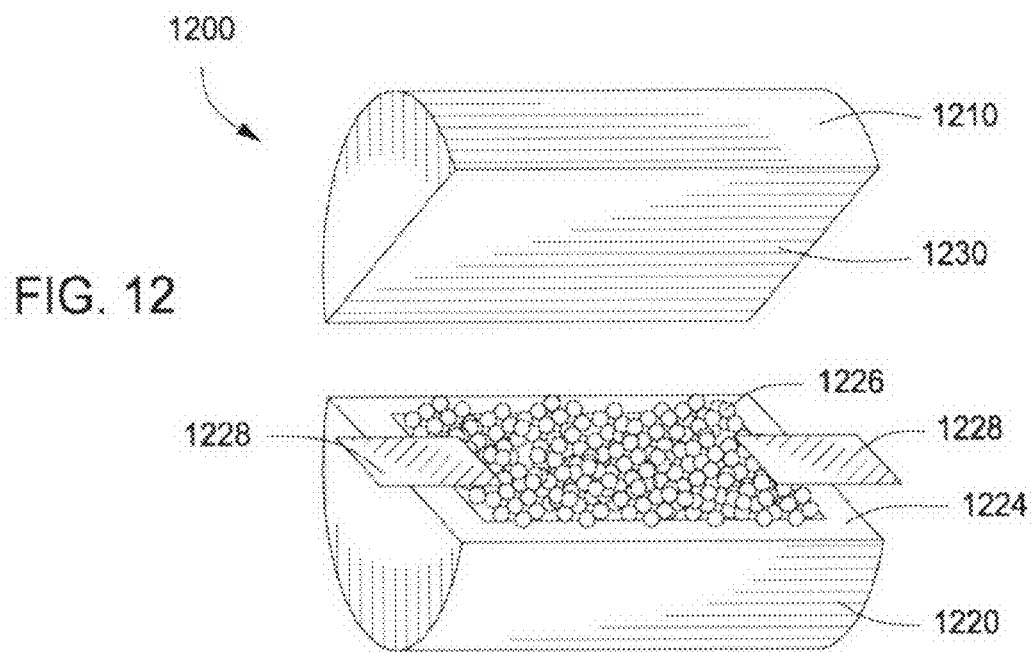
FIG. 12 is a perspective view of an oil shale core sample. The sample has been sawn in half longitudinally, forming upper and lower halves.

In order to further confirm the likelihood of thermal stresses, a small scale heating experiment was conducted on an oil shale core sample. FIG. 12 shows an illustration of an oil shale sample 1200 used for testing. The core sample 1200 was a three-inch long plug of oil shale with a diameter of 1.39 inches. The bedding of the oil shale was perpendicular to the core 1200 axis.

A resistive heat was applied to the sample 1200 in order to test the sample 1200 for fracture formation. To do this, the sample 1200 was sawn into an upper longitudinal half 1210 and a lower longitudinal half 1220 to create a fracture plane 1230. A ¹⁄₁₆-inch tray was milled onto an exposed surface 1224 of the lower half 1220. The tray was used to pack a layer of conductive proppant 1226. Cast steel shot was used as the proppant 1226. The conductive proppant 1226 comprised four to five layers of steel balls. A current was then directed longitudinally through the proppant 1226 to generate resistive heat through the sample 1200.

A small hole (not shown) was drilled in one half of the sample 1200 in order to accommodate a thermocouple. The thermocouple was used to measure the temperature in the sample 1200 during heating. The thermocouple was positioned roughly one-third of the sample 1200 radius away from the simulated fracture plane.

Before applying the current, the unmilled upper half 1210 of the oil shale core 1200 was placed on top of the conductive proppant pack 1226, and the two halves 1210, 1220 of the sample 1020 were clamped together. The sample 1200 with clamps (seen at 1310 in FIG. 13) was then placed in a pressure-sealed heating vessel. Electrical current was run through the simulated fracture to generate the heat necessary to convert some of the oil shale making up the sample 1200.

During heating, the sample 1200 was loaded into a Parr heating vessel (not shown) charged with Argon at 500 psi. The Parr vessel was used only as a pressurized chamber in this experiment; all the heat was generated internally by the electrical resistance applied to the conductive proppant 1226. Power was supplied using a "Variac" transformer. The power dissipated in the simulated fracture was not sufficient to heat the oil shale uniformly, but because of the oil shale's limited thermal conductivity, relatively high temperatures were achieved near the simulated fracture face 1230. Effectively, a pseudo-steady-state was attained in which the heat generated in the fracture 1230 was conducted out of the sample 1200, causing a large temperature gradient between the fracture 1230 and the exterior of the sample 1000. As a result, the rock near the fracture face 1230 reached temperatures necessary to convert the kerogen to oil and gas. This was indicated by the thermocouple measurements made during the experiment and the recovery of oil from the Parr vessel at the end of the experiment.

To pass a current through the conductive steel shot proppant 1226, strips of brass 1228 were used as electrical connectors. The connectors 1228 were placed into a circuit, and the current was applied. An electrical current of 18-19 amps was applied over a period of five hours. During this time, the power consumption, electrical resistance and temperature at the thermocouple embedded in the sample 1200 were recorded.

After heating, the sample 1200 was permitted to cool to room temperature for handling and analysis. The sample 1200 was removed from the vessel. Along with the sample 1000, 0.15 ml of oil was recovered from the heating vessel.

Figure 13:
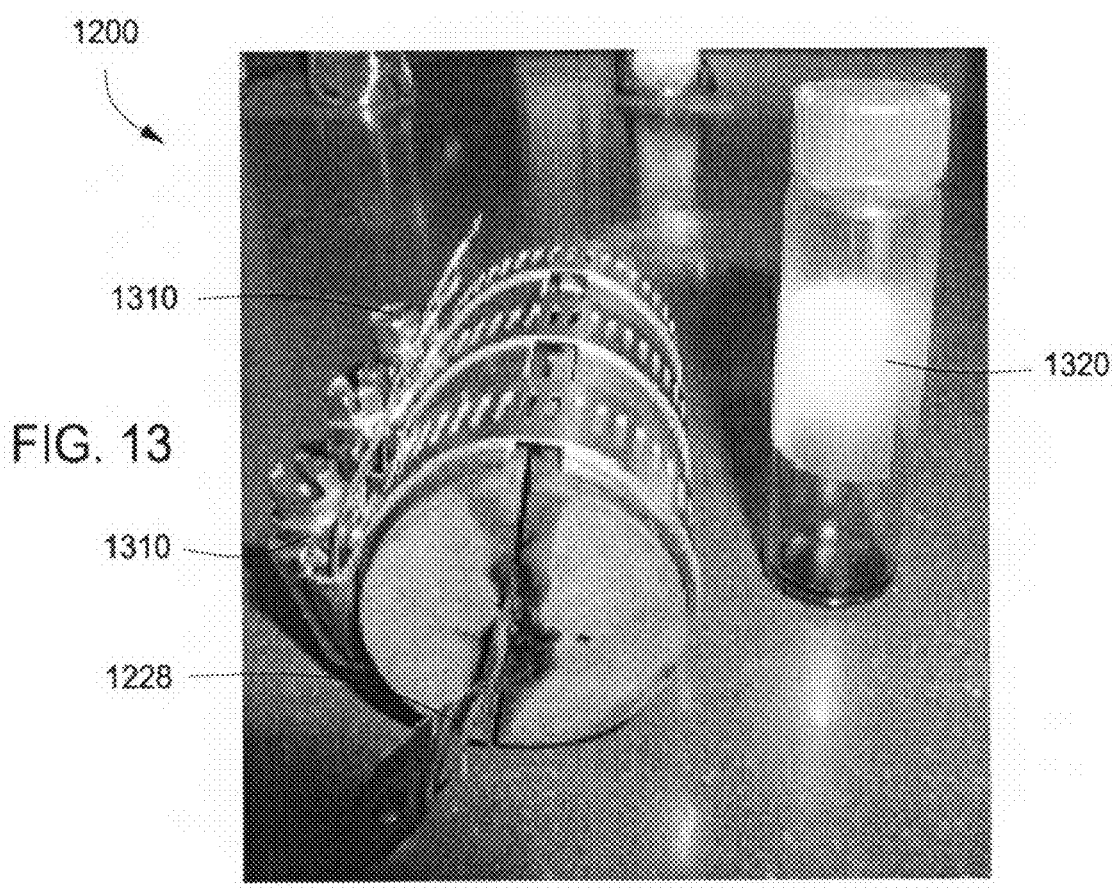
FIG. 13 is a photograph of the oil shale core sample of FIG. 12, but after heating. A small vial holding collected oil is seen.

FIG. 13 provides a photograph that shows the sample 1200 having been removed from the vessel. The sample 1200 remains within the clamps 1310. The photograph also shows a small vial 1320 containing the recovered oil.

Figure 14:
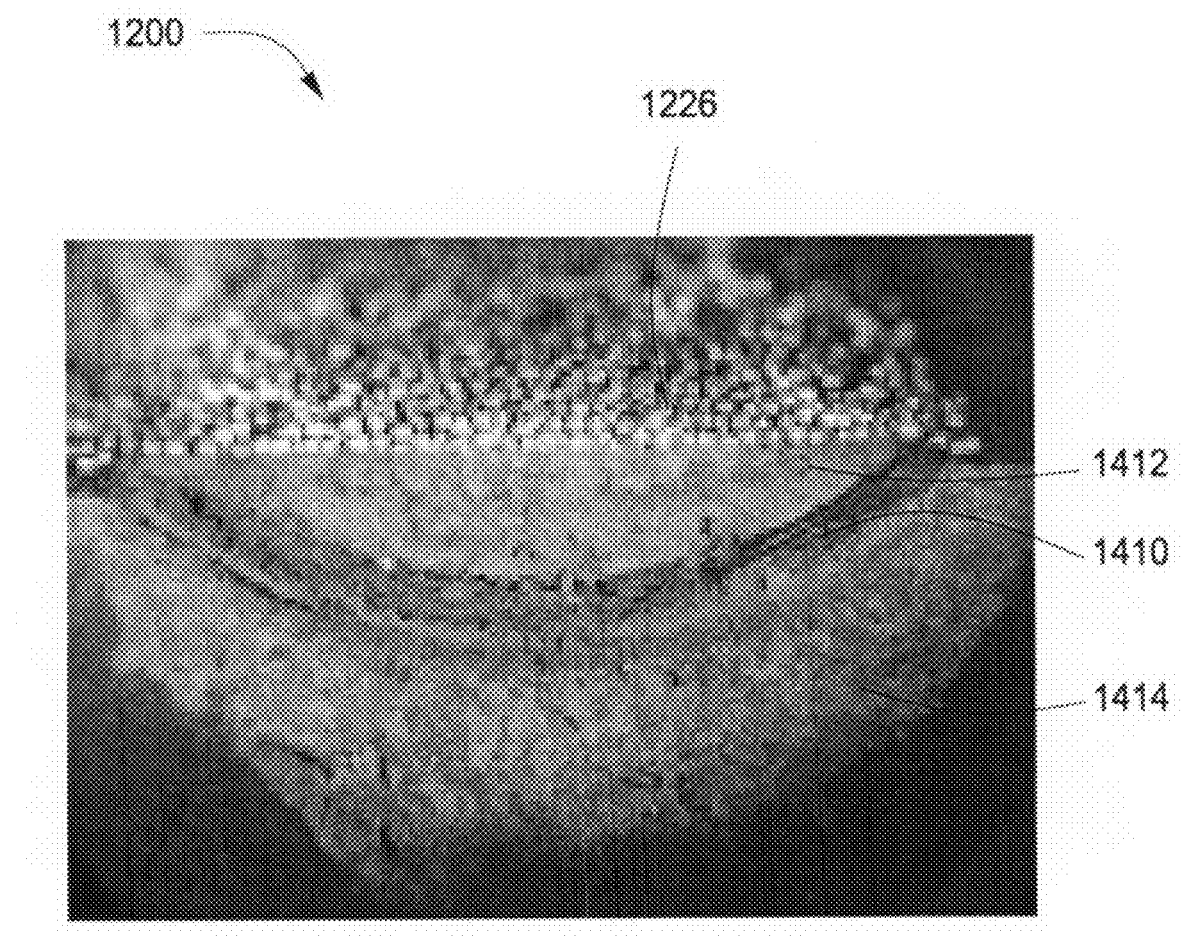
FIG. 14 is a photograph of a cross-section of the oil shale core sample of FIG. 13. A line is visible distinguishing an inner portion of the sample that has been heated from an outer portion that has not.

Next, the clamps were removed from the sample 1200. The upper 1210 and lower 1220 halves of the sample 1200 were separated to expose the fracture face 1230. FIG. 14 provides a photograph showing a portion of the fracture face 1230. Visible in this photograph are some of the steel shot 1226. Of interest, a boundary 1410 between converted 1412 and unconverted 1414 material is clearly visible.

Figures 15A, 15B:
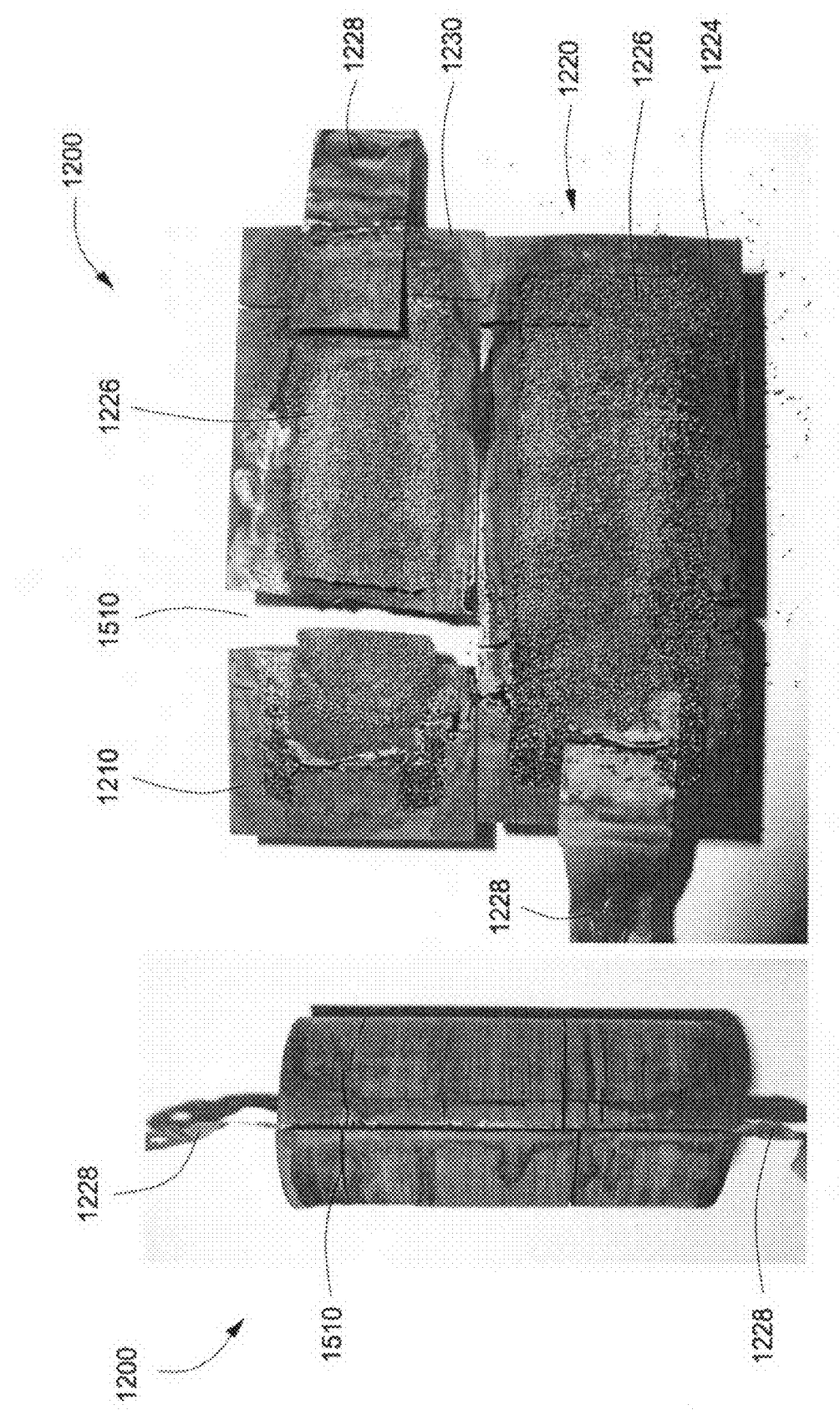
FIG. 15A is another photograph of the oil shale core sample after heating. The outer surface of the sample is visible, including horizontal, thermally induced fractures.
FIG. 15B is a photograph of the oil shale core sample of FIG. 15A. Here, the clamps have been removed from the sample, and the sample is laid open. A clean horizontal fracture is visible.

Of even greater interest, a number of cracks formed transverse to the fracture face 1230, shown in FIGS. 15A and 15B. First, FIG. 15A provides another photograph of the sample 1200. This photograph is taken of the intact sample 1200, that is, with the upper 1210 and lower 1220 halves of the sample 1200 moved back together. From this photograph, one particularly significant crack can be seen, shown at 1510. FIG. 15B shows the sample 1200 opened up again to expose the full cut face 1230. Crack 1510 and other cracks are again visible. It is believed that the cracks, such as crack 1510, formed as a result of axial thermal expansion near the fracture plane 1230 of the sample 1200. Axial thermal expansion resulted in axial tensile stresses farther away from the fracture plane 1230. Such cracks would provide a pathway for oil and gas generated in the conversion process.

Figure 16:
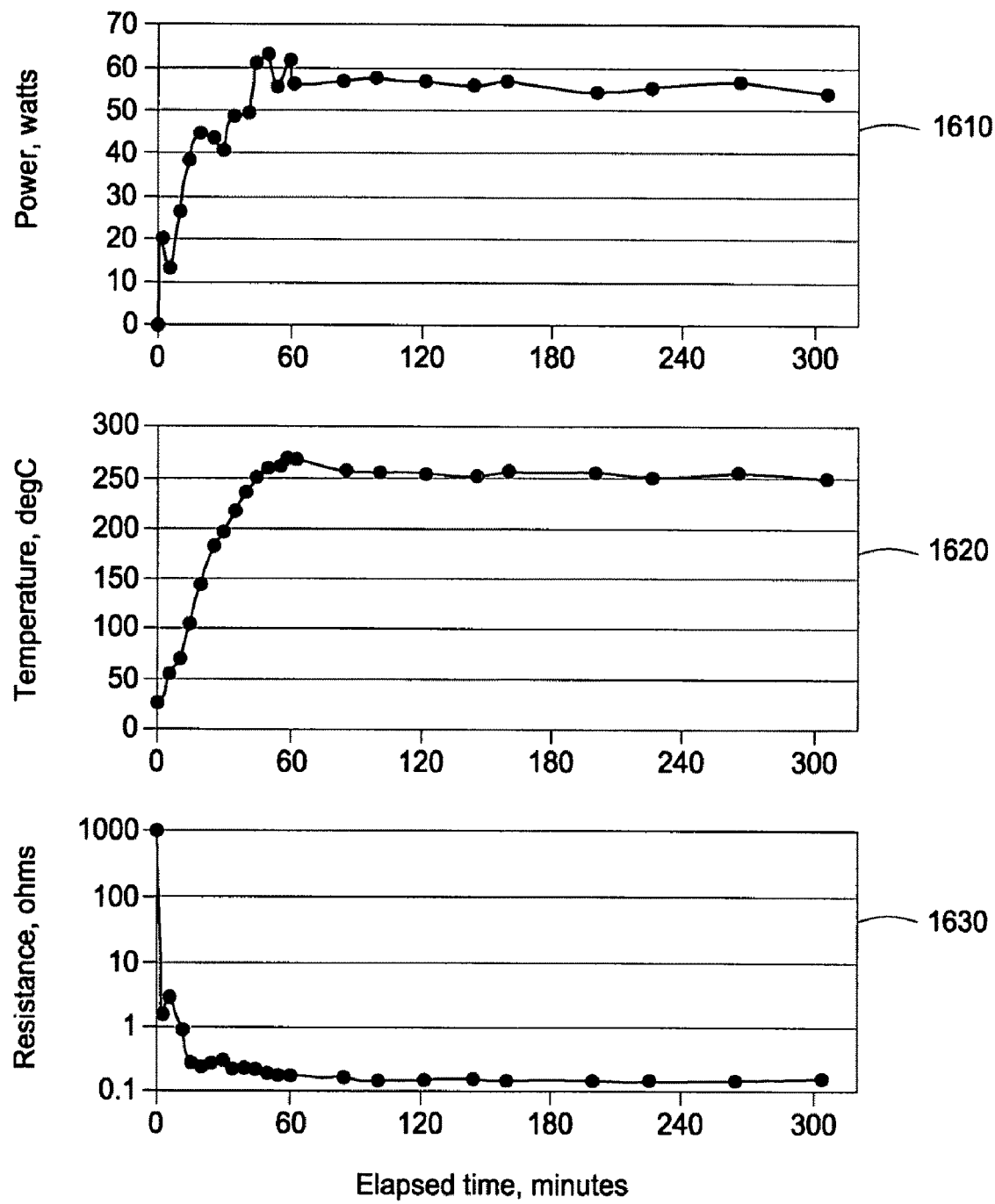
FIG. 16 is a series of plots for variables of the heated oil shale core sample against time during heating. The variables include power applied through the sample, temperature within the sample, and resistance applied through the sample.

As noted, during the heating period the power consumption, electrical resistance and temperature at the thermocouple embedded in the sample 1200 were recorded. FIG. 16 provides graphs showing power consumption 1610, temperature 1620, and electrical resistance 1630 recorded as a function of time. A key result here is the resistance 1630, which after the initial heat-up of the fracture plane 1230, remained relatively constant between 0.15 and 0.2 ohms. At no time during the experiment was a loss of electrical continuity observed. The initial bench-top resistance of the sample was about 822 ohms. After the sample 1200 had cooled and was removed from the Parr vessel, its resistance was 49 ohms. Another key result shown in FIG. 16 is the temperature 1620, which reached a maximum value of 268° C. during the experiment. From this value we infer that the temperature near the simulated fracture face 1230 should have reached a value of 350-400° C. This value is sufficient to cause pyrolysis.

The finite element model and the small-scale oil shale test discussed above demonstrate that thermal stresses within an oil shale formation can cause fractures and create permeability in unheated portions of the rock. It is also believed from these experiments that fractures created during a kerogen conversion process will open up in primarily a horizontal orientation. While the formation of fractures is desirable, the existence of fractures in only one plane means that interconnectivity between the flowpaths is limited. Therefore, it is desirable to connect the thermally formed, horizontal plane fractures with one or more artificially formed, vertical fractures.

Figure 17:
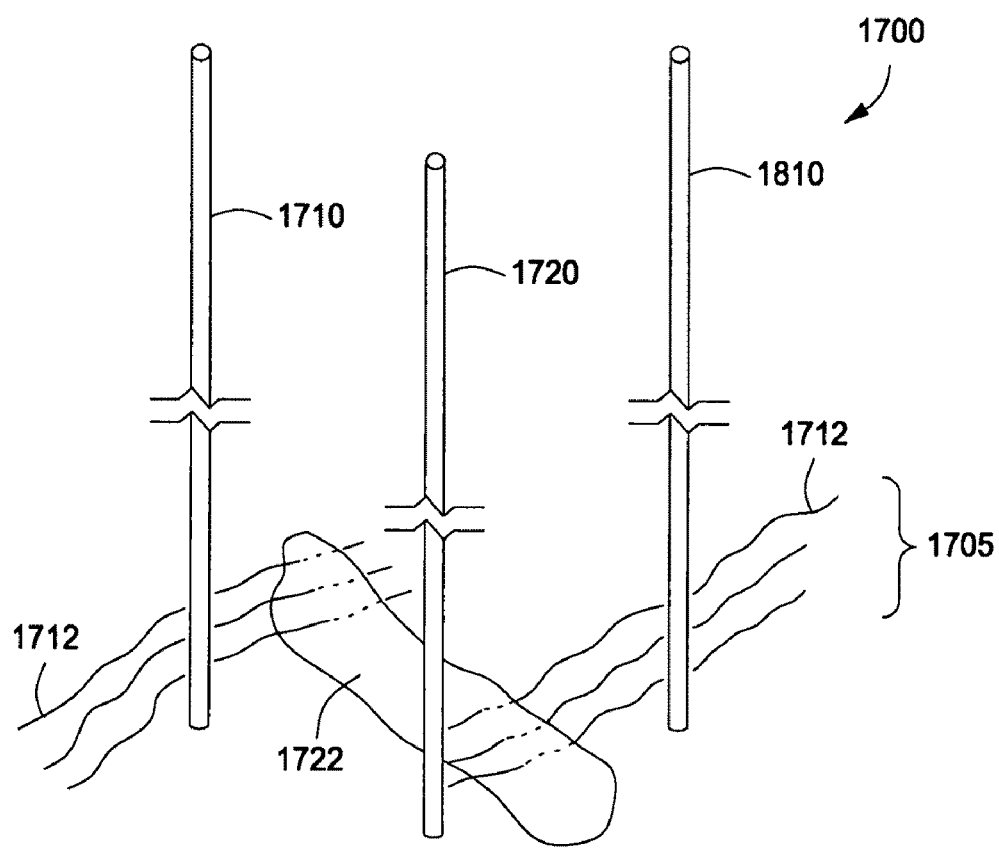
FIG. 17 provides a perspective view of an oil shale development area, in one embodiment. Here, two heater wells and a single production well are shown.

FIG. 17 presents a perspective view of a small portion of an oil shale development area 1700 designed to provide such interconnectivity. The development area 1700 is for the purpose of developing hydrocarbons from a subsurface oil shale formation, shown schematically by bracket 1705. The formation 1705 has a very limited permeability ab initio, e.g., less than 5 millidarcies. In order to develop the oil shale formation 1705, it is necessary to pyrolyze the solid hydrocarbons in the formation 1705. This is done by heating the formation 1705 above a pyrolysis temperature for an extended period of time. In order to do this, two heater wells are provided 1710. The illustrative heater wells 1710 are designed to provide resistive heat to the formation 1705. The resistive heat is generated longitudinally along the heater wells 1710 and substantially through the depth of the formation 1705. In one aspect, the heated portion of the oil shale formation 1705 has an average permeability of greater than 10 millidarcies after heating.

Offset from the heater wells 1710 is a substantially vertical production well 1720. The production well 1720 is in proximity to the heater wells 1710. In this manner, pyrolyzed hydrocarbon fluids can migrate from the heater wells 1710 to the production well 1720.

In the illustrative arrangement of FIG. 17, the development area 1700 has undergone heating. The application of thermal energy has caused a series of substantially horizontal, parallel cracks 1712 to form in the formation 1705. In the view of FIG. 17, the cracks 1712 appear linear; however, it is understood that the cracks are actually planar. The cracks 1712 may be formed from increased pore pressure that arises during the kerogen conversion process. The cracks 1712 may alternatively be formed as a result of thermal expansion within the rock matrices due to heating. Alternatively still, the cracks 1712 may arise as a result of temperature differential between heated and unheated portions of the formation 1712. It is expected that cracks 1712 will arise as a result of some combination of these factors.

In order to interconnect the horizontal cracks 1712 and in accordance with certain embodiments of the present invention, an artificial fracture 1722 is formed from the production well 1720. The artificial fracture is formed through any known means, preferably through the injection of fluids under pressure. Such means is referred to as hydraulic fracturing. As seen in FIG. 17, the hydraulic fracture 1722 opens up vertically. Based upon an analysis of geomechanical properties in the Piceance Basin, it is believed that the hydraulic fractures, particularly those below a depth of at least 1,100 feet, will open up substantially vertically rather than horizontally for most oil shale formations. It is believed from geomechanical modeling that approximately 80% of the oil shale in the Piceance Basin is in a stress state favoring vertical fractures. Such geomechanical modeling takes into account the direction of least principal stress. In one aspect, the artificial fractures are formed in the direction perpendicular to that of least principal stress in the oil shale formation. In one aspect, the depth of the oil shale formation is at least 1,000 feet.

In the arrangement 1700 of FIG. 17, it is shown that the hydraulic fracture 1722 from the production well 1720 intersects the cracks 1712 propagating from the two heater wells 1710. This provides improved interconnectivity between the cracks 1712, as well as improved permeability around the production well 1720. In both instances, pathways are formed for hydrocarbon fluids en route to the production well 1720.

It is preferred that the heater wells 1710 be activated in order to form cracks 1712 after the hydraulic fractures are formed from production wells 1720. It is possible that if fluids are injected into the formation 1705 in connection with hydraulic fracturing after the thermal cracks 1712 are formed, the fracturing fluids may preferentially travel through the cracks 1712 without providing the desired vertical interconnectivity. However, the methods of the present invention are not limited to the order of fracture formation. In one aspect, hydraulic fractures are formed within one to 24 months of beginning the heating process.

In general, a method is thus offered for producing hydrocarbon fluids from an organic-rich rock formation 1705. In one aspect, the method includes completing at least one heater well in the organic-rich rock formation, and also completing a production well in the organic-rich rock formation 1705. The method also includes the steps of hydraulically fracturing the organic-rich rock formation 1705 from the production well 1720 such that one or more artificial fractures 1722 are formed, and heating the organic-rich rock formation 1705 from the at least one heater well 1710, thereby pyrolyzing at least a portion of the organic-rich rock into hydrocarbon fluids This also serves to create thermal fractures 1712 in the formation 1705 due to thermal stresses from heating. The thermal fractures 1712 intersect the artificial fractures 1722 to provide interconnectivity of fractures for fluid flow.

As an additional step, a proppant material may be introduced into one or more of the artificial fractures 1722. As yet an additional step, hydrocarbons fluids may be produced from the production well 1720. Preferably, the organic rich rock formation 1705 comprises heavy hydrocarbons. More preferably, the organic rich rock formation is an oil shale formation.

It should be noted that the field arrangement 1700 of FIG. 17 is highly schematic. In actual practice, an oil shale development area will have numerous heater wells 1710 completed at or intersecting through the targeted subsurface formation 1705. As described in greater detail above, the heater wells 1710 may be arranged linearly, or may be arranged in patterns such as a 3-spot, 5-spot or 6-spot pattern. In addition, in actual practice an oil shale development area will have a plurality of production wells 1720 adjacent to or between the heater wells 1710.

It is also noted that in the arrangement 1700 of FIG. 17, both the heater wells 1710 and the production well 1720 are shown as having substantially vertical wellbores. However, the methods of the present invention are not limited to vertical wellbores.

Figure 18:
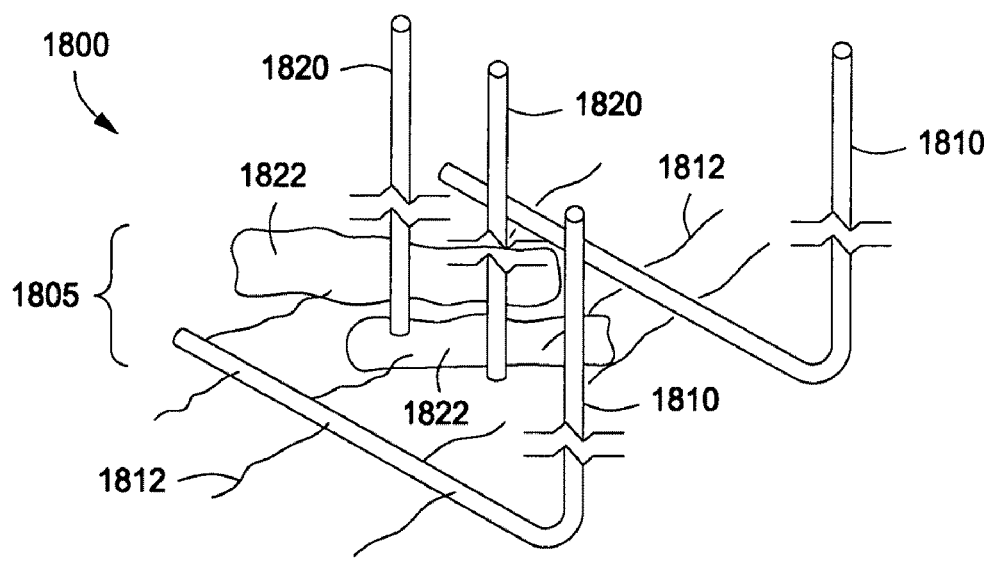
FIG. 18 provides a perspective view of an oil shale development area, in an alternate embodiment. Here, two heater wells and two production wells are shown.

FIG. 18 provides an alternate arrangement for an oil shale development area 1800. Development area 1800 includes at least two heater wells 1810 for heating a subsurface, organic rich rock formation 1805. Two production wells 1820 are also shown. As with development area 1700, development area 1800 has undergone heating in the subsurface formation 1805 by employing resistive heaters within the heater wells 1810. The heater wells 1810 have applied heat to the formation 1805 at sufficient temperature and for a sufficient period of time to cause the formation of thermal fractures in the formation 1805. Fractures are shown at 1812.

In the view of FIG. 18, the fractures 1812 appear linear. However, it is again understood that the fractures 1812 are actually planar and extend across the subsurface formation 1805 in a horizontal plane. The fractures 1812 may be formed from increased pore pressure that arises during the kerogen conversion process. The fractures 1812 may alternatively be formed as a result of thermal expansion within the rock matrices due to heating. Alternatively still, the fractures 1812 may arise as a result of temperature differential between heated and unheated portions of the formation 1805. It is expected that thermal fractures 1812 will arise as a result of some combination of these factors.

FIG. 18 also shows that hydraulic fractures 1822 have been formed from the production wells 1820. The artificial fractures are once again formed through any known means, but preferably through the injection of fluids under pressure. The hydraulic fractures 1822 open up vertically and extend to the thermal fractures 1812 so as to provide flowpaths for hydrocarbon fluids en route to the production wells 1820. In the view of FIG. 18, the vertical hydraulic fractures 1822 appear to be planar. However, in some instances the fractures 1822 may open up in different radial directions from the production wells 1820, such as by following the direction of perforations in the casing.

FIG. 18 demonstrates an alternate method for enhanced hydrocarbon fluids production from an oil shale formation. The method includes the steps of completing a production well 1820 substantially vertically, and hydraulically fracturing the oil shale formation 1805 from the production well 1820 in a vertical orientation such that artificial fractures are formed. The method also includes the steps of completing at least two heater wells 1810 that are substantially horizontal within the oil shale formation 1805, and then heating the oil shale formation in situ from the at least two heater wells 1810, thereby creating horizontal fractures 1812 due to thermal stresses within the oil shale formation 1805 which intersect the artificial fractures 1822, and also thereby converting at least a portion of the oil shale formation 1805 into hydrocarbon fluids by pyrolysis. Optionally, the method may further include producing hydrocarbon fluids from the production well.

Various other aspects may be provided to the above method. In one aspect, the one or more artificial fractures are formed primarily along the direction of least principal stress in the oil shale formation. In one embodiment, the vertical fractures are propped to have a permeability of at least 200 Darcy.

It may be desirable for an operator of an oil shale development to calculate a volume of fluids for injection into a production well, such as well 1720 or wells 1820. A correlation generally exists between the volume of fluids injected and the distance at which hydraulic fractures will propagate from an injection wellbore. In the current methods, an operator may wish to inject sufficient fluids to propagate hydraulic fractures at least 30 percent of the distance to the nearest heater well. Alternatively, such as distance may be at least 50% or at least 70% of the distance to the nearest heater well.

The distance may be determined by the expected distance or extent of thermal cracking away from heater wells, such as wells 1710 or 1810. If thermal cracking is expected to extend only a few feet out from a heater well, then a greater volume of fluids should be injected into a production well for hydraulic fracturing in an effort to reach closer to the heater wells. On the other hand, if cracking is expected to occur considerable distances from the heater wells, such as ten feet, twenty feet, or even 50 feet, then a smaller volume of hydraulic fluid may be needed during the artificial fracturing process.

The operator may also make an estimate as to the length of time in which cracking takes place. For instance, depending upon the temperature applied to the subsurface formation 1705 or 1805, thermal fracturing may not begin for three months, six months, one year, or even longer. The operator may wait during this period of time to hydraulically fracture production wells, knowing that full cracking has not yet taken place. In one model, the thermal fractures 1812 intersect at least one of the artificial fractures 1822 within one year of initiating heating.

Thus, a method of designing a well pattern for a hydrocarbon fluids production program is provided. In one aspect, the method includes the steps of estimating the extent of hydraulic fracturing from a production well completed through a subsurface formation, and also estimating the extent of thermal fractures as a result of heating the subsurface formation. The method also includes forming the production well through the subsurface formation, and heating the subsurface formation to form thermal fractures. Finally, the method includes hydraulically fracturing the subsurface formation from the production wellbore in order to intersect one or more of the thermal fractures.

In one aspect, the step of hydraulically fracturing the subsurface formation is performed within 6 to 24 months of beginning the heating of the subsurface formation. The step of estimating the extent of thermal fractures may comprise estimating the extent of thermal fractures during the 6 to 24 month period. The step of hydraulically fracturing the subsurface formation may further comprise injecting a proppant into the subsurface formation. In one aspect, the thermal fractures intersect fractures formed from hydraulically fracturing within one year of initiating heating. Thus it may be desirable to determine a zone of overlap between the thermal fractures and the hydraulic fractures.

It is noted here that the enhanced production methods described here may operate synergistically with certain heating techniques disclosed by Assignee in international patent publication WO 2005/010320, cited above. This patent application teaches the use of electrically conductive fractures to heat an oil shale formation. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation along longitudinal, vertical planes formed by horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity. Lateral heat conduction transfers heat to the oil shale adjacent to the vertical fractures, converting the kerogen to oil and gas. As applied to the enhanced production methods herein, vertical fractures would by hydraulically formed from vertical production wells in anticipation of intersecting thermal fractures that extend horizontally from the horizontal heater wells.

It is also noted that in some fields, thermal fracturing may not take place along a horizontal plane. Instead, depending upon in situ stresses, thermal fracturing may occur along a vertical plane. In that instance, it would be desirable to employ horizontal hydraulic fractures. In either instance, the enhanced production methods herein may include a step of performing geomechanical modeling to determine the direction and extent of thermal fractures. For instance, the heater wells and production wells may be hypothetical wells.

In connection with the production of hydrocarbons from a rock matrix, particularly those of shallow depth, a concern may exist with respect to earth subsidence. This is particularly true in the in situ heating of organic-rich rock where a portion of the matrix itself is thermally converted and removed. Initially, the formation may contain formation hydrocarbons in solid form, such as, for example, kerogen. The formation may also initially contain water-soluble minerals. Initially, the formation may also be substantially impermeable to fluid flow.

The in situ heating of the matrix pyrolyzes at least a portion of the formation hydrocarbons to create hydrocarbon fluids. This, in turn, creates permeability within a matured (pyrolyzed) organic-rich rock zone in the organic-rich rock formation. The combination of pyrolyzation and increased permeability permits hydrocarbon fluids to be produced from the formation. At the same time, the loss of supporting matrix material also creates the potential for subsidence relative to the earth surface.

In some instances, subsidence is sought to be minimized in order to avoid environmental or hydrogeological impact. In this respect, changing the contour and relief of the earth surface, even by a few inches, can change runoff patterns, affect vegetation patterns, and impact watersheds. In addition, subsidence has the potential of damaging production or heater wells formed in a production area. Such subsidence can create damaging hoop and compressional stresses on wellbore casings, cement jobs, and equipment downhole.

In order to avoid or minimize subsidence, it is proposed to leave selected portions of the formation hydrocarbons substantially unpyrolyzed. This serves to preserve one or more unmatured, organic-rich rock zones. In some embodiments, the unmatured organic-rich rock zones may be shaped as substantially vertical pillars extending through a substantial portion of the thickness of the organic-rich rock formation.

The heating rate and distribution of heat within the formation may be designed and implemented to leave sufficient unmatured pillars to prevent subsidence. In one aspect, heat injection wellbores are formed in a pattern such that untreated pillars of oil shale are left therebetween to support the overburden and prevent subsidence.

It is preferred that thermal recovery of oil and gas be conducted before any solution mining of nahcolite or other water-soluble minerals present in the formation. Solution mining can generate large voids in a rock formation and collapse breccias in an oil shale development area. These voids and brecciated zones may pose problems for in situ and mining recovery of oil shale, further increasing the utility of supporting pillars.

In some embodiments, compositions and properties of the hydrocarbon fluids produced by an in situ conversion process may vary depending on, for example, conditions within an organic-rich rock formation. Controlling heat and/or heating rates of a selected section in an organic-rich rock formation may increase or decrease production of selected produced fluids.

In one embodiment, operating conditions may be determined by measuring at least one property of the organic-rich rock formation. The measured properties may be input into a computer executable program. At least one property of the produced fluids selected to be produced from the formation may also be input into the computer executable program. The program may be operable to determine a set of operating conditions from at least the one or more measured properties. The program may also be configured to determine the set of operating conditions from at least one property of the selected produced fluids. In this manner, the determined set of operating conditions may be configured to increase production of selected produced fluids from the formation.

Certain heater well embodiments may include an operating system that is coupled to any of the heater wells such as by insulated conductors or other types of wiring. The operating system may be configured to interface with the heater well. The operating system may receive a signal (e.g., an electromagnetic signal) from a heater that is representative of a temperature distribution of the heater well. Additionally, the operating system may be further configured to control the heater well, either locally or remotely. For example, the operating system may alter a temperature of the heater well by altering a parameter of equipment coupled to the heater well. Therefore, the operating system may monitor, alter, and/or control the heating of at least a portion of the formation.

In some embodiments, a heater well may be turned down and/or off after an average temperature in a formation may have reached a selected temperature. Turning down and/or off the heater well may reduce input energy costs, substantially inhibit overheating of the formation, and allow heat to substantially transfer into colder regions of the formation.

Temperature (and average temperatures) within a heated organic-rich rock formation may vary, depending on, for example, proximity to a heater well, thermal conductivity and thermal diffusivity of the formation, type of reaction occurring, type of formation hydrocarbon, and the presence of water within the organic-rich rock formation. At points in the field where monitoring wells are established, temperature measurements may be taken directly in the wellbore. Further, at heater wells the temperature of the immediately surrounding formation is fairly well understood. However, it is desirable to interpolate temperatures to points in the formation intermediate temperature sensors and heater wells.

In accordance with one aspect of the production processes of the present inventions, a temperature distribution within the organic-rich rock formation may be computed using a numerical simulation model. The numerical simulation model may calculate a subsurface temperature distribution through interpolation of known data points and assumptions of formation conductivity. In addition, the numerical simulation model may be used to determine other properties of the formation under the assessed temperature distribution. For example, the various properties of the formation may include, but are not limited to, permeability of the formation.

The numerical simulation model may also include assessing various properties of a fluid formed within an organic-rich rock formation under the assessed temperature distribution. For example, the various properties of a formed fluid may include, but are not limited to, a cumulative volume of a fluid formed in the formation, fluid viscosity, fluid density, and a composition of the fluid formed in the formation. Such a simulation may be used to assess the performance of a commercial-scale operation or small-scale field experiment. For example, a performance of a commercial-scale development may be assessed based on, but not limited to, a total volume of product that may be produced from a research-scale operation.

Some embodiments include producing at least a portion of the hydrocarbon fluids from the organic-rich rock formation. The hydrocarbon fluids may be produced through production wells. Production wells may be cased or uncased wells and drilled and completed through methods known in the art.

Some embodiments further include producing a production fluid from the organic-rich rock formation where the production fluid contains the hydrocarbon fluids and an aqueous fluid. The aqueous fluid may contain water-soluble minerals and/or migratory contaminant species. In such case, the production fluid may be separated into a hydrocarbon stream and an aqueous stream at a surface facility. Thereafter the water-soluble minerals and/or migratory contaminant species may be recovered from the aqueous stream. This embodiment may be combined with any of the other aspects of the invention discussed herein.

The produced hydrocarbon fluids may include a pyrolysis oil component (or condensable component) and a pyrolysis gas component (or non-condensable component). Condensable hydrocarbons produced from the formation will typically include paraffins, cycloalkanes, mono-aromatics, and di-aromatics as components. Such condensable hydrocarbons may also include other components such as tri-aromatics and other hydrocarbon species.

In certain embodiments, a majority of the hydrocarbons in the produced fluid may have a carbon number of less than approximately 25. Alternatively, less than about 15 weight % of the hydrocarbons in the fluid may have a carbon number greater than approximately 25. The non-condensable hydrocarbons may include, but are not limited to, hydrocarbons having carbon numbers less than 5.

In certain embodiments, the API gravity of the condensable hydrocarbons in the produced fluid may be approximately 20 or above (e.g., 25, 30, 40, 50, etc.). In certain embodiments, the hydrogen to carbon atomic ratio in produced fluid may be at least approximately 1.7 (e.g., 1.8, 1.9, etc.).

Some production procedures include in situ heating of an organic-rich rock formation that contains both formation hydrocarbons and formation water-soluble minerals prior to substantial removal of the formation water-soluble minerals from the organic-rich rock formation. In some embodiments of the invention there is no need to partially, substantially or completely remove the water-soluble minerals prior to in situ heating. For example, in an oil shale formation that contains naturally occurring nahcolite, the oil shale may be heated prior to substantial removal of the nahcolite by solution mining. Substantial removal of a water-soluble mineral may represent the degree of removal of a water-soluble mineral that occurs from any commercial solution mining operation as known in the art. Substantial removal of a water-soluble mineral may be approximated as removal of greater than 5 weight percent of the total amount of a particular water-soluble mineral present in the zone targeted for hydrocarbon fluid production in the organic-rich rock formation. In alternative embodiments, in situ heating of the organic-rich rock formation to pyrolyze formation hydrocarbons may be commenced prior to removal of greater than 3 weight percent, alternatively 7 weight percent, 10 weight percent or 13 weight percent of the formation water-soluble minerals from the organic-rich rock formation.

The impact of heating oil shale to produce oil and gas prior to producing nahcolite is to convert the nahcolite to a more recoverable form (soda ash), and provide permeability facilitating its subsequent recovery. Water-soluble mineral recovery may take place as soon as the retorted oil is produced, or it may be left for a period of years for later recovery. If desired, the soda ash can be readily converted back to nahcolite on the surface. The ease with which this conversion can be accomplished makes the two minerals effectively interchangeable.

In some production processes, heating the organic-rich rock formation includes generating soda ash by decomposition of nahcolite. The method may include processing an aqueous solution containing water-soluble minerals in a surface facility to remove a portion of the water-soluble minerals. The processing step may include removing the water-soluble minerals by precipitation caused by altering the temperature of the aqueous solution.

The water-soluble minerals may include sodium. The water-soluble minerals may also include nahcolite (sodium bicarbonate), soda ash (sodium carbonate), dawsonite (NaAl$(CO_3)(OH)_2$), or combinations thereof. The surface processing may further include converting the soda ash back to sodium bicarbonate (nahcolite) in the surface facility by reaction with $CO_2$. After partial or complete removal of the water-soluble minerals, the aqueous solution may be reinjected into a subsurface formation where it may be sequestered. The subsurface formation may be the same as or different from the original organic-rich rock formation.

In some production processes, heating of the organic-rich rock formation both pyrolyzes at least a portion of the formation hydrocarbons to create hydrocarbon fluids and makes available migratory contaminant species previously bound in the organic-rich rock formation. The migratory contaminant species may be formed through pyrolysis of the formation hydrocarbons, may be liberated from the formation itself upon heating, or may be made accessible through the creation of increased permeability upon heating of the formation. The migratory contaminant species may be soluble in water or other aqueous fluids present in or injected into the organic-rich rock formation.

Producing hydrocarbons from pyrolyzed oil shale will generally leave behind some migratory contaminant species which are at least partially water-soluble. Depending on the hydrological connectivity of the pyrolyzed shale oil to shallower zones, these components may eventually migrate into ground water in concentrations which are environmentally unacceptable. The types of potential migratory contaminant species depend on the nature of the oil shale pyrolysis and the composition of the oil shale being converted. If the pyrolysis is performed in the absence of oxygen or air, the contaminant species may include aromatic hydrocarbons (e.g. benzene, toluene, ethylbenzene, xylenes), polyaromatic hydrocarbons (e.g. anthracene, pyrene, naphthalene, chrysene), metal contaminants (e.g. As, Co, Pb, Mo, Ni, and Zn), and other species such as sulfates, ammonia, Al, K, Mg, chlorides, flourides and phenols. If oxygen or air is employed, contaminant species may also include ketones, alcohols, and cyanides. Further, the specific migratory contaminant species present may include any subset or combination of the above-described species.

It may be desirable for a field developer to assess the connectivity of the organic-rich rock formation to aquifers. This may be done to determine if, or to what extent, in situ pyrolysis of formation hydrocarbons in the organic-rich rock formation may create migratory species with the propensity to migrate into an aquifer. If the organic-rich rock formation is hydrologically connected to an aquifer, precautions may be taken to reduce or prevent species generated or liberated during pyrolysis from entering the aquifer. Alternatively, the organic-rich rock formation may be flushed with water or an aqueous fluid after pyrolysis as described herein to remove water-soluble minerals and/or migratory contaminant species. In other embodiments, the organic-rich rock formation may be substantially hydrologically unconnected to any source of ground water. In such a case, flushing the organic-rich rock formation may not be desirable for removal of migratory contaminant species but may nevertheless be necessary for recovery of water-soluble minerals.

Following production of hydrocarbons from an organic-rich formation, some migratory contaminant species may remain in the rock formation. In such case, it may be desirable to inject an aqueous fluid into the organic-rich rock formation and have the injected aqueous fluid dissolve at least a portion of the water-soluble minerals and/or the migratory contaminant species to form an aqueous solution. The aqueous solution may then be produced from the organic-rich rock formation through, for example, solution production wells. The aqueous fluid may be adjusted to increase the solubility of the migratory contaminant species and/or the water-soluble minerals. The adjustment may include the addition of an acid or base to adjust the pH of the solution. The resulting aqueous solution may then be produced from the organic-rich rock formation to the surface for processing.

After initial aqueous fluid production, it may further be desirable to flush the matured organic-rich rock zone and the unmatured organic-rich rock zone with an aqueous fluid. The aqueous fluid may be used to further dissolve water-soluble minerals and migratory contaminant species. The flushing may optionally be completed after a substantial portion of the hydrocarbon fluids have been produced from the matured organic-rich rock zone. In some embodiments, the flushing step may be delayed after the hydrocarbon fluid production step. The flushing may be delayed to allow heat generated from the heating step to migrate deeper into surrounding unmatured organic-rich rock zones to convert nahcolite within the surrounding unmatured organic-rich rock zones to soda ash. Alternatively, the flushing may be delayed to allow heat generated from the heating step to generate permeability within the surrounding unmatured organic-rich rock zones. Further, the flushing may be delayed based on current and/or forecast market prices of sodium bicarbonate, soda ash, or both as further discussed herein. This method may be combined with any of the other aspects of the invention as discussed herein.

Upon flushing of an aqueous solution, it may be desirable to process the aqueous solution in a surface facility to remove at least some of the migratory contaminant species. The migratory contaminant species may be removed through use of, for example, an adsorbent material, reverse osmosis, chemical oxidation, bio-oxidation, and/or ion exchange. Examples of these processes are individually known in the art. Exemplary adsorbent materials may include activated carbon, clay, or fuller's earth.

In certain areas with oil shale resources, additional oil shale resources or other hydrocarbon resources may exist at deeper depths. Other hydrocarbon resources may include natural gas in low permeability formations (so-called "tight gas") or natural gas trapped in and adsorbed on coal (so called "coal-bed methane"). In some embodiments with multiple shale oil resources it may be advantageous to develop deeper zones first and then sequentially shallower zones. In this way, wells will need not cross hot zones or zones of weakened rock. In other embodiments in may be advantageous to develop deeper zones by drilling wells through regions being utilized as pillars for shale oil development at a shallower depth.

Simultaneous development of shale oil resources and natural gas resources in the same area can synergistically utilize certain facility and logistic operations. For example, gas treating may be performed at a single plant. Likewise personnel may be shared among the developments.

Figure 19:
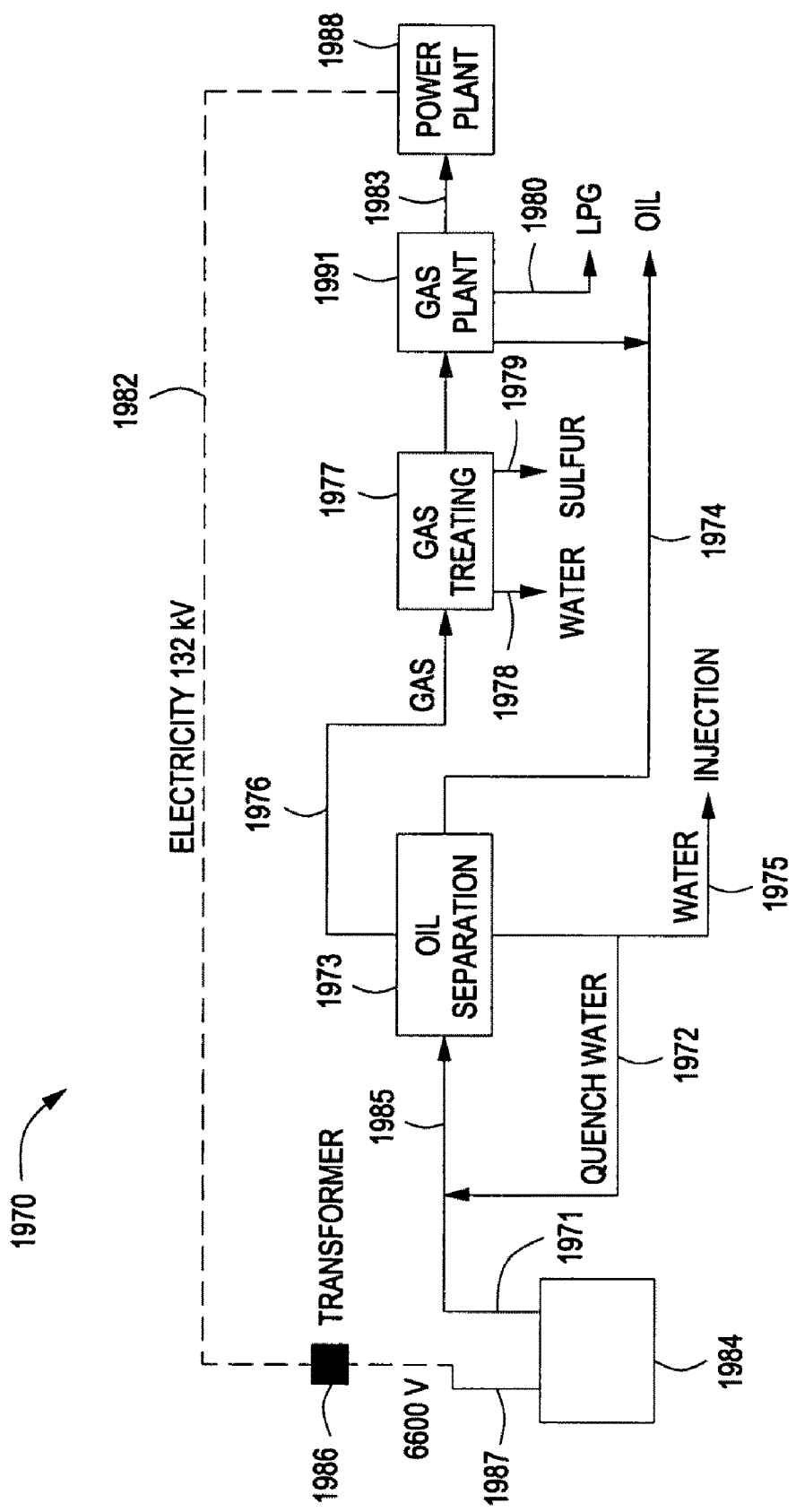
FIG. 19 is a process flow diagram of exemplary surface processing facilities for a subsurface formation development.

FIG. 19 illustrates a schematic diagram of an embodiment of surface facilities 1970 that may be configured to treat a produced fluid. The produced fluid 1985 may be produced from the subsurface formation 1984 though a production well 1971 as described herein. The produced fluid may include any of the produced fluids produced by any of the methods as described herein. The subsurface formation may be any subsurface formation, including, for example, an organic-rich rock formation containing any of oil shale, coal, or tar sands for example. A production scheme may involve quenching 1972 produced fluids to a temperature below 100° F., 200° F., or 300° F., separating out condensable components (i.e., oil 1974 and water 1975) in an oil separator 1973, treating the noncondensable components 1976 (i.e. gas) in a gas treating unit 77 to remove water 1978 and sulfur species 1979, removing the heavier components from the gas (e.g., propane and butanes) in a gas plant 1981 to form liquid petroleum gas (LPG) 1980 for sale, and generating electrical power 1982 in a power plant 1988 from the remaining gas 1983. Excess gas, if available, may be exported for sale. The electrical power 1982 may be used as an energy source for heating the subsurface formation 1984 through any of the methods described herein. For example, the electrical power 1982 may be fed at a high voltage, for example 132 kV, to a transformer 86 and stepped down to a lower voltage, for example 6600 V, before being fed to an electrical resistance heater element located in a heater well 1987 located in the subsurface formation 1984. In this way all or a portion of the power required to heat the subsurface formation 1984 may be generated from the non-condensable portion of the produced fluids 1985.

Produced fluids from in situ oil shale production contain a number of components which may be separated in surface facilities. The produced fluids typically contain water, non-condensable hydrocarbon alkane species (e.g., methane, ethane, propane, n-butane, isobutane), noncondensable hydrocarbon alkene species (e.g., ethene, propene), condensable hydrocarbon species composed of (alkanes, olefins, aromatics, and polyaromatics among others), $CO_2$, CO, $H_2$, $H_2S$, and $NH_3$.

In a surface facility, condensable components may be separated from non-condensable components by reducing temperature and/or increasing pressure. Temperature reduction may be accomplished using heat exchangers cooled by ambient air or available water. Alternatively, the hot produced fluids may be cooled via heat exchange with produced hydrocarbon fluids previously cooled. The pressure may be increased via centrifugal or reciprocating compressors. Alternatively, or in conjunction, a diffuser-expander apparatus may be used to condense out liquids from gaseous flows. Separations may involve several stages of cooling and/or pressure changes.

Water in addition to condensable hydrocarbons may be dropped out of the gas when reducing temperature or increasing pressure. Liquid water may be separated from condensed hydrocarbons via gravity settling vessels or centrifugal separators. Demulsifiers may be used to aid in water separation.

Methods to remove $CO_2$, as well as other so-called acid gases (such as $H_2S$), from produced hydrocarbon gas include the use of chemical reaction processes and of physical solvent processes. Chemical reaction processes typically involve contacting the gas stream with an aqueous amine solution at high pressure and/or low temperature. This causes the acid gas species to chemically react with the amines and go into solution. By raising the temperature and/or lowering the pressure, the chemical reaction can be reversed and a concentrated stream of acid gases can be recovered. An alternative chemical reaction process involves hot carbonate solutions, typically potassium carbonate. The hot carbonate solution is regenerated and the concentrated stream of acid gases is recovered by contacting the solution with steam. Physical solvent processes typically involve contacting the gas stream with a glycol at high pressure and/or low temperature. Like the amine processes, reducing the pressure or raising the temperature allows regeneration of the solvent and recovery of the acid gases. Certain amines or glycols may be more or less selective in the types of acid gas species removed. Sizing of any of these processes requires determining the amount of chemical to circulate, the rate of circulation, the energy input for regeneration, and the size and type of gas-chemical contacting equipment. Contacting equipment may include packed or multi-tray countercurrent towers. Optimal sizing for each of these aspects is highly dependent on the rate at which gas is being produced from the formation and the concentration of the acid gases in the gas stream.

Acid gas removal may also be effectuated through the use of distillation towers. Such towers include an intermediate freezing section wherein frozen $CO_2$ and $H_2S$ particles are allowed to form. A mixture of frozen particles and liquids fall downward into a stripping section, where the lighter hydrocarbon gasses break out and rise within the tower. A rectification section may be provided at an upper end of the tower to further facilitate the cleaning of the overhead gas stream.

The hydrogen content of a gas stream may be adjusted by either removing all or a portion of the hydrogen or by removing all or a portion of the non-hydrogen species (e.g., $CO_2$, $CH_4$, etc.) Separations may be accomplished using cryogenic condensation, pressure-swing or temperature-swing adsorption, or selective diffusion membranes. If additional hydrogen is needed, hydrogen may be made by reforming methane via the classic water-shift reaction.

CONCLUSION

The above-described processes may be of merit in connection with the recovery of hydrocarbons in the Piceance Basin of Colorado. Some have estimated that in some oil shale deposits of the Western United States, up to 1 million barrels of oil may be recoverable per surface acre. One study has estimated the oil shale resource within the nahcolite-bearing portions of the oil shale formations of the Piceance Basin to be 400 billion barrels of shale oil in place. Overall, up to 1 trillion barrels of shale oil may exist in the Piceance Basin alone.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

While it will be apparent that the invention herein described is well calculated to achieve the benefits and advantages set forth above, it will be appreciated that the invention is susceptible to modification, variation and change without departing from the spirit thereof.

What is claimed is:

1. A method for producing hydrocarbon fluids from an organic-rich rock formation, comprising:
   completing at least one in situ heater or heater well in the organic-rich rock formation;
   completing a production well in the organic-rich rock formation;
   hydraulically fracturing the organic-rich rock formation from the production well such that one or more artificial fractures are formed extending toward a thermal fracture plane associated with the at least one in situ heater or heater well;
   heating the organic-rich rock formation with at least one electrically conductive, in situ heat source from the at least one in situ heater or heater well, thereby pyrolyzing at least a portion of the organic-rich rock into hydrocarbon fluids and thereby creating thermal fractures in the organic-rich rock formation due to thermal stresses created by heating and along the thermal fracture plane, the thermal fractures intersecting the artificial fractures; and
   producing hydrocarbon fluids from the production well.

2. The method of claim 1, wherein the organic-rich rock formation is an oil shale formation.

3. The method of claim 2, wherein the thermal fractures are substantially horizontal.

4. The method of claim 2, wherein the thermal fractures are substantially vertical.

5. The method of claim 2, further comprising:
   performing geomechanical modeling to determine the direction and extent of thermal fractures.

6. The method of claim 2 wherein the thermal fractures are at least partially formed in a first portion of the oil shale formation which has not been heated to the extent of a second portion of the oil shale formation which is more proximate the at least one in situ heater or heater well.

7. The method of claim 2, wherein the step of hydraulically fracturing the oil shale formation is performed before the step of heating the oil shale formation.

8. The method of claim 2, wherein the step of hydraulically fracturing the oil shale formation is performed after the step of heating the oil shale formation has begun, but before the substantial formation of thermal fractures.

9. The method of claim 2, further comprising:
   determining a distance from the production well in which to form the one or more artificial fractures in order to provide fluid communication with anticipated thermal fractures.

10. The method of claim 2, wherein the artificial fractures propagate a distance no more than half of the distance toward a heater or heater well.

11. The method of claim 2, wherein the thermal fractures intersect at least one of the artificial fractures formed from hydraulically fracturing within one year of initiating heating.

12. The method of claim 2 wherein the step of heating results in at least a portion of the oil shale formation reaching a temperature of 270° C. or greater.

13. The method of claim 2, wherein the artificial fractures from the production well are vertical in orientation.

14. The method of claim 2, wherein the artificial fractures from the production well are horizontal in orientation.

15. The method of claim 2, wherein the artificial fractures are formed in the direction perpendicular to that of least horizontal principal stress in the oil shale formation.

16. The method of claim 2, further comprising introducing a proppant material into one or more of the artificial fractures.

17. The method of claim 2, wherein the step of hydraulically fracturing the oil shale formation comprises injecting a fracture fluid into the production well.

18. The method of claim 1, wherein the at least one electrically conductive, in situ heat source comprises an electrically conductive fracture.

19. The method of claim 1, wherein the at least one electrically conductive, in situ heat source comprises an electrically conductive wellbore heater.

20. A method for producing hydrocarbons from an oil shale formation, comprising:
   completing a production well substantially vertically;
   hydraulically fracturing the oil shale formation from the production well in a vertical orientation, such that artificial fractures are formed;
   completing at least two in situ heaters or heater wells that are substantially horizontal within the oil shale formation, wherein the artificial fractures from the production well extend toward at least one estimated thermal fracture plane of the at least two in situ heaters or heater wells;
   heating the oil shale formation in situ with at least one electrically conductive, in situ heat source from the at least two heater wells, thereby creating horizontal fractures due to thermal stresses along the thermal fracture plane within the oil shale formation which intersect the artificial fractures, and also thereby converting at least a portion of the oil shale formation into hydrocarbon fluids by pyrolysis; and
   producing hydrocarbon fluids from the production well.

21. The method of claim 20, wherein the hydraulic fractures are formed in the direction perpendicular to that of least horizontal principal stress in the oil shale formation.

22. The method of claim 20, further comprising introducing a proppant material into one or more of the hydraulic fractures.

23. The method of claim 20, wherein the at least one electrically conductive, in situ heat source comprises an electrically conductive fracture.

24. The method of claim 20, wherein the at least one electrically conductive, in situ heat source comprises an electrically conductive wellbore heater.

25. A well pattern for a hydrocarbon fluids production program, comprising:
   a plurality of heater wells completed in an organic-rich rock formation comprising oil shale, wherein the heater wells comprise at least one electrically conductive, in situ heat source;
   a plurality of production wells completed in the organic-rich rock formation, the heater wells and production wells forming a repeating well pattern, the well pattern having been determined by:
   estimating the extent of a hydraulic fracture plane from each of the production wells,
   estimating the extent of a thermal fracture plane resulting from heating of the subsurface formation with the at least one electrically conductive, in situ heat source from corresponding heater wells, and
   locating the plurality of production wells and corresponding heater wells such that hydraulic fractures associated with the hydraulic fracture planes from the plurality of production wells extend toward and intersect with thermal fractures created along the thermal fracture plane from the corresponding heater wells, thereby forming intersection zones within the well pattern.

26. The well pattern of claim 25, wherein the production wells are hypothetical wells that have not actually been completed in the subsurface formation.

27. The well pattern of claim 25, wherein the intersection zones are planar zones, volumetric zones, or linear zones.

28. The well pattern of claim 25, wherein the thermal fractures are substantially horizontal.

29. The well pattern of claim 25, wherein:
   the thermal fractures are substantially vertical; and
   the hydraulic fractures from the production wells are vertical in orientation.

30. The well pattern of claim 25, wherein the hydraulic fractures are formed in the direction perpendicular to that of least horizontal principal stress in the oil shale formation.

31. The well pattern of claim 25, wherein the at least one electrically conductive, in situ heat source comprises an electrically conductive fracture.

32. The well pattern of claim 25, wherein the at least one electrically conductive, in situ heat source comprises an electrically conductive wellbore heater.

* * * * *